United States Patent
Hernandez-Mondragon

(10) Patent No.: US 12,346,399 B2
(45) Date of Patent: Jul. 1, 2025

(54) METHOD AND SYSTEM FOR A WEB INTERACTION WITH OBJECTS AND REMOTE DISPLAY TECHNOLOGIES

(71) Applicant: Edwin A. Hernandez-Mondragon, Boca Raton, FL (US)

(72) Inventor: Edwin A. Hernandez-Mondragon, Boca Raton, FL (US)

( * ) Notice: Subject to any disclaimer, the term of this patent is extended or adjusted under 35 U.S.C. 154(b) by 0 days.

(21) Appl. No.: 18/622,249

(22) Filed: Mar. 29, 2024

(65) Prior Publication Data

US 2024/0330392 A1    Oct. 3, 2024

Related U.S. Application Data

(60) Provisional application No. 63/456,018, filed on Mar. 31, 2023.

(51) Int. Cl.
  *G06F 16/957*    (2019.01)
  *G06F 3/0488*    (2022.01)
  *G06F 16/955*    (2019.01)

(52) U.S. Cl.
  CPC ........ *G06F 16/9577* (2019.01); *G06F 3/0488* (2013.01); *G06F 16/9554* (2019.01)

(58) Field of Classification Search
  CPC . G06F 16/9577; G06F 3/0488; G06F 16/9554
  See application file for complete search history.

(56) References Cited

U.S. PATENT DOCUMENTS

| | | | |
|---|---|---|---|
| 2012/0169593 A1* | 7/2012 | Mak | G06F 3/04883 345/157 |
| 2014/0011584 A1 | 1/2014 | Shin et al. | |
| 2015/0382066 A1 | 12/2015 | Heeter et al. | |
| 2016/0034058 A1 | 2/2016 | Stauber et al. | |
| 2021/0133274 A1* | 5/2021 | Chu | G06F 16/9577 |
| 2024/0012930 A1* | 1/2024 | Boyd | H04L 51/216 |
| 2024/0155033 A1* | 5/2024 | Wei | A63F 13/22 |

FOREIGN PATENT DOCUMENTS

KR    102344580 B1    12/2021

OTHER PUBLICATIONS

Iqbal, Muhammad Zahid and Campbell, Abraham G.; Potential Security and Privacy Issues in Zero UI Touchless Technology, Int. Cybersecur. Law Rev (2022), Apr. 19, 2022, pp. 1-8.
https://www.qararairways.com/tradeportal/en/QR-NDC.html; Introducing Oryx Connect, 7 pages.
PCT ISR and Written Opinion for corresponding PCT Patent Application International Serial No. PCT/US2024/022310, Dec. 20, 2024, 10 pgs.

* cited by examiner

*Primary Examiner* — Cao H Nguyen
(74) *Attorney, Agent, or Firm* — Dickinson Wright PLLC

(57) ABSTRACT

This disclosure covers a technological advanced for a distributed operating system where mobile devices are controllers and smart televisions become displays for a system where messaging, streaming, and computation are stored in the cloud or a decentralized operating system.

18 Claims, 30 Drawing Sheets

Data Capturing

Training

Detection

METHOD AND SYSTEM FOR A WEB INTERACTION WITH OBJECTS AND REMOTE DISPLAY TECHNOLOGIES

CROSS-REFERENCE TO RELATED APPLICATIONS

This application claims priority to U.S. Provisional Patent Application Ser. No. 63/456,018, filed Mar. 31, 2023, and entitled "Method and System for a Web Interaction with Objects and Remote Display Technologies," the entirety of which is incorporated by reference herein.

FIELD OF THE DISCLOSURE

The present systems, apparatuses, and methods lie in the field of communications and processing and, more specifically, to methods and systems for the creation of a distributed system for processing a controller using a mobile phone and smart televisions as display, while the infrastructure handles all message passing from controllers to applications in a distributed system with decentralized processing as a traditional operating system handles I/O events and tasks.

BACKGROUND OF THE DISCLOSURE

Traditional implementations of remote management and control of computers rely on protocols such as "Remote Desktop Protocol" (RDP), "Virtual Network Computing" (VNC) also known as RFB Protocol, Citrix "Internet Computer Architecture" (ICA) as well as other proprietary mechanisms, both client and server software, to remotely control and manage a personal computer (PC), laptop, tablet, mobile, or set top box.

In today's digital landscape, many smart televisions are limited to control by native applications designed for use with a remote control. Predominately, these applications serve streaming purposes and are not designed for dynamic interaction with mobile computing devices. A solution is needed that enables seamless interactive user experiences with a television via a mobile computing device.

SUMMARY OF THE DISCLOSURE

An aspect of the disclosed embodiments includes a method. The method comprises: generating a first message for a first browser executed on a first computing device, the first message including instructions that in response to being executed by the first browser causes a representation of an interface of a physical user input device to be displayed by the first browser; providing the first message to the first browser; generating a second message for a second browser executed on a second computing device, the second message including instructions that when executed by the second browser enables user interaction with content provided by the second browser in responsive to input from the representation of the interface of the physical user input device displayed by the first browser, wherein the physical user input device is configured to interact with the content provided by the second browser; and providing the second message to the second browser.

Another aspect of the disclosed embodiments includes a system. The system comprises: at least one processor circuit; and at least one memory that stores instructions to be executed by the at least one processor circuit. The instructions are configured to perform operations that comprise: generating a first message for a first browser executed on a first computing device, the first message including instructions that in response to being executed by the first browser causes a representation of an interface of a physical user input device to be displayed by the first browser; providing the first message to the first browser; generating a second message for a second browser executed on a second computing device, the second message including instructions that when executed by the second browser enables user interaction with content provided by the second browser in responsive to input from the representation of the interface of the physical user input device displayed by the first browser, wherein the physical user input device is configured to interact with the content provided by the second browser; and providing the second message to the second browser.

Another aspect of the disclosed embodiments includes a computer-readable storage medium having program instructions recorded thereon that, when executed by at least one processing circuit of a computing device perform a method. The method comprises: generating a first message for a first browser executed on a first computing device, the first message including instructions that in response to being executed by the first browser causes a representation of an interface of a physical user input device to be displayed by the first browser; providing the first message to the first browser; generating a second message for a second browser executed on a second computing device, the second message including instructions that when executed by the second browser enables user interaction with content provided by the second browser in responsive to input from the representation of the interface of the physical user input device displayed by the first browser, wherein the physical user input device is configured to interact with the content provided by the second browser; and providing the second message to the second browser.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which.

DETAILED DESCRIPTION OF THE EMBODIMENTS

Figure 1:
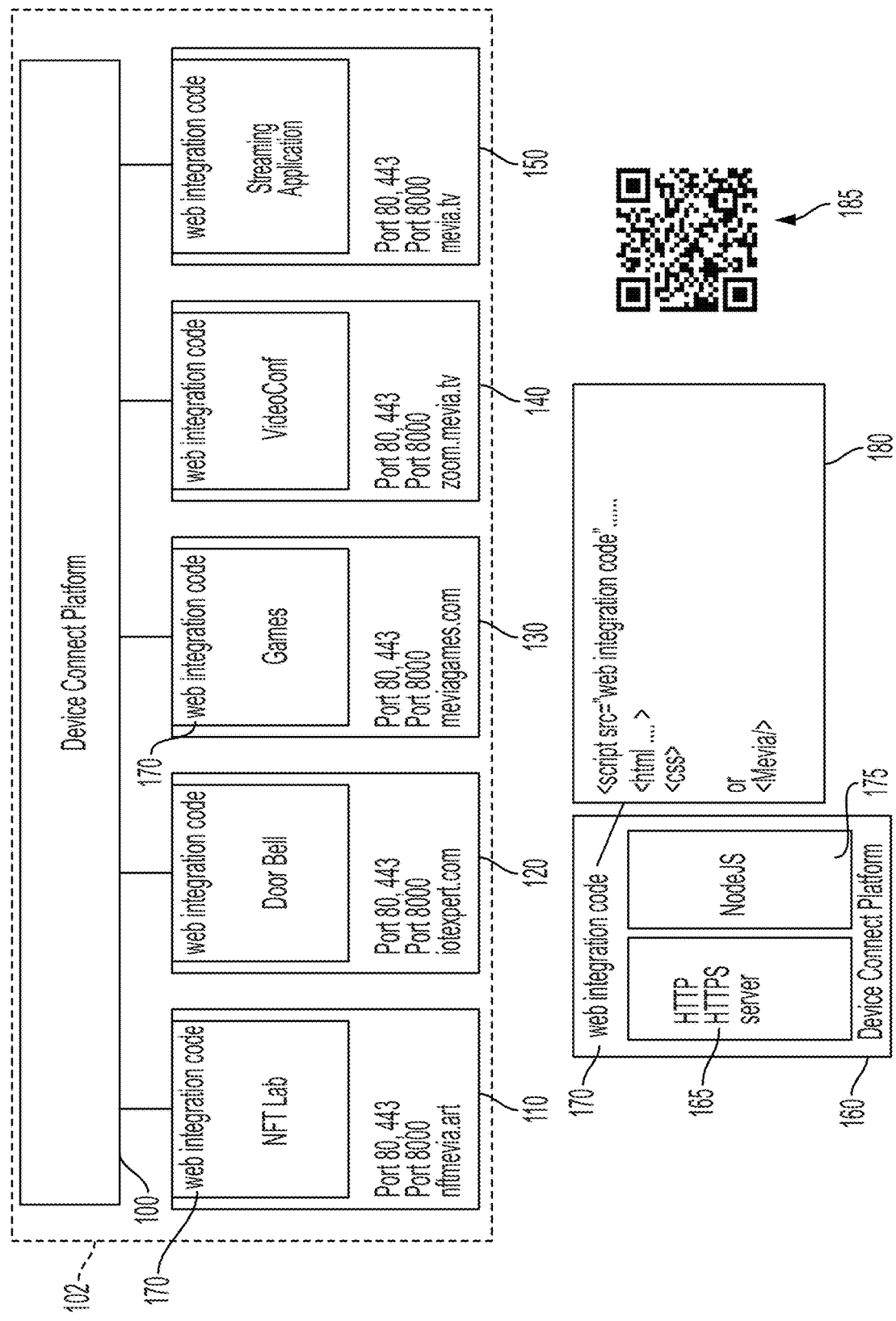
FIG. 1 is a block diagram of an exemplary embodiment of device connect applications and architecture for a web iteration with objects and remote display technologies.

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized, and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the disclosure. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

It will be appreciated that embodiments of the systems, apparatuses, and methods described herein may be comprised of one or more conventional processors and unique stored program instructions that control the one or more processors to implement, in conjunction with certain non-processor circuits and other elements, some, most, or all of the functions of the systems, apparatuses, and methods described herein. The non-processor circuits may include, but are not limited to, signal drivers, clock circuits, power source circuits, and user input and output elements. Alternatively, some or all functions could be implemented by a state machine that has no stored program instructions, or in one or more application specific integrated circuits (ASICs) or field-programmable gate arrays (FPGA), in which each function or some combinations of certain of the functions are implemented as custom logic. Of course, a combination of these approaches could also be used. Thus, methods and means for these functions have been described herein.

The terms "program," "software," "software application," and the like as used herein, are defined as a sequence of instructions designed for execution on a computer system or programmable device. A "program," "software," "application," "computer program," or "software application" may include a subroutine, a function, a procedure, an object method, an object implementation, an executable application, an applet, a servlet, a source code, an object code, any computer language logic, a shared library/dynamic load library and/or other sequence of instructions designed for execution on a computer system.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Although the systems, apparatuses, and methods are illustrated and described herein as embodied in systems and methods for a web interaction with objects and remote display technologies, it is, nevertheless, not intended to be limited to the details shown because various modifications and structural changes may be made therein without departing from the spirit of the disclosure and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the disclosure that are regarded as novel, it is believed that the systems, apparatuses, and methods will be better understood from a consideration of the following description in conjunction with the drawing figures, in which like reference numerals are carried forward.

Embodiments disclosed herein are directed to a device connect platform that addresses limitations of existing technologies such as Remote Desktop Protocol (RDP). The device connect platform eliminates the need for RDP by using standard Hypertext Transfer Protocol (HTTP) and video tags, making it possible to access remote units without a transcoding server. The device connect platform enables users to control web applications using mobile computing devices such as tablets, smart phones, augmented reality glasses, virtual reality devices, or any other device that can display information. These mobile computing devices act as controllers, and the need for a traditional controller interface is eliminated. Additionally, the platform employs video encoding to project remote screens into a web browser. For example, the capabilities of JavaScript are used to transform a mobile computing device into a physical user input device (e.g., mouse, keyboard, game controller). This allows users to send touch commands to a remote server that is displayed on a computing device, such as a smart television.

Remote management is achieved by forwarding touch commands from the mobile web browser to a remote computing device, which can be displayed on a smart television or streamed through various protocols such as Web Real-Time Communication (WebRTC), Real-Time Messaging Protocol (RTMP), HTTP Live Streaming (HLS), or DASH protocols, that are compatible with web browsers. The platform further supports adaptive video quality, meaning it can adapt to different network conditions and device capabilities. For example, the platform can switch video resolution and quality based on a needs of a user.

The platform serves as a decentralized or distributed operating system. It connects web applications and mobile computing devices that become controllers for web applications displayed on smart televisions, AR and VR displays (Augmented Reality and Virtual Reality), and projectors. The system utilizes JavaScript/CSS libraries (e.g., "gestures.js") for control. The user's mobile device acts as the controller, sending commands and gestures that are translated into JavaScript macros for efficient processing and interactions with web applications. Meanwhile, a remote webpage is displayed at the smart television that loads another JavaScript file or files (e.g., mevia.js) and that becomes the display. In some embodiments, an identification mechanism, such as a quick-response (QR) code, can be used to load a controller onto a smart television. This mechanism includes parameters like an application identifier and other information that determines the destination server for all users' inputs and interactions. In one embodiment, and to help further illustrate, a QR code is scanned to activate a representation of an interface of a physical user input device to be displayed on a mobile computing device and to establish a communication channel between the mobile computing device and smart television, enabling user interaction with content displayed on the television via input from the representation of the interface of the physical user input device displayed on the mobile computing device.

The embodiments disclosed herein allows users to use mobile computing devices as input user devices and stream content to smart televisions. By leveraging video encoding and JavaScript, embodiments disclosed herein provide a dynamic and adaptable user experience. The decentralized nature of the platform means that it can be applied to a wide range of applications and computing devices. Any capabilities of a web application tailored for a smart phone, tablet, laptop, AR (Augmented Reality), Virtual Reality, Extended Reality display, or desktop interfaces can now extend to use with a smart television. In this platform, the mobile computing device serves as the physical user input device, while the smart television transforms into the display and the device connect platform operates as the central platform handling messaging between the mobile computing device and the smart television. In this disclosure, user input device and controller are used interchangeably.

To help illustrate this, FIG. 1 will now be described. In particular, FIG. 1 is a block diagram of an exemplary embodiment of a cloud services network 102 that hosts device connect platform 100 and several applications that are accessible to device connect platform 100. A cloud services network as used herein refers to the underlying technology that facilitates the access, storage, and management of data, applications, and resources hosted in the cloud. An application as referred to herein may be of any type of web accessible application/service, such as a database application, a social networking application, a messaging application, a financial services application, a news application, a search application, a web-accessible productivity application, a cloud storage and/file hosting application, or the like.

As shown in FIG. 1, the applications include a (Non-fungible token) NFT Lab 110, a Doorbell 120 (e.g., RING®), Games 130, Video Conference 140 (e.g., Zoom™, Microsoft Teams®, Slack®), and a Streaming Application 150 (e.g., Netflix®). Although cloud services network 102 of FIG. 1 is shown to host only these applications, it is to be understood that the techniques described herein may apply to cloud services networks that host other applications, such as email services (e,g., Google®, Outlook®), productivity suites (e.g., Google Workspace™ Microsoft 365™), social media platforms (e.g., Facebook®, Twitter®, LinkedIn®), cloud storage and file sharing (e.g., Dropbox®, OneDrive®), and online shopping (e.g., Amazon, eBay®).

Device connect platform 100 may include one or more server devices and/or other computing devices. Any of the applications may be associated with resources that are stored on one or more application servers. Each component of cloud services network 102 may be communicatively connected via one or more networks (not pictured in FIG. 1). These one or more networks may include, for example, a local area network (LAN), a wide area network (WAN), a personal area network (PAN), and/or a combination of communication networks, such as the Internet.

Further, as depicted in FIG. 1, device connect platform 100 uses a component, web integration code 170 (also referred to as mevia.js herein when referenced as a JavaScript file or files in some embodiments), which is part of device connect platform application 160 (also referred to as Mevia App herein in some embodiments), and web integration code 170 is configured to integrate various web technologies like JavaScript, CSS, and HTML from an original web application. In some embodiments, with the implementation of mevia.js, this may be achieved in frameworks such as React by creating a component <MEVIA/> 180. In some embodiments, device connect platform 100 may operate on different ports, including secure SSL mode for HTTPS, depending on how web servers are set up. Device connect platform 100 is adaptable to different web server configurations. Device connect platform 100 may work with servers like NGINX or Apache and even in hybrid setups with NodeJS 175, supporting both HTTP and HTTPS. Web integration code 170 may act as a connecting piece, essentially linking various elements of device connect platform 100 communication and data flow between different parts of the system, serving as a "glue" that holds components of device connect platform 100 together. Applications can be hosted on their own server, whether they are within the same network or spread across different networks. This provides flexibility in resource allocation and deployment. Device connect platform 100 may employ technologies, like SocketIO for WebSockets and WebRTC for peer-to-peer communication. These technologies enable real-time instant communication between controllers and the web applications that are being controlled.

For example, in some embodiments, an application may use two or more ports, for example, to operate in SSL mode for HTTPS and another port (e.g. 3000). This depends on the configuration of a web server (e.g NGINX or Apache), a hybrid configuration running NodeJS 175 and a webserver supporting HTTP/HTTPS server 165 can also be used to support servicing a device connect platform 100 application as well as servicing controller applications. As described, in some embodiments, web integration code 170 (e.g., mevia.js) functions as the glue code to device connect platform 100 to "join" virtual environments, where messages carrying events and other messages from a controller or set of controllers. Additionally, in some embodiments, each application could reside on its own server (e.g., as depicted in FIG. 1, nftmevia.art, iotexpert.com, meviagames.com, zoom.mevia.tv, and mevia.tv). Also, all applications could be collocated in the same network or in different networks. Additionally, web integration code 170 (e.g., mevia.js) may also include the use of SocketIO for web sockets (WS or Web Socket Secured as WSS) and WebRTC when a peer-to-peer communication is established between the controller and the web application being controlled.

Further, in some embodiments, device connect platform 100 is configured to convert any mobile terminal that uses a web browser to a remote device that can control a smart television using a browser application. In general, web assets are used for displaying widgets when a web-based terminal is in used, but could also be captured from a web-based headless rendering engine, such as Puppeteer (https://github.com/puppeteer/puppeteer). For example, all manipulations and commands that are generated by the device connect platform application can also be broadcasted to a cable television or satellite operator.

Device Connect Platform Controllers

As described, device connect platform 100 is configured to work with several types of user input user devices, where each input user device functionality depends on the web application that the input user device is meant to control. In some embodiments, a representation of an interface of a physical user input device is displayed by the first browser after scanning a QR Code displayed on a smart television or printed under a smart television. For example, in FIG. 1, QR code 185 or other identification mechanism may be used to identify a user input device to be displayed on mobile computing device. For example, the QR code may identify a remote control associated with a smart television. In some embodiments, the QR Code includes parameters such as an application identifier (e.g., Application Identifier (AppID) or Universal Unique Identifier (UUID), etc.) and other information that determines the destination server of any touch gesture data, such as keypresses, touch moves, gestures including accelerometer data that is captured at the mobile computing device.

Figure 2:
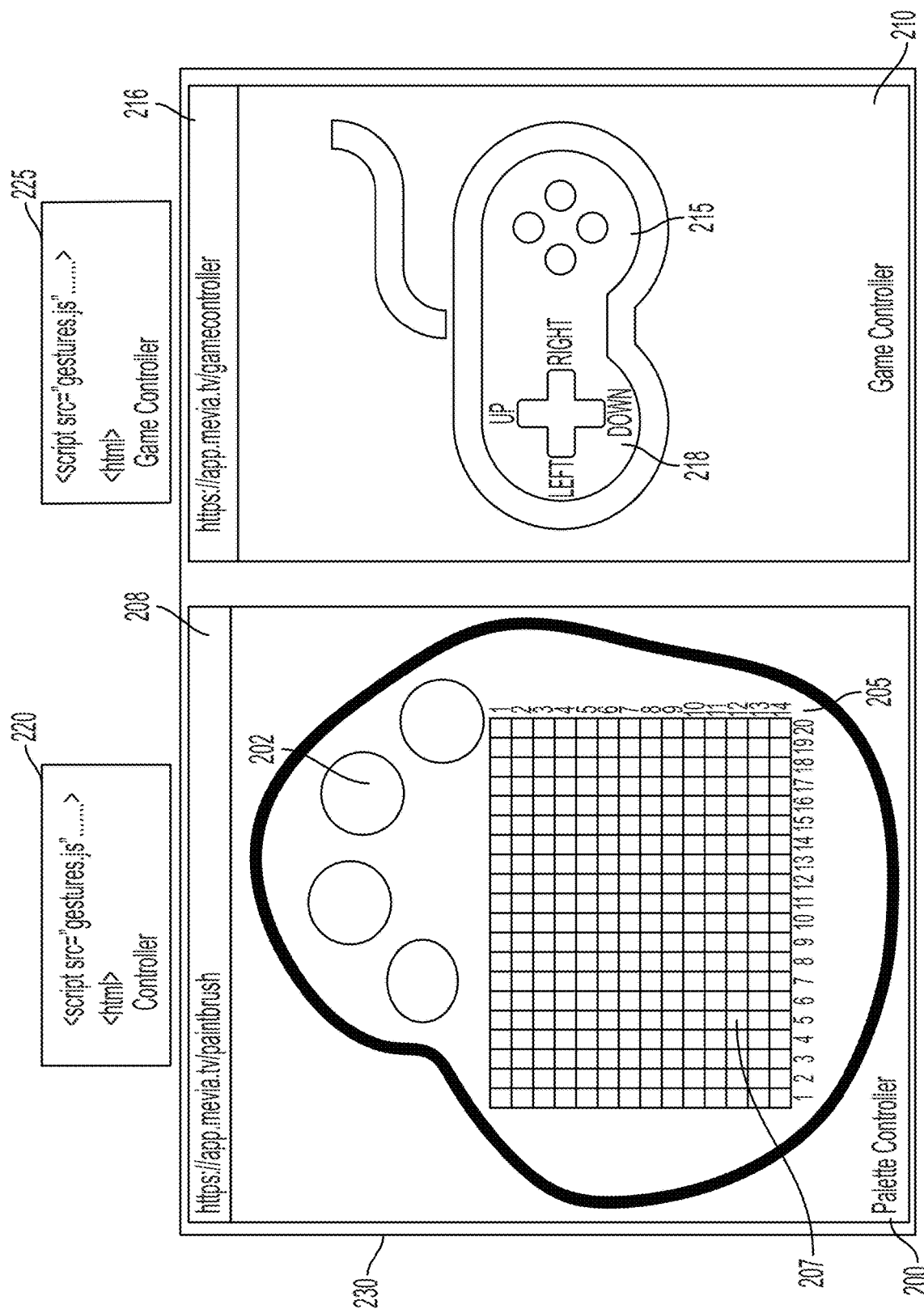
FIG. 2 is a diagrammatic illustration of exemplary embodiments of a controller for a paint palette and a game controller for the architecture of FIG. 1.

FIG. 2 provides exemplary embodiments of representations of interfaces of physical user input devices being displayed by a browser executing on a computing device. For example, a palette controller 200 and a game controller 210, are displayed on computing device 230. Computing device 230 may be any type of stationary or mobile computing device, including a mobile computer or mobile computing device (e.g., a smart phone, a laptop computer, a notebook computer, a tablet computer such as an Apple iPad™, a netbook, etc.), a wearable computing device (e.g., a smart watch, a head-mounted device including smart glasses such as Google® Glass™, etc.), or a stationary computing device such as a desktop computer or PC (personal computer).

As shown in FIG. 2, palette controller 200 contains a grid 207 to map the display, as well as other commands shown in 202 that may be associated with JavaScript source code and libraries. For example, palette controller 200 may emit touch start, touch end, touch move, as a user touches grid 207 with a pen stylus or a finger. To help illustrate, x=100, y=200, touch start can be generated, and sent in a message to a drawing web application. In some embodiments, this is being tracked by gestures.js 220 which is the script that detects all gestures. At the same time, the receiving application will process those events locally and complete processing, for instance, as x=200, y=400, touch end event has been detected in grid 207 or has touched the area on palette 205. Additionally, in some embodiments, a controller can also associate JavaScript elements to be sent as a message, for example a jQuery command such as "$('#button').click( )" where the button is a remote HTML tag associated with HTML such as <button id="button" . . . . /> in the web application that is being controlled.

The controller may issue the messages and events that are passed to the device connect platform, where a content router will then process all events and messages and direct them to the proper application that has included mevia.js as part of its libraries. The events generated by the representation of the controller are directed to the web app that is displayed on the television.

To help further illustrate, as depicted in FIG. 2, when a user types the link or loads Uniform Resource Locator (URL) 208, https://app.mevia.television/paintbursh/, associated with palette controller 200, palette controller 200 is displayed on a web browser executing on computing device 230. In some embodiments, a input user device may be associated with a particular application and all events, keyboard messages, hand gestures, accelerometer readings, are passed or emitted to a WebSocket command that encompass the following JavaScript Object Notation (JSON) object, for example:

Message = { evt: Type of event (e.g. "touch start", X: position X, Y: position Y}

As these events are captured by the gestures.js library, which is located and loaded as part of the HTML of the controller, many other events can also be triggered, such as swipe right, swipe left, swipe up, and swipe down at the local level at the mobile device. These basic touch events (e.g. touchstart, touchmove, touchend) are processed and used to generate a message.comand or a message.evt="Command." In this case, a JSON message will contain the following structure:

Message = { evt: Command, Command: "Swipe Right"}

A swipe right event can be detected using multiple methods including arithmetic comparison of touchstart and touchend, x and y coordinates, as well as using k-nearest neighbor (KNN), a neural network, or other machine learning techniques.

Assuming that touchEndX and TouchStartX are created and a function "AbouttheSame" indicates that two touchevents are very close to each other, the following JavaScript code will generate a Swipe Left and a Swipe Right event:

```
if (touchendX <= touchstartX && abouttheSame(touchstartY, touchendY, 80) ) {
    console.log('Swiped left');
    sendCommand("Swiped left", x, y);
} else
    if (touchendX >= touchstartX && abouttheSame(touchstartY, touchendY, 80) )
{
    console.log('Swiped right');
    sendCommand("Swiped Right", x, y);
} ....
```

In a different scenario, a gesture could signify "Tap" or "Double Tap" and represent "Enter" or selection as a standard application. The interpretation of such commands is then fetched in a database of device connect platform 100, where a certain Application Identifier (AppID) will have a different behavior than others. For example, a "Long Tap" could be mapped to a jQuery command or a standard HTML command such as document.QuerySelector, where $("#slider").goto(1), or send a slider JavaScript widget to the first slide. Similarly, in a game scenario, a keyboard's up, down, left and right are mapped to icons or positions shown as part of URL 216, https://app.mevia.television/gamecontroller. When game controller is downloaded, the keypad 218 may contain standard game functions as well as "macro" commands 215 that are associated with one or several JavaScript messages that are being executed remotely at the web application in control. For example, for Doorbell 120, a "Long Tap" (e.g. pressing the screen for four seconds) may mean close the door, whereas a short tap may mean open the door. The specific functionality is identified and can be changed in real-time as users are pressing and interacting with the controller, depending on how the behavior is established by those controllers. In some embodiments, gestures.js 225 is tracking any gestures detected.

Figure 3:
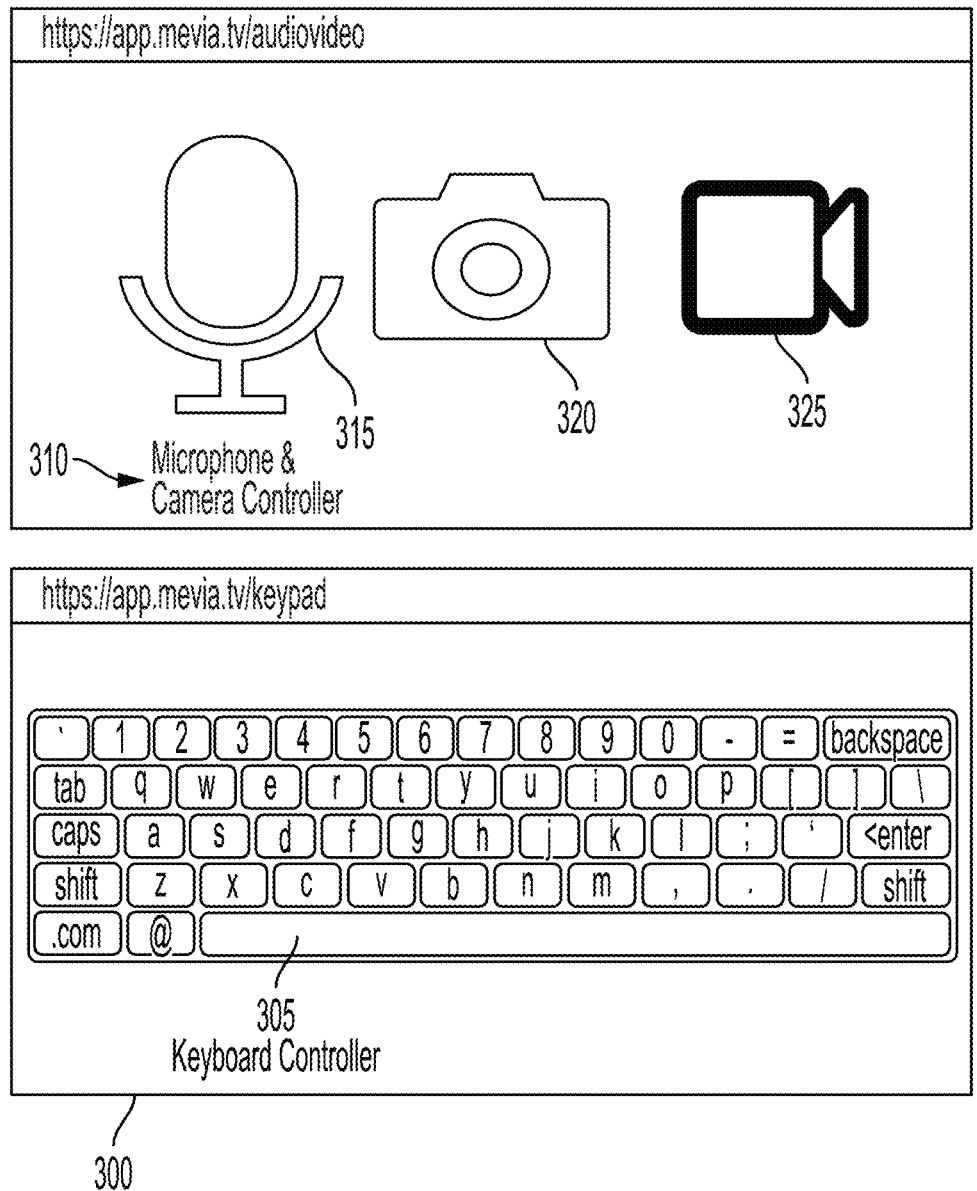
FIG. 3 is a diagrammatic illustration of exemplary embodiments of a controller for a keyboard, a camera, and a microphone for the architecture of FIG. 1.

FIG. 3 provides other exemplary embodiments of representations of interfaces of physical user input devices being displayed by a browser. For example, FIG. 3 depicts a microphone and camera controller 310 including microphone 315 and cameras 320 and 325, which are available in HTML5 in more recent browsers. These controllers when used could be combined with a WebRTC message and draw on a remove <canvas> HTML object or be used for transmission of voice in a voice chat application, for example, when using a video conferencing client application:

Message= { evt: Audio or Audio + Video or Video Payload: base64 image or webRTC socket to a canvas}

A remote website that expects a user to open a web browser and authorize the use of a WebRTC camera or audio should be able to stream to device connect platform 100 the contents of the real-time video and audio processing or process a sequence of screenshots captured from the camera or audio snippets. FIG. 3 also depicts a keyboard controller 300 and messages sent from a keyboard tap at 305 which may be interpreted as:

Message = {evt: KeyBoard,
Value: "SpaceBar" }

Therefore, the embodiments disclosed herein show how to process events, multimedia, and macros that are captured from a controller and how those macros are handled by a receiving application.

Figure 4:
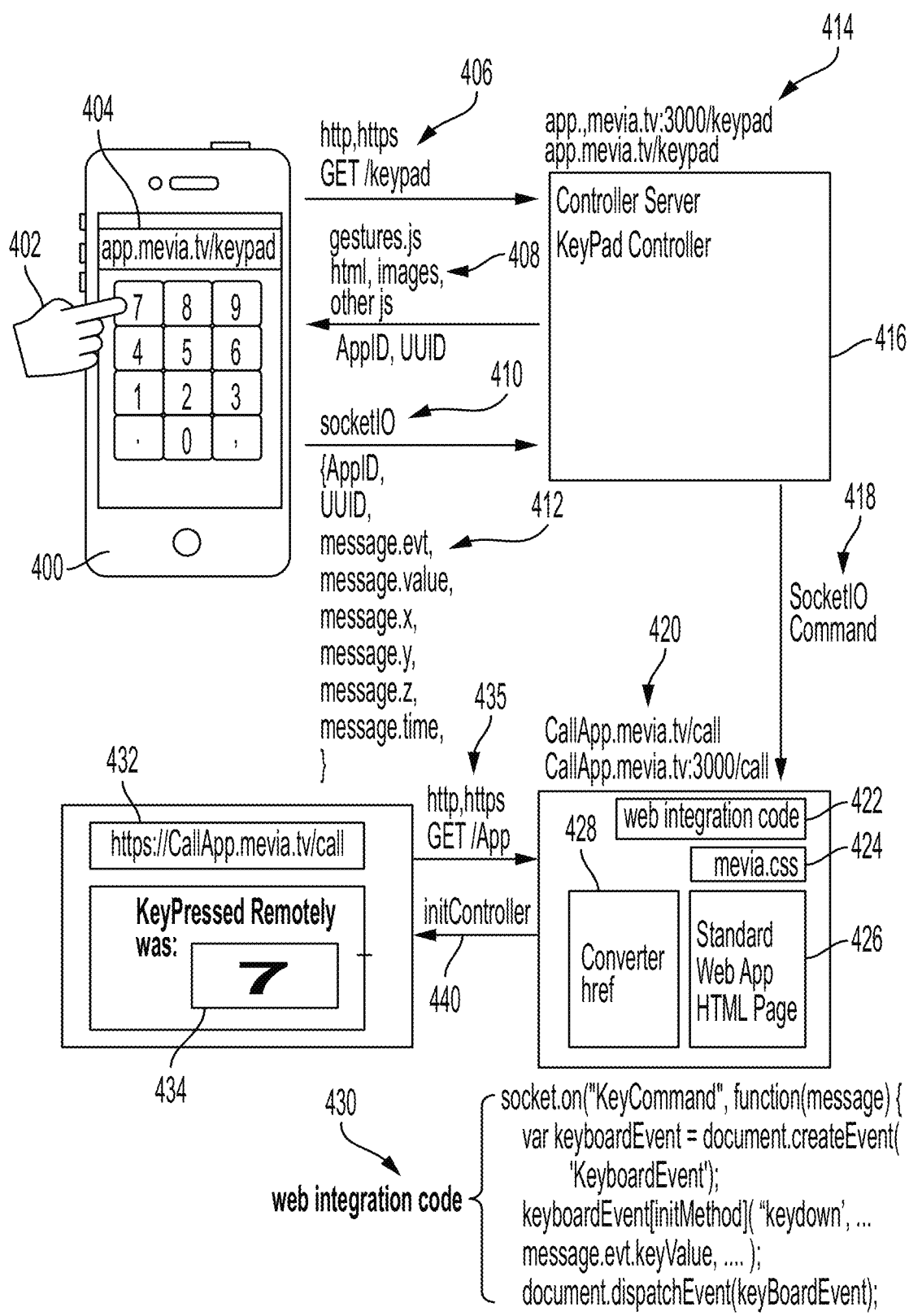
FIG. 4 is a diagrammatic illustration of exemplary embodiments of a client and server architecture and messaging using SocketIO and WebSockets and interaction with smart televisions for the architecture of FIG. 1.

FIG. 4 depicts device connect platform 100 processing of a user interaction with a representation of a user input device displayed on a computing device. More specifically, FIG. 4 depicts how a user handles a controller, in this example, a keypad 402. For example, the user touches keypad 402 at number 7, and the smart television will be updated to display the number 7. In order to achieve that, the controller, which is displayed on smart phone 400, is located at the URL 404 https:/:app.mevia.television/keypad. The keypad web-app includes multiple HTML/CSS objects with images including mevia.js and gestures.js. In FIG. 4, the remote web application is located at URL 432: https://callApp.mevia.television/call. Both URL 404 and URL 432 are loaded asynchronously and do not need to be synchronized. However, in some embodiments, URL 432 may have been loaded first before URL 404 and is, for this example, ready to be used. As such, the target application may contain the HTML tags, "<input type=text id="callto"/>", which will be used to receive the keypad's input 434. Hence, the value in 434 is initially " " or empty. As the mobile device loads the controller via HTTP or HTTPS, the URL keypad at https://app.mevia.television/ 406 loads the gestures.js library, HTML, and images, as well as other JavaScript libraries information. The controller's URL also includes an application identifier (AppID) and UUIDs that are generated from device connect platform 100 to associate a user's events to the application, and those values are embedded in the response 408. The UUID value is unique and is used to represent a session key. The "AppID" or Application Identifier could also change and be used as "nonce" parameter but it is not necessary for this particular example.

The message.evt and message payload is created after pressing the key "7". A SocketIO session 410 is used to send the JSON message structure 412 that includes the following members: message.evt, message.value, message.x, message.y, message.z, and message.time (or timestamp), which provides position of the keypress event and its value. The message payload can be expanded to include other parameters. The keypad module can be rendered as part of a nodejs web application that listens to port 3000 and HTTPS port at 443, as shown at 414. Consequently, in FIG. 4, the KeyPad controller 416 will use the session and the SocketIO request 418 but instead of being message.evt=touchStart at t=0, and touchEnd a t=200 ms, the message is replaced by device connect platform 100 to a JavaScript command that is embedded as part of the payload, in the SocketIO Request to the web application with a "JavaScript libarry". The web application at step 420 receives message.evt=KeyPress, value=7 which is then processed by the CallApp.Mevia.television using SocketIO or Websockets (WS or WSS, for secured web sockets).

In FIG. 4, at the web application, the websocket is controlled by the mevia.js 422 and any CSS resources 424 are used to display and modify the HTML "<input type=text" id="callto">" field. By default the browser will send to the input screen with label "Key pressed remotely was:" and the value 7. The keypress is then transformed to a JavaScript "new keyboardEvent( )" with the "keydown" message, message.evt.keyValue. In this sequence of events, keypad 402 has effectively written over the remote screen a value of "7." The intervention of the "Content Router" entity is omitted for simplicity, and a simple socket.broadcast.too from SocketIO is used to show as an example how the value of "7" is transmitted from the phone to the application. In fact, other applications retrieving the same webpage, and hence all displays, smart televisions, tablets, or other browsers connected to the same page will see updates received by pressing a keypad from the mobile phone. Observe that updates on 434 occur asynchronously without a new GET request issued by the web browser at 432 but instead by a socket.on("command", . . . ) that triggered the keyBoardEvent that in turn simply updated the input screen had a standard keyboard connected over USB and as defined by the standard HTML page 426.

Additionally, the device connect platform server's macro converters 428 may require converting all references to local or remote assets (e.g. hypertext reference attribute (href) tag in HTML) in device connect platform application 100 to be converted from local to fully qualified domain name (FQDN) address. Even HTML tags related to "image src" or "<img src=""> html tag, and the path of the resource must be converted to facilitate the conversion of a standard web application to a device connect platform application. For example, an asset loading from the standard HTML a URL without a FQND <image src="myimage.png"/> may be converted into <image src="https://callApp.mevia.television/call/images/myimage.png"/>. This conversion permits the use in cloud-based systems and access to CDN's that facilitate NodeJS processing. Additionally, cross-origin resource sharing (CORS) or cross origin sources must be configured to facilitate loading resources from other Uniform Resource Identifier (URI) or URL other than the original FQDN even with the same FQDN but executing from a different port. The element 430 in FIG. 4 shows how using SocketIO a keyboard is delivered to the Mevia application by dispatching a KeyBoardEvent to the main Document Object Model (DOM) element document. Similarly, the controller can be initialized depending on what application is being used, for instance switching from a keyboard to touch interface. An "initController" message triggers a mobile terminal to initialize and load a new or different controller or simply the current controller is reinitialized 440. During this initialization process, authentication keys can be re-issued and payment information can be collected to the user. In one embodiment, a payment request can be made from a service such as an online payment system or collect token information using the end-user's software cryptocurrency wallet account such that the use of the device as a controller is not free.

Figure 5:
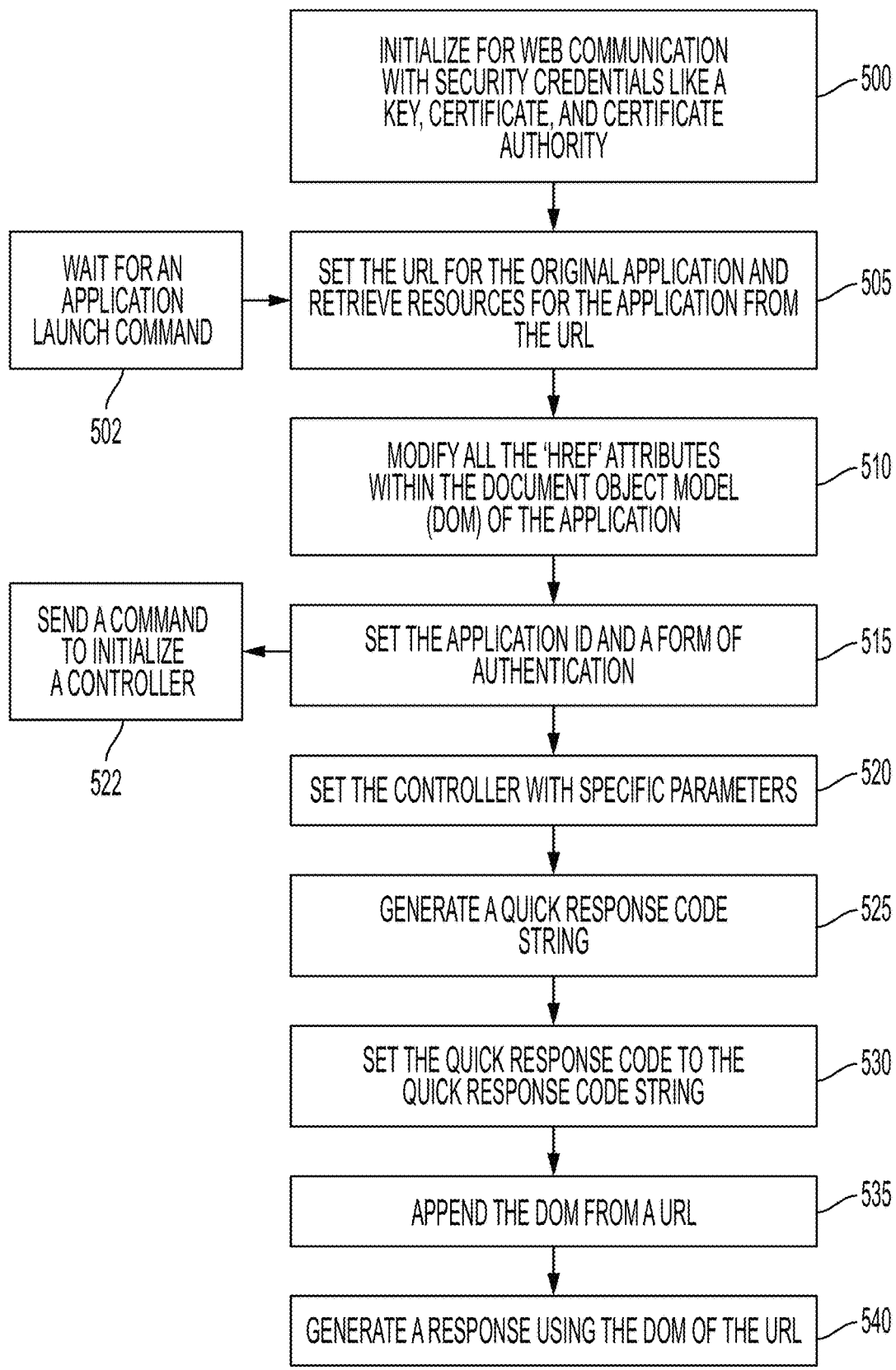
FIG. 5 is a flow chart for an exemplary embodiment of a method to enable a server-based interface to serve a smart television in the device connect platform architecture of FIG. 1.
Figure 6:
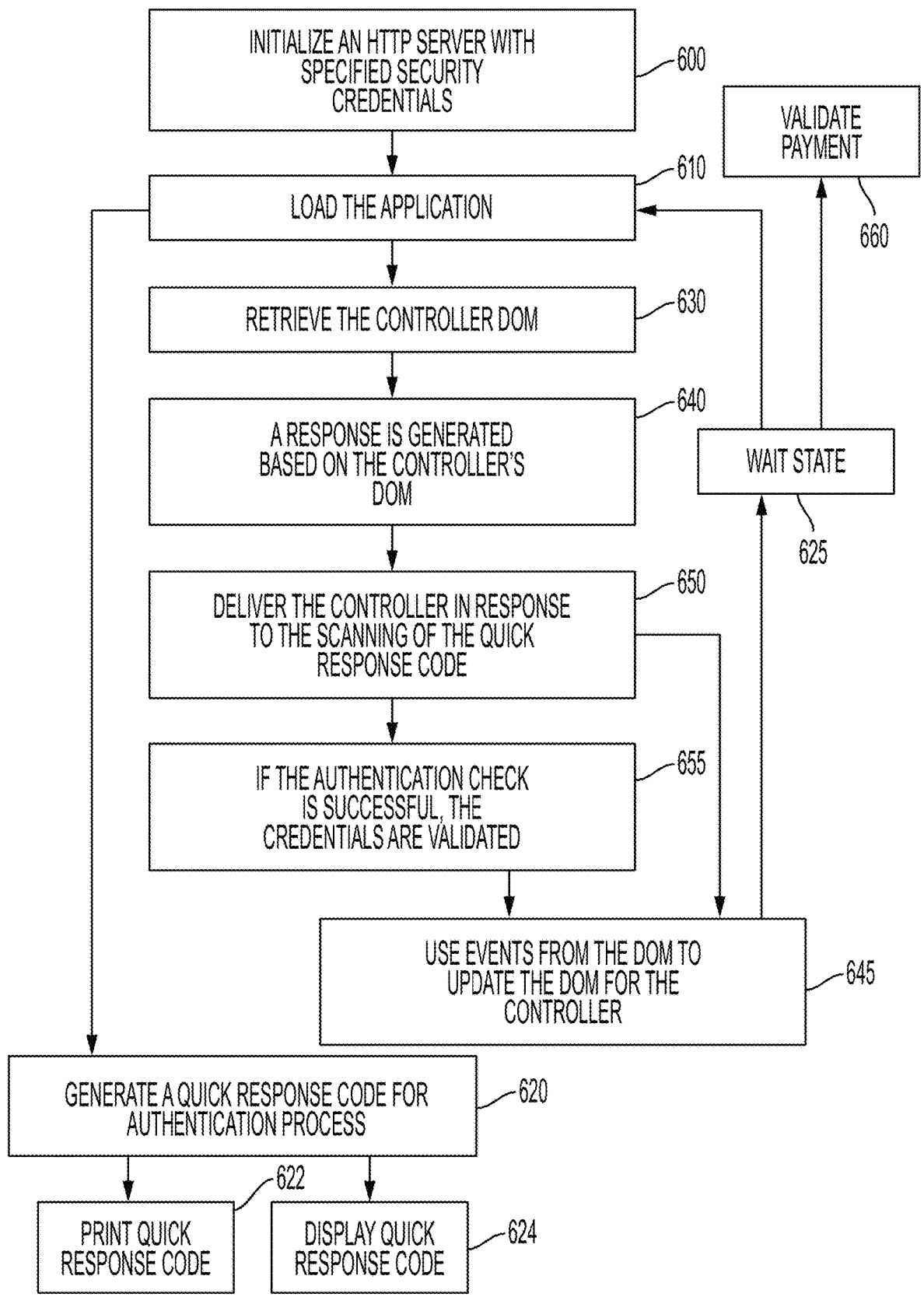
FIG. 6 is a flow chart for an exemplary embodiment of a method to enable a server-based interface to server a controller for a device connect platform application

The exemplary methods for enabling a server-based interface to serve a smart television by the device connect platform architecture, are shown in FIG. 5 and FIG. 6. More specifically, FIG. 5 depicts how mevia.js loads and how it is used to display a smart television, while FIG. 6 shows the controller interface that is loaded by a user to a mobile phone to control a smart television. First, at step 500 in FIG. 5, initialize for web communication with security credentials like a key, certificate, and certificate authority occurs. For example, Secured Socket Layer (SSL) is used where a private key, certificate, and a certificate authority files are loaded as part of NodeJS session for WebSocket Secured (WSS) transactions. This process starts WebSockets at a certain port (e.g. Port 3000) secured, and enables the use of HTTPS-based resources (e.g. load images, CSS, etc). At next step 505, the URL for the original application, which will be used to interact with the application is set and all resources for the application from the URL (including HTML, CSS, images, and JavaScript) are retrieved. To help illustrate, a JavaScript game can be loaded from the original link, and then as part of the same procedure all other assets are loaded into the DOM for a particular HTML page. Once the DOM tree is initialized, the web application for the game is modified to add mevia.js, mevia.css, and other elements that can be added dynamically by using dom.append(..) or dom.appendChild(..). At step 510, the 'href' attributes within the DOM of the application are modified, including redirecting links or adjusting resource paths. At this step, the DOM can add the mevia.js file, mevia.css, and modify all "href" values required for the application to work. For example, if the game makes references to images, fonts, and other resources in the original HTML are pointing to a local reference, they can be modified to a server plus path references. At step 502, another path to initialize an application is performed. For example, step 502 involves an initial state waiting for an application launch command with a specific application ID. To help further illustrate, an application via the "LaunchApp" command using the AppID or application identifier that could be associated with a menu to launch another application. At step 515, the application ID, such as a UUID, and some form of authentication, such as token or key are set. For example, once the device connect platform application's HTML has been updated, a device connect platform object is set to AppID, UUID, and any potential authentication requirement (e.g. biometrics, user and password authentication, certificate-based authentication e.g. 802.1X, PKI, and other Private/Publick Key authentication).

At step 522, a command is sent to initialize a controller. For example, an "InitController Command" may in fact be issued by the device connect platform infrastructure and sent to a particular controller. The initController command may load new authentication requirements that are being imposed as part of the process to load a particular controller. For example, a controller may be "disabled" until authentication is completed. This authentication can be added to the DOM as part of a controller as mevia.js modifies the DOM to evaluate JavaScript macros. The authentication may require a particular user at a controller level to enter username and password. In some embodiments, a controller may request a payment portal and other payment portals include web widgets, like "Pay now" button, for controllers that require a method of payment or when a subscription to a particular service is past due.

Following authentication, at step 520, the controller is set with specific parameters. For example, the parameters may include 'KeyPad' and 'Video' which are types of input for the application. In some instances, a keypad 12-key pad (0, 1, 2, 3 . . . #, *) or a Character keypad. To help further illustrate, the device connect platform application or web interface will proceed to load assets including HTML, JavaScript, CSS and images for the application being displayed into a smart television or any display in general. The application is associated with a controller, and there are several standard controllers that can be implemented using HTML. The device that will control the smart television could be a touch interface that can then be controlled with a mobile phone for a keypad, a keyboard, a gesture-drive interface, and other types of one or several controllers that will be loaded by a user attempting to interact with the device connect platform application. Once a controller is defined, it is set to be initialized, which could have been completed via the "initController" command that is being sent to the controller at step 522.

Additionally, at step 525, a Quick Response (QR) Code string may be re-generated using AppID, UUID, and region or any other session value and stores as part of "qrcodeStr" value. This "grCode" value can also be a "fingerprint" for the stream being displayed that can be used later for matching this fingerprint with a visual way to retrieve the same fingerprint and do a match.

At step 530, the quick response code (QR Code) is set to the quick response code string. For example, the QR code may also be maintained constant for large periods of time, and at the device connect platform infrastructure, simply when a HTTP GET/POST request is made with the contents of the QR code will be remapped accordingly to any other application, service, or interface that has been directed to. However, for public places a QR Code might be dynamic and regenerated after a timeout has been detected. It is known that a web interface can simply show a QR code as an image in PNG, JPEG, or even as a PDF format and that can be printed by the end-user that is owning a smart television, or dynamically change it to be displayed and shown at the smart television screen.

This QR Code has a link that can have embedded session identifiers (Session IDs), location identifiers (Location IDs), and other parameters that are associated with a particular controller associated with the device connect platform application screen being displayed at that location. At step 535, the DOM is appended from a URL to the current DOM. For example, once step 530 is completed, the output to the DOM of the device connect platform application is updated at step 535. At step 540, a response is generated using the DOM of the URL. For example, once a response is requested such DOM is sent as a reply to an HTTP GET request at step 540. A smart television can be provisioned via a web-page loaded, with the mevia.js library and/or gestures.js, that points to the device connect platform's web application interface, or can be part of a native application for a smart TV (e.g., Android television, Google TV, LG's Operating System (LG WebOS), Apple television, Samsung's Tinzen platform) or simply by loading the webpage in the television's web browser.

FIG. 6 demonstrates how initController and a new controller is loaded into a mobile device or any client computer that can load HTML web pages. At step 600, an HTTP server is initialized with specified security credentials (e.g. key, certificate, and certificate authority). For example, the controller requires the initialization of the server including certificates, private keys, and certificate authority bundled are loaded. At step 610, the application is loaded (e.g. with the provided AppID, UUID, and authentication details, e.g. authentication context). For example, the device connect platform context is loaded as part of device connect platform application and the LoadApp API that includes a UUID that can be generated as part of the initialization process, AppID that maps applications to resources, and any authentication object that needs to be validated or has been validated by a controller accessing a Mevia application. At step 630, the controller's DOM or Document Object Model is retrieved from the device connect platform application. For example, the controller's dom object is initialized with HTML, CSS, images, and other JavaScript including loading the gestures.js, gestures.css, and other files required to load the controller. The libraries that handle events, such as touchstart, touchstop, touchend, keydown, enter, swipe left, and swipe right are part of the gestures.js file. All of this process is part of step 640, the meviaverse object generates a response in HTML, JavaScript, CSS, and other resources based on the controller's DOM. In this example, the controller loads gestures.js, gestures.css, and other related controllers, for example a 12-digit keypad Controller, a Joystick, or a Camera. As a result, then a user loads the controller as part of an HTTP response that was generated in the previous step 650 and loaded at the client's device DOM at step 650 which was generated by HTTP GET or POST request that was issued to retrieve such controller (e.g., HTTP GET/init/controller?keypad=12-digits. In other words, what gesture.js does is to create SocketIO commands and receive all types of events that are sent to the Mevia application target displayed at a particular smart television. The device connect platform can create logins, screens, and interfaces for payments, door control, videoconferencing, or bundles of applications that are displayed on smart televisions or other displays. Also steps 600 to 650 can be delivered to a mobile phone or tablet upon scanning a QR code associated with a particular smart television or display, as a response of the HTTP or HTTPS request to retrieve the appropriate controller e.g. https://app.mevia.tv/keypad. This page renders via the response command, all libraries, icons, images, and structure for the particular controller. By virtue of this controller, other controllers can also be loaded, for example, a camera controller can be generated by embedding into the QR Code https://app.mevia.tv/camera/, and the camera send WebRTC video to a server where the video will be recognized using Computer Vision tools or deep learning (e.g. LSTM Networks) to load another controlled based on the camera video input.

At step 655, if the authentication check is successful, then the credentials are validated. For example, the controller is displayed provided that authentication is known or a user has paid for accessing a controller, e.g. video game arcade.

At step 645, events from the DOM are used to update the DOM on the controller to reflect user interactions. For example, once authentication has been completed and a user simply operates and interacts with the controller and receives DOM events, and updates the DOM accordingly. To help further illustrate, switching a palette from red to magenta, will require a DOM operation to change color from "red" to "magenta" in the CSS style dynamically. At step 625, the device connect platform is in a wait state until the controller initialization process begins. For example, the gestures.js library expects as a command, at least "InitController" that enables a new controller depending on the experience. In some embodiments, a user may "Tap" or "Double Tap" on an application icon (e.g. a menu or slider, and launch a game) by creating an event and sending a message.command="Launch," message.appid=AppID or message.uuid=UUID that is related to the particular icon selected on the screen. A message.command "Launch" or "Start" may do two things, for example at step 502 in FIG. 5 is waiting for commands from the application, and load into the instructions (e.g. mevia.js) a new page using a web redirect to anew "URL" or modify the DOM, by replacing document.body html DOM structure and reload in HTML the object called document.body and other HTML elements including document.head, and other parameters with the HTML from the other web application being loaded.

In some embodiments, some applications may require authentication and, in that case, at step 620, the initController command is waited by the controller via gesture.js. For example, a QR code is generated with a specified timeout value for an authentication process. As part of FIG. 6, a QR Code can be displayed on screen for a few minutes at step 620 or at step 622 the generated QR code can be printed or displayed as part of a <DIV> or DIV HTML Tag that overlays over the Mevia application that is being displayed on the smart television or display under control at step 624. In some embodiments, at step 660, a payment may be validated if a payment is needed.

Authentication is optional to load or not any controllers using FIG. 6 at step 660, where ta payment validation may be required to load a particular controller. An scenario where this is useful will be at a parking garage, where the controller to open/close the gate will not be loaded to the user unless a payment has been made upon entering previously with a keypad controller, a vehicle's tag number. Indeed, the system allows a user to at a parking garage to control an LCD screen via loading a 13-digit keypad controller in their phone, and then converting the phone into a NFC reader (e.g. Apple Pay) to submit a payment associated with the TAG entered.

Controllers in the Device Connect Platform

Figure 7A:
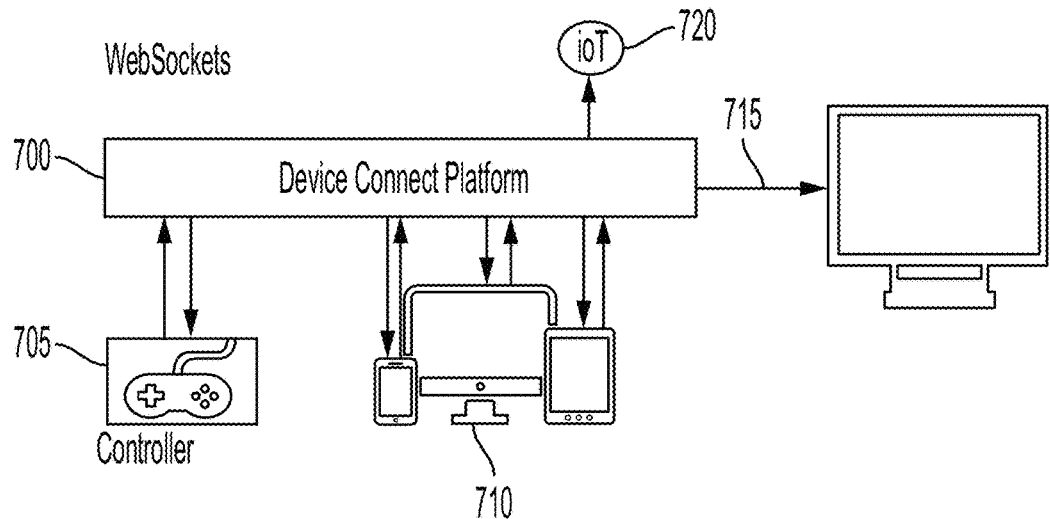
FIG. 7(a) is a diagrammatic illustration of an exemplary embodiment of a WebSocket architecture for communications.
Figure 7B:
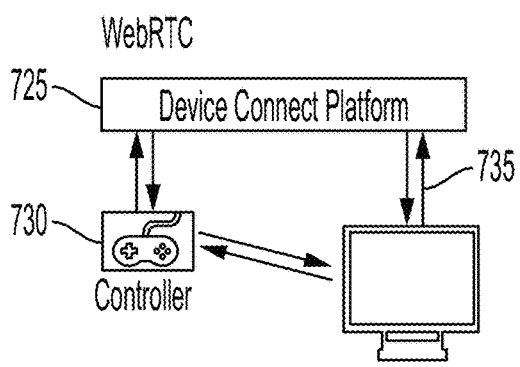
FIG. 7(b) is a diagrammatic illustration of an exemplary embodiment of a WebRTC architecture for communications.
Figure 7C:
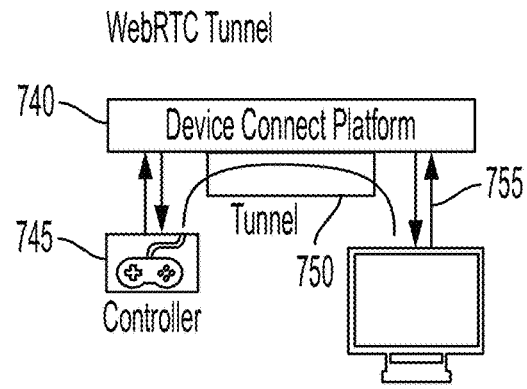
FIG. 7(c) is a diagrammatic illustration of an exemplary embodiment of a WebRTC w/Tunnel architecture for communications.

As shown in FIGS. 7(a)-7(c), there are three types of communications with SocketIO, a) using standard web sockets in FIG. 7(a) where controller 705 communicates with the device connect platform infrastructure 700 and sends commands and displays to the Internet of things (IoT) devices 720 and to smart televisions 715 or other displays that could include other tablets, LCD screens, and devices at 710. At FIG. 7(b), WebRTC can be used instead to establish a peer-to-peer communication between the controller 730 and the display 735 while the device connect platform is not in charge of routing packets from the controller device to the target display. FIG. 7(c) shows how a controller uses WebRTC but device connect platform 740 creates IP (Internet Protocol) Tunnels 750 between the controller and a display, where the controller 745 sends messages and events to those displays 755 using WebRTC over tunnels. These tunnels could also be GRE, GTP, IP in IP or other VPN tunnels that encapsulate IP traffic from one server to the next. WebRTC is a technology that allows Web browsers to stream audio or video media, as well as to exchange random data between browsers, mobile platforms, and IoT devices without requiring an intermediary. In some embodiments, the tunnel server is done via STUN/TURN servers on the internet (for example stun.eglacorp.com) and by setting those as part of the WebRTC service if needed.

Figure 8A:
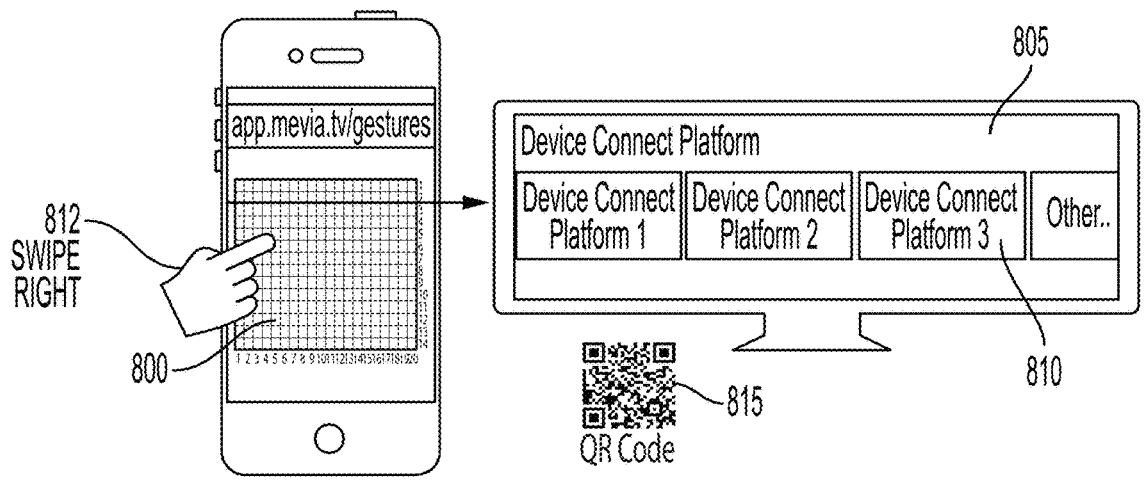
FIG. 8(a) is a diagrammatic illustration of an exemplary embodiment of a swipe-right-interaction to load a game controller and a game application of FIG. 8(c) serviced by the DEVICE CONNECT PLATFORM into a smart television.
Figure 8B:
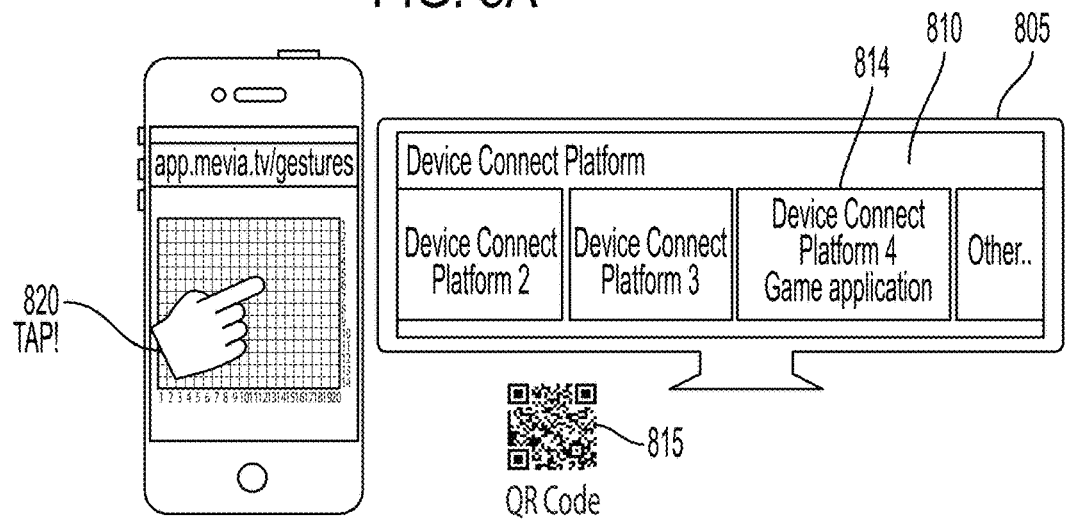
FIG. 8(b) is a diagrammatic illustration of an exemplary embodiment of a tap interaction to load the game controller and a game application of FIG. 8(c) serviced by the device connect platform into a smart television.
Figure 8C:
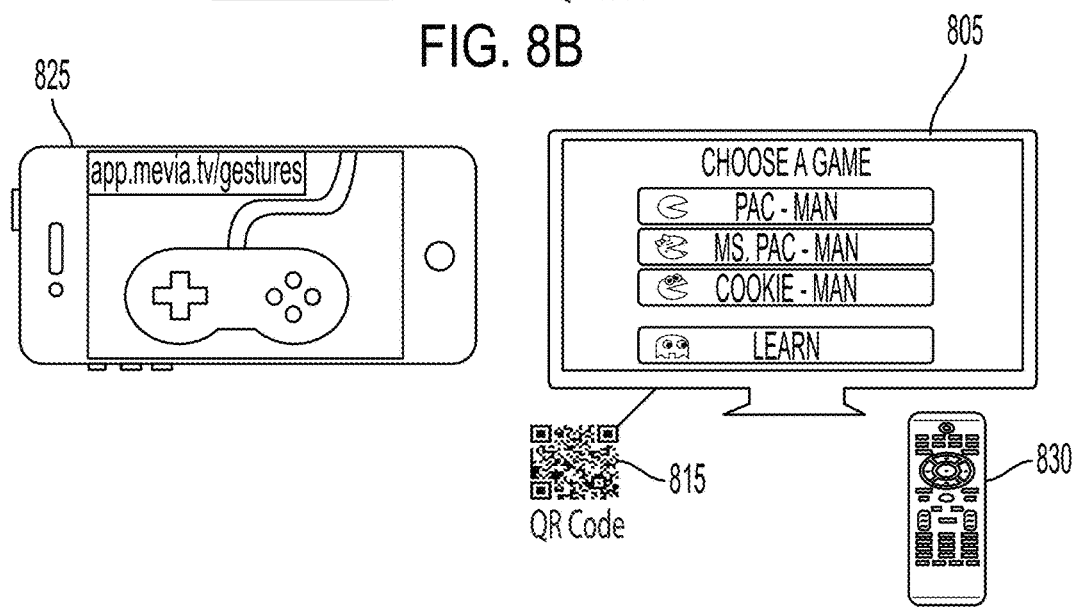
FIG. 8(c) is a diagrammatic illustration of an exemplary embodiment of a game controller and a game application serviced by the device connect platform for use on a smart television.

FIGS. 8(a)-8(c) show a use case on how a device connect platform application is launched by a user. First, at FIG. 8(a), a user 800 has scanned a QR Code 815 underneath a smart televisions 805. In FIG. 8(a), a slider 810 depicts several applications called Mevia App 1, Mevia App2, Mevia App3 and others. At FIG. 8(a) the user may proceed to execute "Swipe Right" 812 and a game application 814 is highlighted in FIG. 8(b). The only communication channel between the phone and the smart television is the Internet. As such, a user may proceed to "Tap" over the button associated with game application 814 that is also highlighted on the smart television as shown in FIG. 8(c). In some embodiments, the game web application may be written in JavaScript and run on a browser and has been modified to include mevia.js.

As a consequence, the initController command is issued to switch from a touch screen to a game controller 825 and allow a user to play the game application 814. To exit game web application, a user may press any part of the screen with "long tap" that is mapped to "Exit" and be returned to the previous menu application. As such, a new initController command and LaunchApp are issued and the previously used slider that was initialized was loaded as FIG. 8(c). At all times, any user can still send standard commands using smart television's remote control 830. In some embodiments, optimizations may be implemented for example using Redis or other caching modes, as well as handling optimized ways to load/unload applications. Redis can be used as a message broker to distribute and exchange events and messages from all controllers to displays, saving images, caching JavaScript files, and add caching to the device connection platform.

Figure 9A:
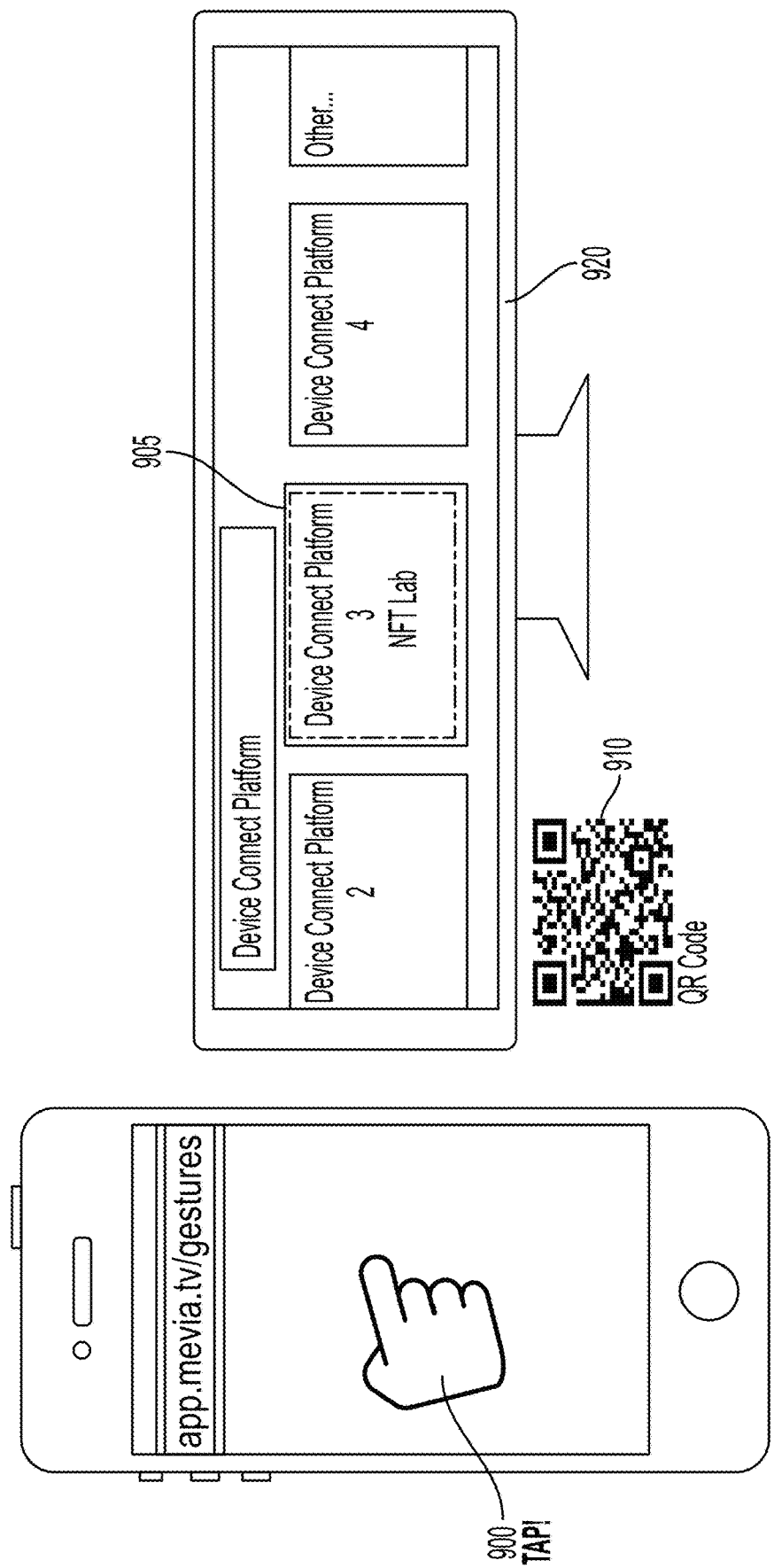
FIG. 9(a) is a diagrammatic illustration of an exemplary embodiment of selecting an application using hand interactions for a drawing application.
Figure 9B:
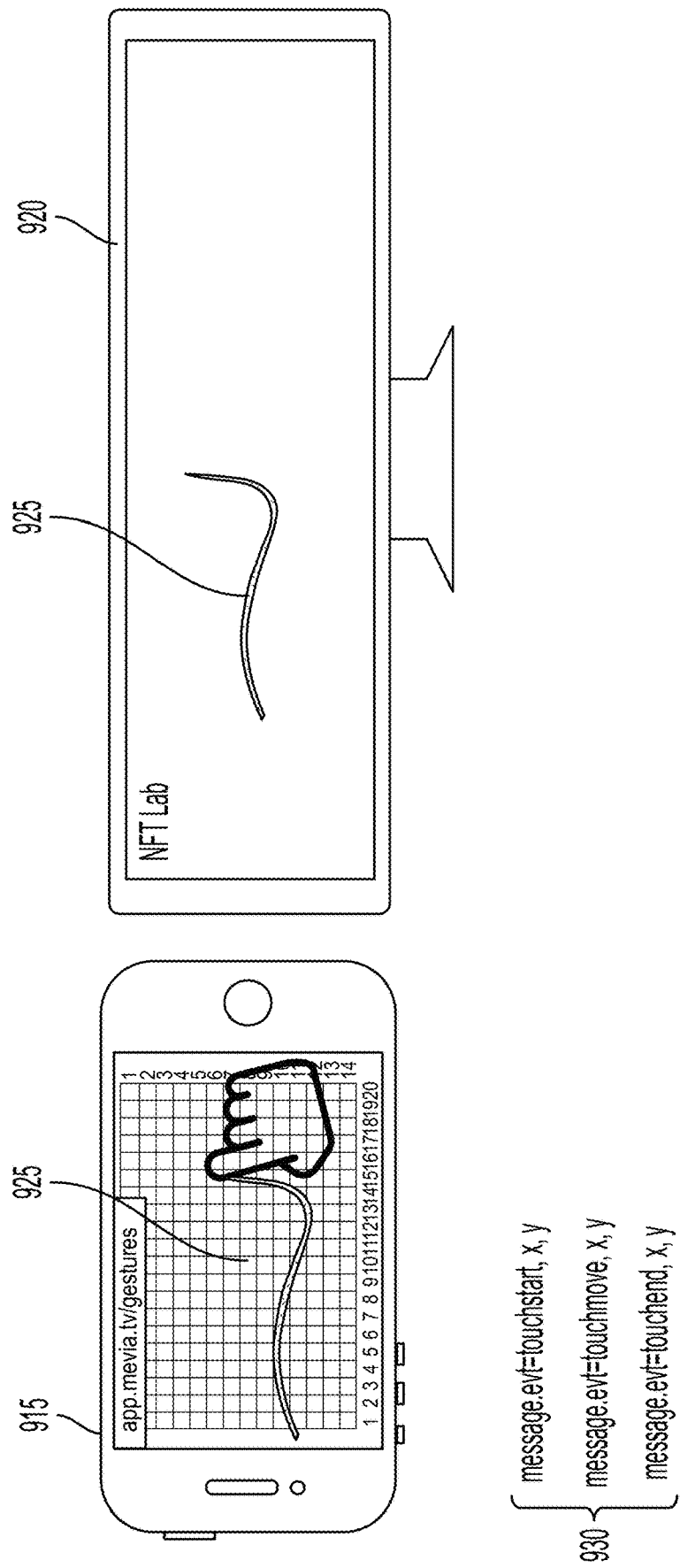
FIG. 9(b) is a diagrammatic illustration of an exemplary embodiment of a drawing interaction in the drawing application selected in FIG. 9(a)

FIGS. 9(a) and 9(b) shows another sample of a device connect platform application, a drawing program. A user can swipe right or left and find the NFT Lab application 905 on the screen. Upon selecting or generating a "Tap" 900, the DOM objects are updated at the smart television display and an "initController" command is delivered to the mobile terminal where a "palette" controller 915 is then loaded into the mobile device or tablet. Once a palette controller 915 has executed (e.g., window.onload( ) method), touch events are converted to messages, such as message.evt is touchstart at certain (x, y, z) coordinates, touchmove, message.evt is touchend to a certain x, y, z position 930. For some cases, z might be equal to zero, as most user interfaces are 2D, while for those where 3D user interfaces are created the z-axis will not be zero. As shown in FIG. 9(b), the user's interaction 925 with palette controller 915 is displayed on smart television 920. In some embodiments, QR code 910 may be used to prompt the loading of palette controller 915 on a mobile device.

Figure 10:
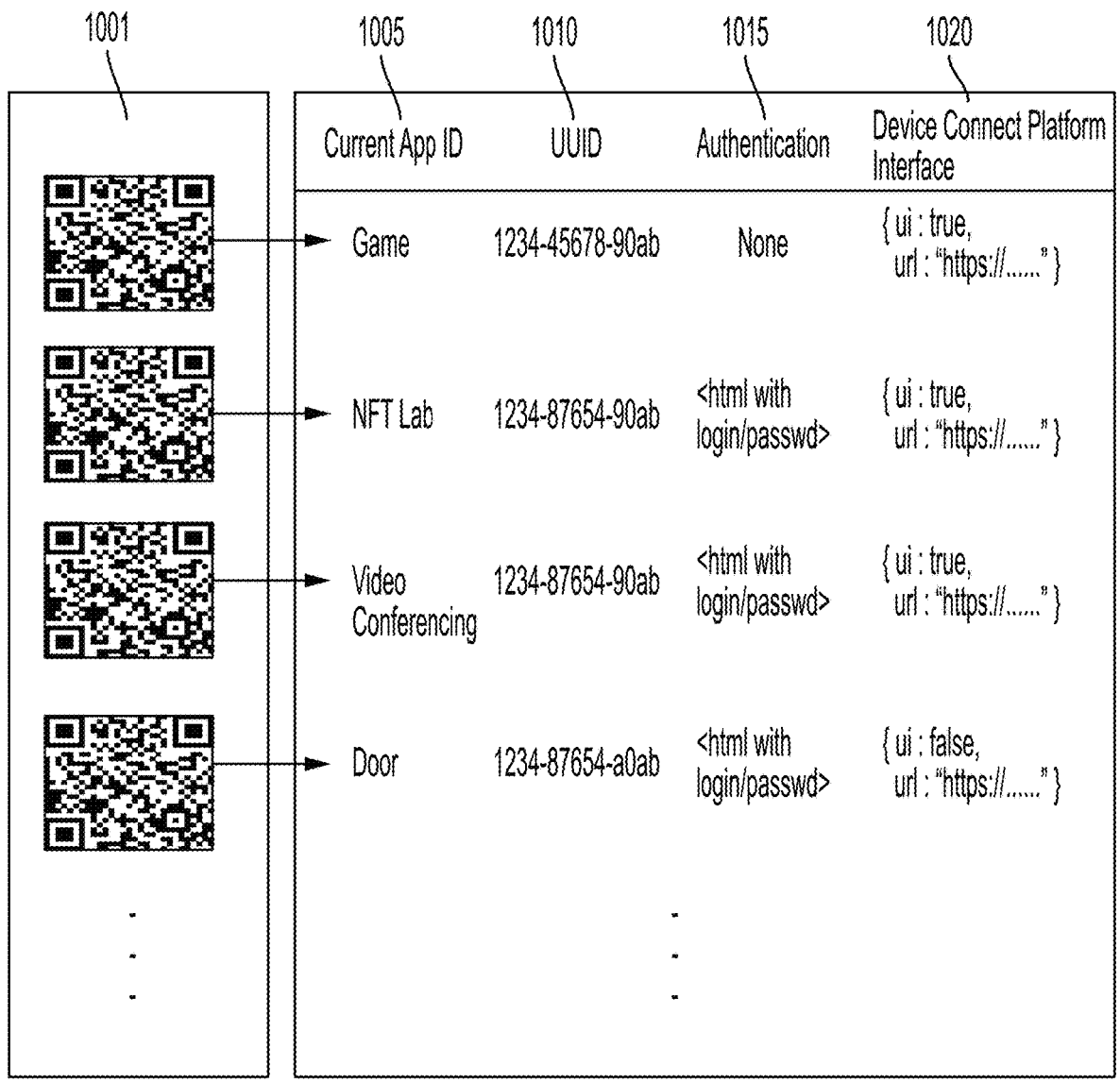
FIG. 10 is a diagrammatic illustration of an exemplary embodiment of mapping QR codes to applications and device connect platform interfaces to load.

Each smart television, display, or sensor is associated with a QR code that is used to load the controller. As shown in FIG. 10, a database with a list of QR Codes 1001 are stored in a database and application identifiers 1005 and application names, and UUIDs or sequence of UUIDs 1010 are mapped to each application name in use. A loaded application may not require certain types of authentication 1015, such authentication may include using biometrics through the mobile video controller using WebRTC or using API's navigator.mediaDevices.getUserMedia which can be used for biometric authentication. Each QR code may also be associated to an application URL (which is served by a webserver either using HTTP or HTTPS protocols) or a device connect platform interface 1020 that may include mevia.js, mevia.css, and other resources to communicate events to the applications loaded via the QR code.

Figure 11:
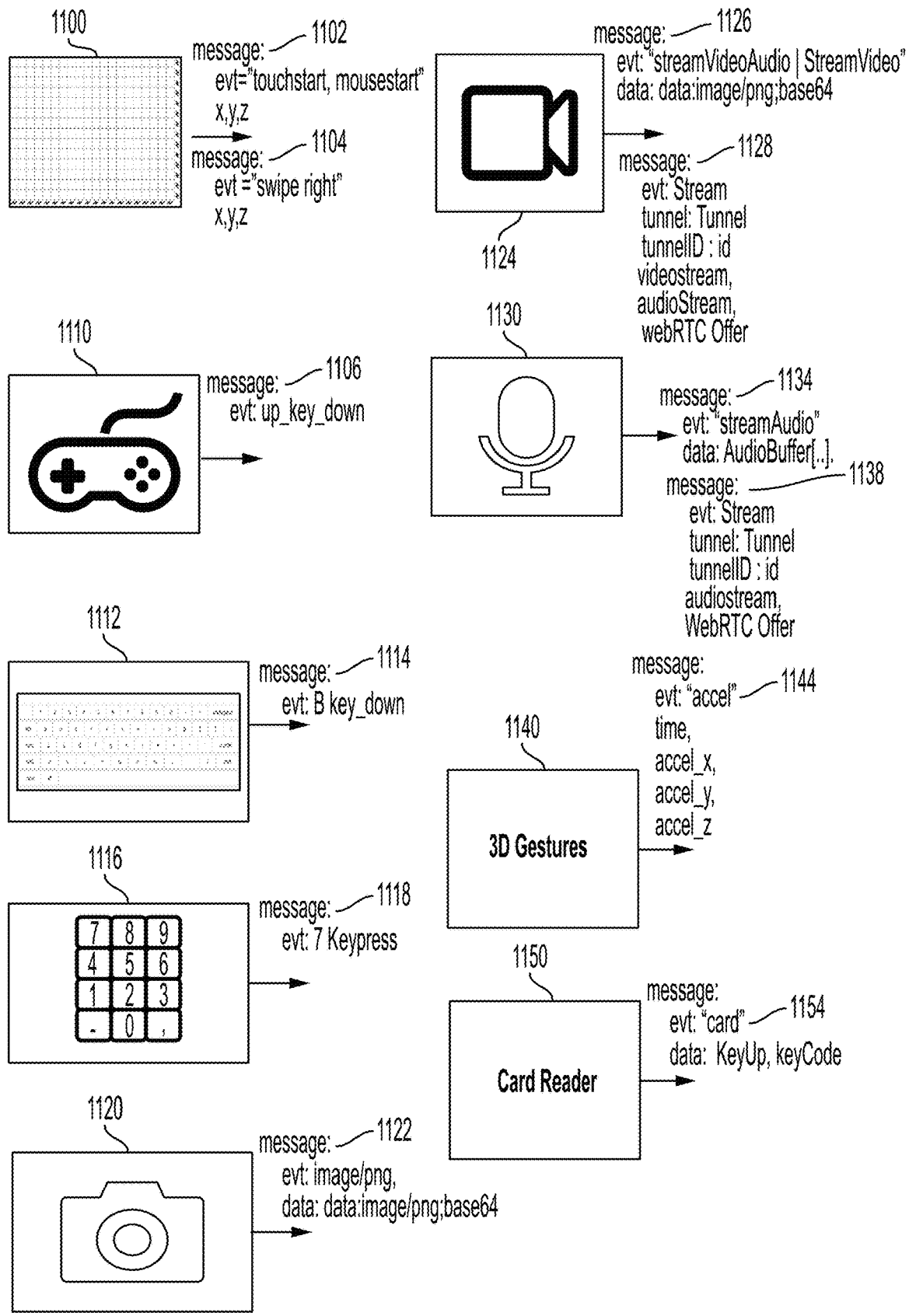
FIG. 11 is a diagrammatic illustration of exemplary embodiments of controllers used in device connect platform applications including touchpad, video, controller, audio, keyboard, 3d gestures, phone keyboard, card reader, and imaging.

As indicated, there are several types of controllers that can be loaded individually or as part of a bundle of three or more controllers. FIG. 11 shows the types of controllers that the device connect platform supports. A touch controller 1100 provides touch events as well as simulated mouse events to the device connect platform applications. The touch events are known and defined by HTML5 specifications; hence this controller can emit timestamp, touchstart, touchend, touchmove 1102 or a combined set of events can turn into a command as "Swipe Right" 1104, together with a timing value. In some embodiments, the controller could be a game controller 1110. Controllers may also include haptic feedback which could be part of the InitController command message, by adding an asynchronous message HapticController command that can then be delivered to the control to simulate vibrations or haptic feedback on the mobile phone or tablet. As a result, game messages are generated and sent to the application being controlled 1106, for example Up key, Down key, and respective timestamps. Game developers can also assign sequence of keys to movements or macros within a game that are generated by the device connect platform server's macro converters 428 in FIG. 4. In some other embodiments, an Augmented Reality Headset (AR) device will be used to handle head gestures and its own controllers to create virtual overlays of those controllers that will appear in the field of view of the AR headset.

For example, a developer may implement a function called "abouttheSame( )" that returns TRUE as a user has tapped approximately close to the position of between a touchStartX and touchEndX as well as touchStartX and touchStartY such that:

```
function abouttheSame(a,b, thres=20)
    If Math.abs(a−b)<=thres then true else false;
...
if (abouttheSame(touchstartX, touchendX, 25) && abouttheSame(touchstartY,
touchendY, 25)) {
        if count_number_of_taps=1 within a delta_time of 500ms then Tap;
        if count_number_of_taps=2 within a delta_time of 250ms then
DoubleTap;
        if count_number_of_taps=1 within a delta_time of 3000ms then
LongTap;
        if (mouse_move) reset_all_timers( )
}
```

The exemplary pseudo-code indicates that a Tap, DoubleTap, and LongTap can be detected by tracing the events and position of the finger on screen. The thresholds can change depending on the application and in some cases game developers will know that those events can be detected using digital signal processing filter or with training using machine learning models as presented in FIG. 11.

Other controllers that can be used with the device connect platform and include a camera or capture device 1120. For example, once a picture has been taken a base64 image/png or image/jpg 1122 is then submitted as part of the messaging system to the device connect platform. Some other messages may include bar code information. If that is available locally on a device or has been made available as part of the controller interface by using a BarCode SDK from Dynamsoft or could be performed directly by the web application running meva.js.

As depicted in FIG. 11, camera 1124 and microphone 1126 can be used to capture live camera feeds, camera stills, and audio generated from the mobile device or tablet. These controllers can emit as messages, with sequence of images captures via WSS or WebSockets that can include audio buffers or image stills from the camera. In other embodiments, the camera and the audio/microphone can be delivered via WebRTC 1138 that can either be natively tunneled via an IPinIP, IPSec or any other tunnels created by the device connect platform or use a standard STUN/TURN server (e.g. stun.eglacorp.com). This information may be collected by the controller via the "initController" command or created real-time depending on how the device connect platform application is being controlled. In the event that video is not present, the message.evt will describe "StreamAudio" event and a remote WebRTC socket is opened to interact with an audio tag at the receiver, for those voice-only applications (e.g. walkie talkie, push to talk) for example. In some embodiments, for multimedia, audio, and video applications, a "videostream, audiostream" can be composed for example using WebM encoder for video and Opus encoder for audio, using Websockets or WebRTC PeerConnection JavaScript API 1128.

In some embodiments, video and audio codecs could require additional transcoding or encapsulation in other messages, and could include emulation as a Universal Serial Bus (USB) device for native applications or non-web applications that expect a USB identifier (USB VHCI Root Hub) for which a USB device emulator that wraps WebSockets or WebRTC traffic for those native applications requiring it.

Another controller that can be used with an application in the device connect platform that is a "3D Gesture" generator that emits the "accel" event 1140 and accel_x, accel_y, accel_z elements. In general, a timestamp can be added to the accel_x, accel_y, accel_z payload, and the sampling rate for these events is set by the InitController command, but it will depend on the device being used if time intervals are set to zero, and time delays are required to compute gestures. This function can be implemented in HTML5 browsers by issuing the windows.DeviceMotion event that can then be captured in a callback as follows, window.addEventListener ("devicemotion", updateData) where:

```
function updateData (e)
    var acc = e.acceleration || e.accelerationIncludingGravity;
    accel.push({t:delta_time, x:acc.x, y: acc.y, z: acc.z});
    if len(accel) == N:
        XMLHhttpRequest(accel);
        accel=[ ]
```

The acceleration information is then captured in the "accel" array that contains delta_time or time in milliseconds between samples, accel.x, accel.y, and accel.z are accelerator values of x, y, z coordinates that is then forwarded to a neural network or any machine learning interfaces to be compared with learning data as shown in FIG. 11. As such, gestures like UP, DOWN, SWIPE RIGHT, SWIPE LEFT, TAP, EXIT, and other can then be learned and mapped to a particular user's profile or a generic user profile with trained information stored in the device connect platform.

All those message.evt commands are sent over to device connect platform to the content routing module (depicted in FIG. 21) that determines what the appropriate route for the packets is and events generated from one controller or several controllers required for a particular application.

Other controllers could be a USB card reader 1150 emulator that can be connected to a mobile device 1154 (e.g. stripe reader). In those cases, custom messages can be created and sent via message.evt traffic to the content router and translated appropriately to handle JavaScript messages or events to be sent to a remote website. For example, Near Field Communications (NFC) could read an NFC card and that information sent via a message.evt value with an NFC card payload, which could be translated as a keyboard set of commands or classified as custom event with a particular JSON payload that can be made available as part of the web application interface.

Figure 18:
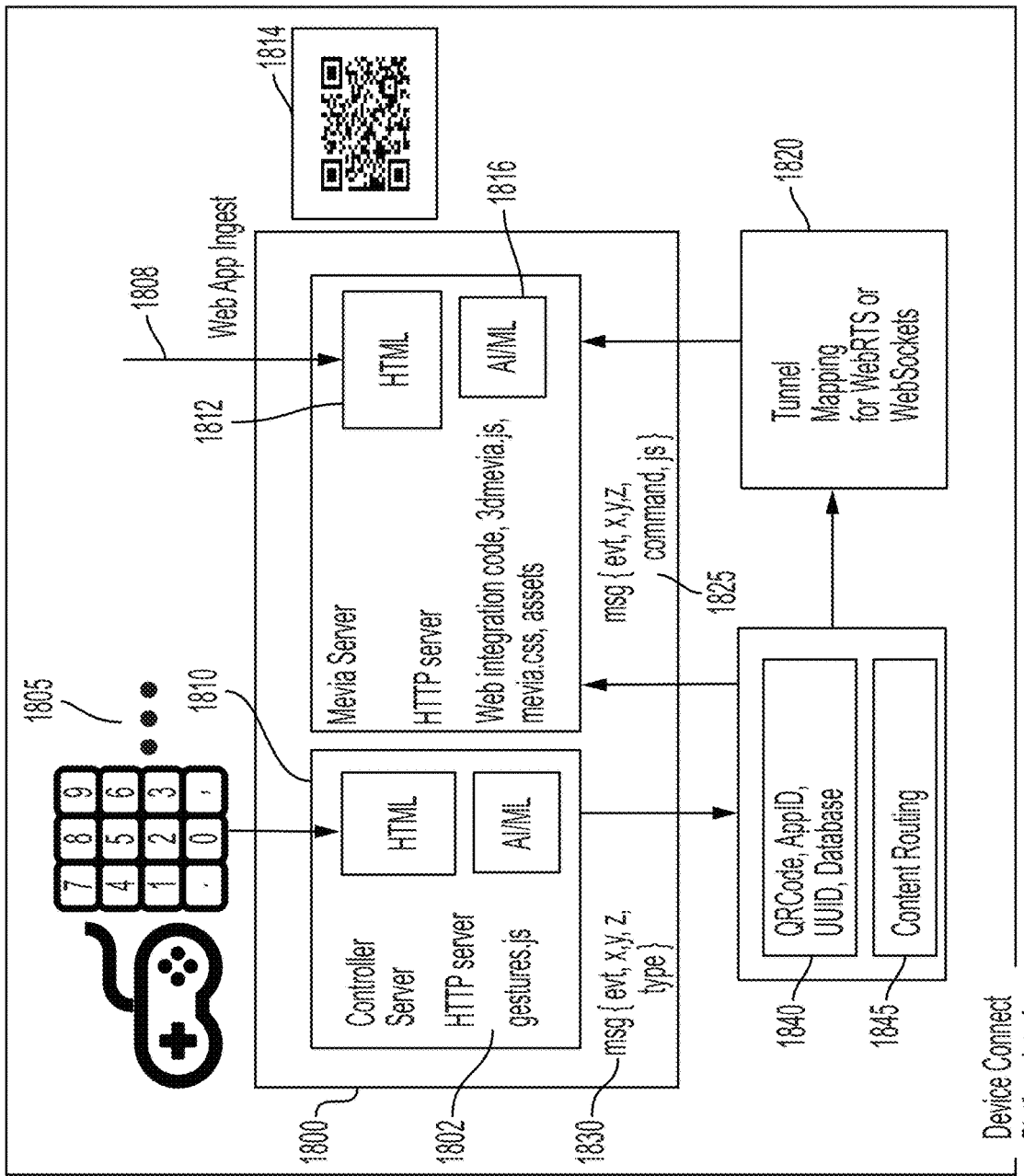
FIG. 18 is a block diagram of an exemplary embodiment of a method of processing messages in the device connect platform architecture of FIG. 1.

In general then, the device connect platform is depicted in FIG. 18, as a series of controllers 1805, a system where a controller server with HTML 1810, a web HTTP server 1802, gestures.js, and AI/ML to handle the controller learning and bundles. The Messaging queues 1830 contain all message.evt, message.x, y, z coordinates, and all other messages used for gesture control devices, and other bundles or series of controllers. 1812 and 1808 represent the web app ingest, that can also include AI and machine learning as part of the MEVIA application or Mevia server block 1816 as well as receive commands that can be translated from the original messages originated from the controller to JavaScript commands 1825 are dependent on the HTML used by application 1812. In other words, the messages that originate the controller are then converted to mouse events, JavaScript events, and WebRTC/Websocket traffic depending on the configuration used and the type of application loaded. The content routing 1845 element is responsible for capturing all the messaging and events, "raw" from the controller and identifying what needs to be converted to and managing other router functions for WebRTC and WebSocket video and audio traffic that is then mapped to IP tunnels and managed by a STUN/TURN server 1820.

Figure 19:
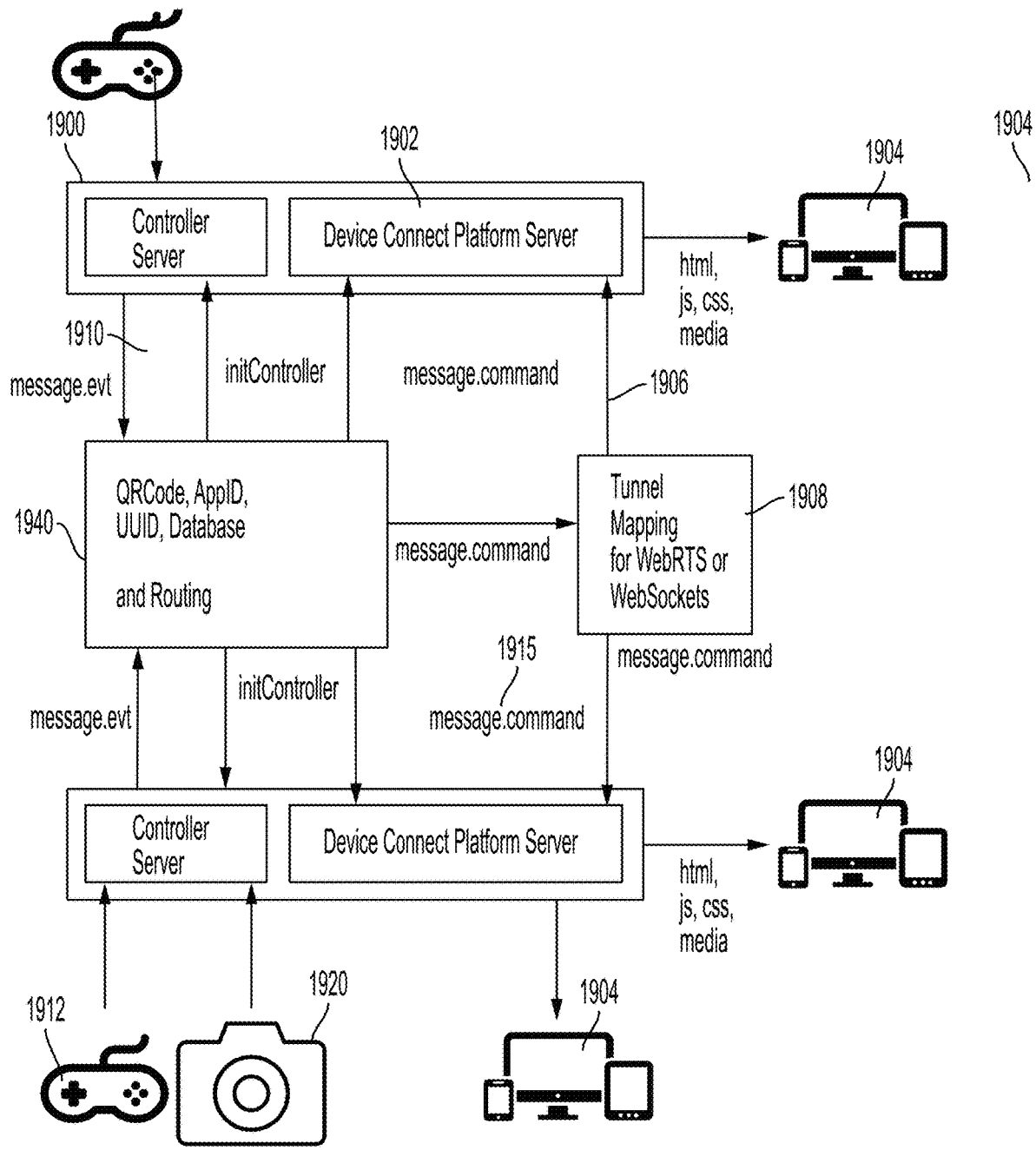
FIG. 19 is a diagrammatic illustration of an exemplary embodiment for message.evt and message.command processing in the device connect platform architecture of FIG. 1.

FIG. 19 shows the system managing two or more device connect platform applications. FIG. 19 includes a controller server 1900 for a game controller and its associated Meviapp server 1902. This URL is retrieved by the screens 1904 and contains the Mevia application and is then controlled from controller server 1900. As shown, message.evt or raw events are sent to the controller, while the controller can receive an initController command 1910. The heart of the system is depicted at routing component 1940, where all the routing QR codes, Application Identifiers, UUIDs, databases, and routing parameters are configured. As a result of the processing in routing component 1940, events are converted to commands or WebRTC/Websocket streams that are then retrieved or pushed via HMTL and JavaScript, CSS, and other media files 1906 and message.commands 1915 to the Mevia App server 1902 and retrieved by clients at screens 1904. Clearly, many of these message.evt are translated to message.commands 1915, and handled appropriately by the Mevia App server architecture. Multiple controllers can then be used and combined a game controller 1912 and a camera 1920.

Real-Time, Streaming, and Videoconferencing Applications in the Device Connect Platform For applications requiring the use of a video and microphone controller, navigator.mediaDevices.getUserMedia(..) may be required for authorized access in FIG. 12(*a*) and FIG. 12(*b*). Once device authorization is permitted by the user, the controller then provides gesture.js with access to a WebSocket 1222 or WebRTC streams 1224. The same routing path that is followed by message.evt events, rendered by the page that includes gestures.js and associated JavaScript to establish a WebRTC session or deliver via WebSockets, images, audio buffers, or data. One objective with FIG. 12(*a*) is the creation of an emulated USB interface to a web application that loads the video and audio via an emulated web client interface. In this embodiment, the Mevia App RTC Server 1218 connects via the emulated web client interface. The "Emulated Web Client to MEVIA APP" module 1216 can then perceive commands from a controller 1225 (e.g. message.evt) as USB HID interfaces, CAM0, CAM1, CAM2 1212 or a USB WebCam Emulator 1208 that is presented to the emulated web client as a CAM EMU driver. The USB WebCam Emulator 1208 encapsulates a USB WebCam descriptor (e.g. bDeviceClass, bDeviceSubClass, and specialty interface association as bFuncitonClass 14 for Video). The data or payload of the connection created by the USB Driver is then WebSocket or WebRTC traffic generated from the controller 1225.

Some other web applications may use mevia-webrtc.js interface 1230 as well as mevia.js 1228, as those web applications have implemented WebRTC natively. In those cases Mevia-WebRTC will write directly to an audio tag or video HTML tag that is part of the application. In other words, in this embodiment, a Mevia App does not need to be modified at all and simply an emulated web client connects to a Mevia App server that contains the application, which could be local to the device connect platform or could also be remote and hosted at a different domain. The emulated web client web application then becomes the client and Mevia app server is what is displayed on the television.

In some embodiments, the Mevia App RTC server 1218 may not properly display contents to a particular user, for example when the Mevia App is not designed for smaller screens, or any other potential drawback that may include smart television's Webkit browser is unable to process or display certain aspects of the application. For those circumstances, a simple "User Agent" inspection from the smart television's HTTP request may be needed and the process in FIG. 12(*c*) will be able to be used in all televisions regardless of compatibility issues with the their web rendering engine. As shown FIG. 12(*c*) depicts the use of a different Mevia App server display that could include a simple html such that:

```
<html>
<body>
<canvas id="meviaapp"></canvas>
<script>
    Player = jsMpegPlayer("wss://ipaddress:8001/meviapp",
        "canvas": document.getElementById("meviaapp"));
    }
</script>
<script type="javascript" src="jsmpeg-min.js">
```

FIG. 12(*c*) shows that component 1280 includes FFMPEG encoder for mpeg2video and mp2 audio, for a Puppetter's based of captured screens of all HTML pages shown as a result of all messaging between Mevia App server, mevia.js, and mevia-webrtc.js. As an example, Puppeteer may write all captured JPEG images and pipe them to an FFMPEG process to encapsulate them as a MPEG frame.

Capturing Stage - Video:
Capture image in JPEG or PNG from Mevia App Server HTML
Save Images at Local Directory
Write image to pipe:0
Capturing Stage - Audio
Capture audio from Mevia App Audio Channel
Redirect audio as http mp3 stream
At FFMPEG
Take pipe-in from Capturing Stage
Take audio from http3 Capturing Stage
Generate mpeg2video and audio and serve it as Web Socket or use NGINx with rtmp or write HLS to Apache web server
Write to pipe:0
At Websocket Server - websocket IP address and port XYZ
  Read from pipe:0 and write all buffers to a websocket for Mevia App Display
    Wait for WebSocket Requests.
At MEVIA App Display Page
Point jsMPEG to wss://Websocket IP Address with Port XYZ In essence, FIG. 12(*c*) shows that audio and video are encapsulated in mpeg2video frames at component 1280. Those video and audio frames are then serviced by Web-Socket server 1285 and a USB or Web RTC mapper 1288 component determines the proper web server to use as a response.redirect( . . . ) or a redirect command is issued to the smart television display to point to the display server 1290 with that jsMPEG or JavaScript MPEG (e.g. jsmpeg.org) project can draw to a canvas. Similarly, an implementation can be done with RTMP, HLS, and Low-latency HLS for these implementations, a Web Socket server might not be required and an HTML tag with <video source=" . . . "> instruction will be used instead of jsMPEG player. The WebRTC mapper 1288 defines the location where the Mevia App Server Display 1290.

The USB or WebRTC mapper 1288 is shown in FIG. 12(*c*). This module shows how a particular source IP Address and USBID is mapped to a destination IP Address and a USBID that is being emulated by the USBIP Daemon. USBIP is an existent component of Linux and Windows machines (http://usbip.sourceforge.net). The USBIP command allows attachment of a remote USB device with certain USB Identifier located at remote machine at "IP Address 1," with another USB IP daemon located at "IP Address 2," for the machine at "IP Address 2," the USB device is local, and all transport are done over an internet link.

However, as the video traffic from WebRTC Stream 1224 or WebSocket 1222 is delivered from the controller as real-time streams. Those streams are handled by the device connect platform at peer points 1206. As the video and audio traffic is received by the WebRTC Peer Connection, for example the IP Address used by the controller server is 1.1.1.1 while the IP Address of the client is loaded at controller 1225 is 1.1.2.122, the connection with WebRTC is made at a local server within the device connect platform.

As such an HTML Tag with <video id="remote"> at the controller, <video id="local" is then remote at the device connect platform">. As part of the configuration of the WebRTC interface, a STUN server 1250 could be set or the device connect platform could have created an IP tunnel between the controller server and the server at peer points 1206. An expert in the art will know that a STUN/TURN server will proceed to achieve a similar result as an IP Tunnel. As such, at the peer points 1206, the resulting video and audio feed from controller 1225 is then put in packets or frames that are then delivered to the USB Web Cam Emulator that is collocated at the peer points 1206.

```
WebRTC RTCPeerConnection( )
At the end-point of the RTCPPeerConnection all packets with video and audio are
buffered
Packets are written to pipe:0
USB WebCam Emulator( )
The USBIP interface is initialized to issue an USBoverIP interface
Descriptors for a MEVIAWeb Camera are initialized
Packets from the WebRTC Peerconnection are written to the USBWebCam
Emulator
If transcoded is required, packets can be first passed to FFMPEG for transcoding
to H.264 video and AAC audio.
```

As the network traffic with video and audio from the USB WebCam emulator is encapsulated in USBIP traffic with payloads with video and audio must be properly routed to a particular session or a Mevia App RTC server 1218. As such, a USB Virtual Router 1200 is used and a routing table 1202 will include a destination IP address and a Source IP Address. The USB Daemon, loads the information from the USB virtual router 1200 and issues an "USBIP attach" command to the IP Address where the USBID containing the web camera emulation is located. For example, the destination IP Address can be executed as a remote docket container "run command" or if a particular server already exists an "SSH" command can be executed from USB Virtual Router 1200 to the USBIP daemon server 1210. For example, from the USB virtual router 1200, "ssh -u device connect platform Dest_IPAddress:/usr/bin/usbip-attach Source_IPAddress"

As a consequence, the USBIP daemon server 1210 must reside within the same server as the Emulated Web Client to MEVIA APP module 1216 emulated web client to MEVIAAPP, as a browser instance using a web browser will then connect to MEVIA App Server. The MEVIA application server indeed expects that the client may render a tag HTML video as local and remote for other clients connecting to the MEVIA App Server. Since the smart display is expected to visualize the results of the Emulated Web Client to MEVIA APP module 1216 or visualize copies of what is being observed by the Mevia App RTC Server 1218 into client 1233 or render a video and audio stream from Mevia App RTC Server 1218 into client 1233.

Figure 12A:
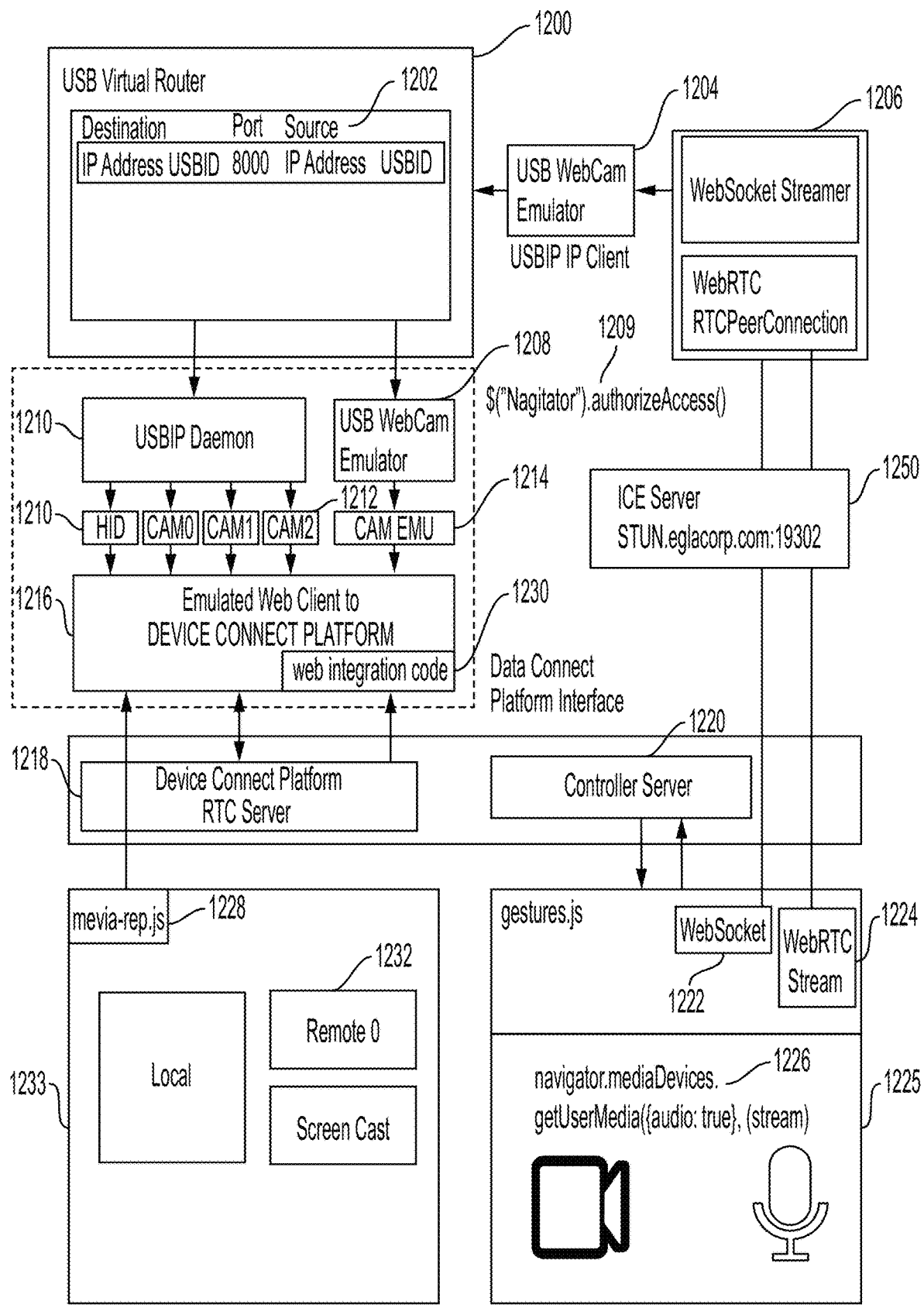
FIG. 12(a) is a block diagram of an exemplary embodiment of a device connect platform multimedia application and integration with USB WebCameras and other USB devices over IP.
Figure 12B:
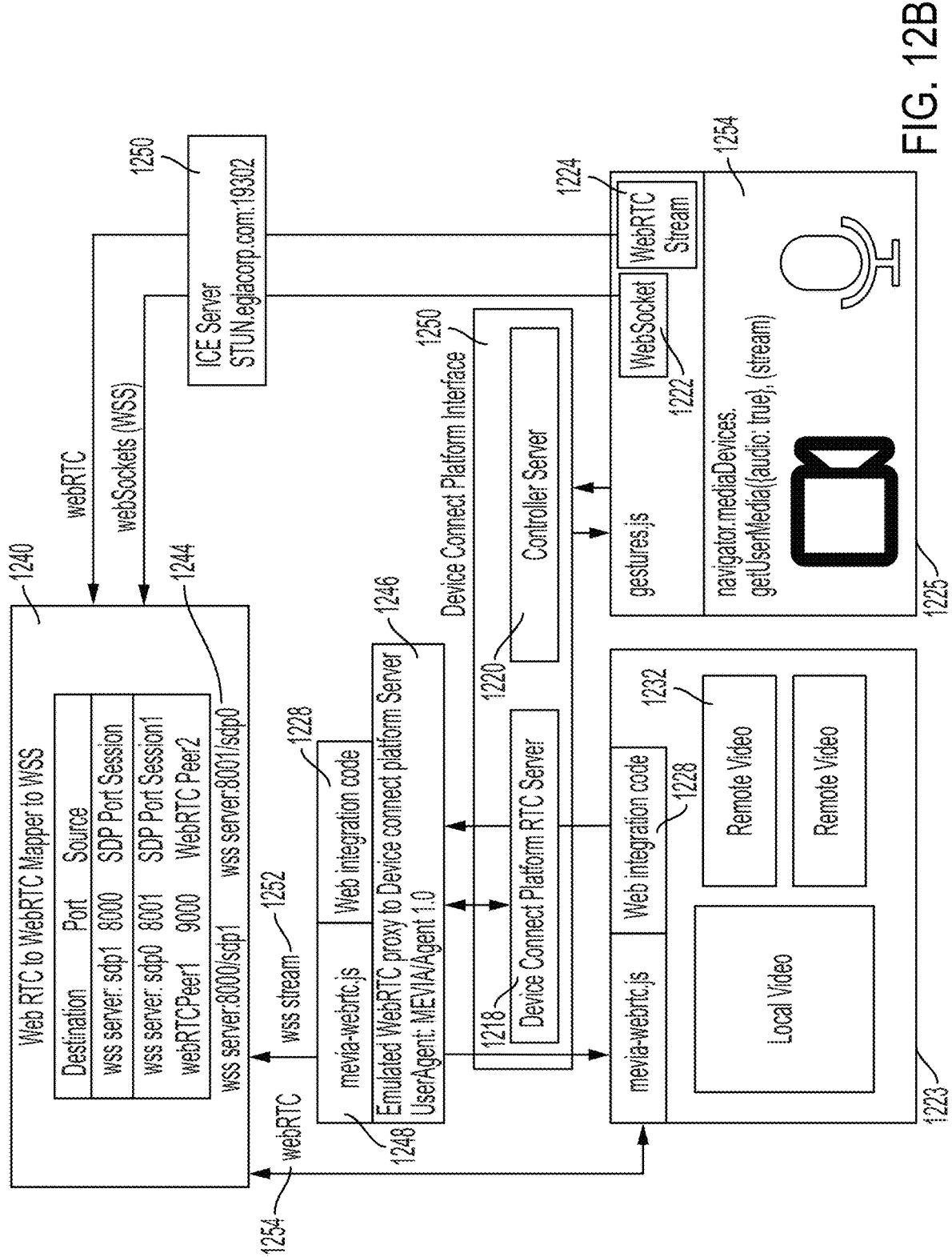
FIG. 12(b) is a block diagram of an exemplary embodiment of a device connect platform system with WebRTC and WebSockets.
Figure 12C:
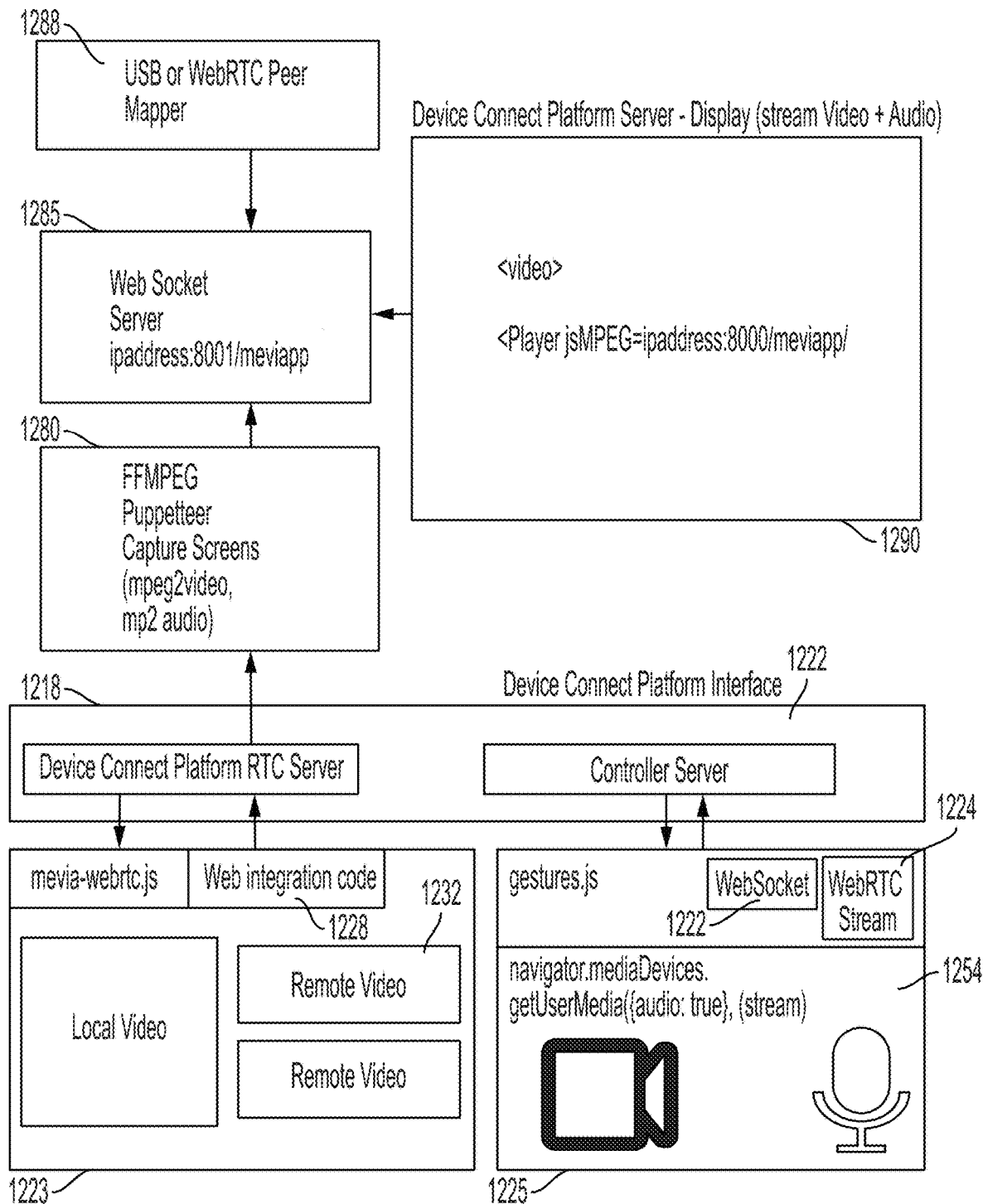
FIG. 12(c) is a block diagram of an exemplary embodiment of device connect platform streaming using CANVAS and a web application.

The device connect platform allows for use cases: a) in order to visualized MEVIA APP 1216 results from connecting to MeviaApp Server, the mevia-webrtc.js and mevia.js 1228 is instructed to copy the DOM from the Emulated Client to MEVIA APP 1216 into the DOM of client 1233, including copies of all video streams at MEVIA APP 1216 to canvas objects in client 1233, or creating a WebRTC channel with client 1233 with screenshots from MEVIA APP 1216; or b) proceed as FIG. 12(c) where the FFMPEG and puppeteer also executes as part of MEVIA APP 1216 and proceeds to generate the screens shots to be visualized by the MEVIA App Server-Display 1219 instead of the MEVIA app server 1218. The Mevia App sever simply displays what is shown at display server 1290 or a stream to a canvas using MPEG2video and mp2 audio or HTTP Live Streaming (HLS). Observe that mevia.js is then loaded as part the emulated server and not as part of the MEVIA App Server.

In other words, mevia-rep.js 1228 receives DOM object values from MEVIA APP 1216 or uses WebRTC or WebSockets to copy DOM from MEVIA APP 1216 into what is being displayed on client 1233 or simply streams a real-time version of MEVIA APP 1216 via jsMPEG that is processed by component 1280 mpeg2video and served as rendering. The advantage of using display server 1290 rendering as opposed to DOM object copies is that any smart television display that support CANVAS will be able to render and handle the results from MEVIA APP 1216. Clearly, the use case for this embodiment is the creation of a web-based videoconferencing tools that loads USB-cameras or USB devices that may require a particular support from an operating system. Therefore, WebSocket server 1216 can be implemented as a Windows client, Linux, or headless, depending on the video conferencing software.

The same is true for other USB-based interfaces, where native drivers and assets are expected to be loaded by the operating system or kernel modules.

Assume that a particular videoconference does not need USB cameras. FIG. 12(b) shows how to create a native solution that relies on mevia-rtc.js protocol and similarly to what it was depicted on FIG. 12(a) but instead of emulating USB over IP, simply captures the WebRTC traffic and WebSocket Traffic and is directly forwarded to the video conferencing application.

As shown WebRTC 1254 depicts authorization and access via gesture.js of navigator.mediaDevices.getUserMedia and the instanton of WebSocket 1222 or WebRTC 1224 objects as part of a controller server HTML page.

A similar procedure will be used for any other USB interfaces for example, USB-based displays, chargers, keyboards, AR headsets, etc.

As such, an ICE Server or STUN/TURN server 1250 is setup to handle RTC communications. Similarly, the device connect platform can create an IP Tunnel to achieve point-to-point links between different endpoints, for example an SSH tunnel between a controller server to the Mevia application server or the Emulated WebRTC proxy 1246. Observe that a WebRTC-to-WebRTC Mapper to WSS entity 1240 is shown.

This server can forward WebRTC traffic directly to the emulated WebRTC proxy or can be captured by the WSS to create a WebSocket interface where the video and audio traffic is exchanged. In other words, WebRTC-to-WebRTC Mapper to WSS entity is the peer for the WebRTC connection and as a peer then it serves the content as part of WebSocket server at port 8000. As a recipient of the peer, WebRTC-to-WebRTC Mapper to WSS entity 1240 can retrieve the SDP session for each of the peers and can copy back and forth the WebRTC traffic to other peers, or simply buffer the WebRTC traffic to be serviced as a WebSocket traffic 1244, for example wss://server:8000/sdp1 and wss://server:8000/sdp0.

The contents from, the WSS stream 1252 could be a WebSocket stream and WebRTC 1254 could be a WebRTC stream 1254 with a peer at client 1233 were the mevia-rtc.js is loaded. Clearly, the STUN server 1250 could be placed as part of the WebRTC traffic from WebRTC-to-WebRTC Mapper to WSS entity 1240 to client 1233. Another embodiment could be Emulated WebRTC proxy 1246 that could load mevia-webrtc.js 1248 and the WebRTC peer could be part of Emulated WebRTC proxy 1246. Clearly, as Emulated WebRTC proxy 1246 loads HTML from the video conferencing application at Mevia App RTC server 1218 and WebRTC-to-WebRTC Mapper to WSS entity 1240, proper Cross Origin Resource Sharing (CORS) headers must be implemented to be able to retrieve WebRTC traffic from Mevia App RTC server 1218 and WebRTC-to-WebRTC Mapper to WSS entity 1240. As depicted before, the Mevia application server user interface can be rendered a) natively with WebRTC and video tags 1246 or b) rendered using FIG. 12(c) implementation with a streaming canvas and using jsMPEG.js libraries for instance.

This is a similar scenario as in FIG. 12(a), observe that mevia-rtc.js and mevia.js are used for the emulated WebRTC proxy 1246 to MEVIA app RTC server 1218. Let's assume that a WebRTC application has been built and does not require USB cameras and only does streams, for example streams from television channels and a user's camera with audio. In this scenario, remote video 1232 and local video are presented as WebRTC visualization methods using a "video tag". The remote video comes from other streams sources, while the local video is the source from controller 1225. In this scenario the Mevia application RTC server 1218 receives WebRTC traffic from the Emulated WebRTC proxy that functions a peer to Mevia application RTC server 1218, in some embodiments and the following peers can be established. We identify, Peer0 at the mobile phone or controller 1225, Peer1 as the WebRTC Mapper device Peer, Peer 2 at the emulated Web RTC proxy 1246, and Peer3 at the actual Mevia App RTC server and all other peers attached to that WebRTC server (e.g. one to many conferencing).

will also receive all message.evt commands and all associated events from all the controllers that can be associated with a particular MEVIA Application. However, expert in the art will know that another session can be established to Mevia App RTC server directly and see all peers as an observer, for instance as a webinar attendee and depending on the smart television configuration and what type of role a user has been playing different URLs can be rendered for those using the application.

As a Websocket stream can be also used as part of the delivery of WebRTC video and audio, or data content. In this particular scenario, the Mevia App RTC Server 1218 could simply bypass the emulated RTC server and load video and audio directly into local video the wss:// traffic from WebSocket traffic 1244 directly. Let's say that video and audio are retrieved as video frames that are rendered into a canvas and an HTML, audio tag or directly into an HTML video tag. Under this scenario when only WSS streams are used, the point of view is then client 1233 not Emulated WebRTC proxy 1246, or the contents from Mevia app RTC server which may also include other peers that are part of the videoconference event.

In the event that a canvas is updated at the Mevia APP RTC server using the wss://traffic from WSS entity 1240 (e.g. wss://server:800/sdp1). Under this scenario, a pre-built application by the device connect platform might be required and used as a recommended practice for certain application developers creating videoconferencing applications for the device connect platform.

Another application is showing multiple television streams, camera streams, and other sources form other videoconferencing servers or over-the-top servers that can transport content over the WebRTC streams or WSS streams.

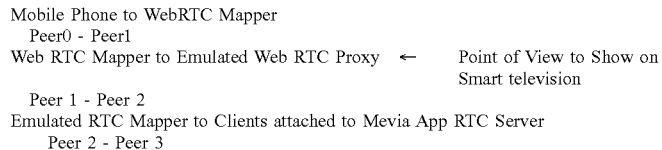

Mobile Phone to WebRTC Mapper
  Peer0 - Peer1
Web RTC Mapper to Emulated Web RTC Proxy   ←   Point of View to Show on Smart television
  Peer 1 - Peer 2
Emulated RTC Mapper to Clients attached to Mevia App RTC Server
  Peer 2 - Peer 3

An objective could have been to link Peer0 controller with Peer3 clients, such that all web clients connected to MEVIA app RTC server can see Peer0's stream.

However, recording capabilities, transcoding, and the use of FIG. 12(c) embodiment would have been disabled and will be bypassed by this configuration, but clearly Peer0 source can be displayed as part of all HTML video tags labeled as "remote" in all clients at remote locations that are part of the streaming session.

Hence, the point of view for the smart television is position right at the "emulated WebRTC proxy server 1246 to Mevia App server where the mevia-rtc.js and mevia.js are loaded, not the Mevia App RTC Server at 1218. In this scenario, an HTTP GET request was made to the Mevia App RTC Server and all canvas, video and/or audio HTML tags with different identifiers are loaded into Mevia App server. The local video tag or the reference to controller 1225 source is shown as a peer that is being processed by WSS entity 1240, STUN server 1250, and WSS stream 1252. All other peers and sources including remote video 1232 can be handled by STUN server 1250 to enable proper signaling under NATs or firewalls. Hence, an HTTP GET request made by the Emulated WebRTC proxy 1246 is what needs to be displayed by the smart television. This is the URL that In any of these two scenarios, FIG. 12(c) can be used to handle rendering of either scenario by creating a sequence of screen captures and proceeding to mix the audio from the resulting web client as it is being perceived as mpeg2video and mp2 audio or could be encoded using the H.264 video codec and for audio mp3 or AAC codecs embedded in a transport stream (TS) for HLS or Low-latency HLS (HTTP live streaming) environments.

Integrating a Windows Machine into the Device Connect Platform

Figure 13:
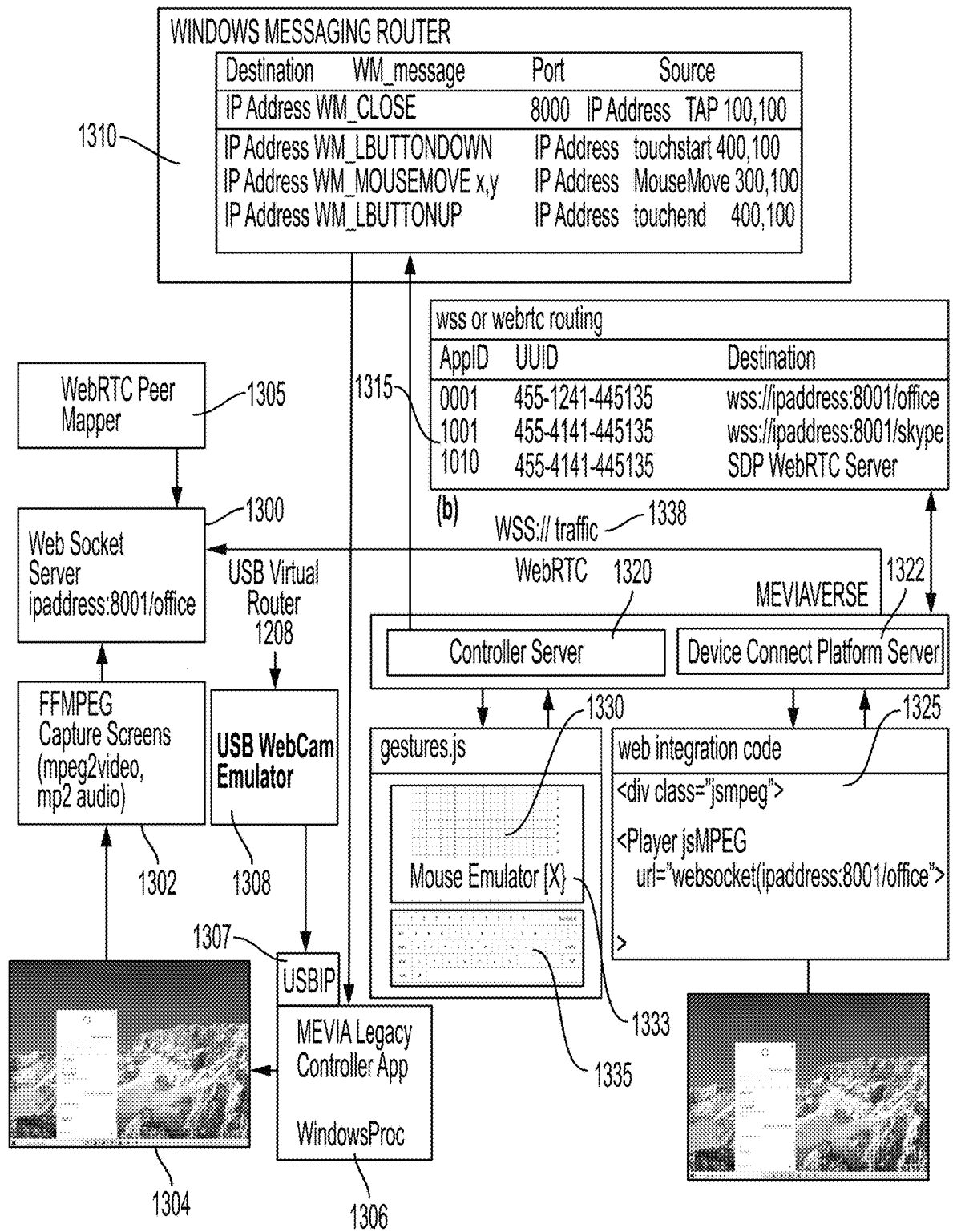
FIG. 13 is a block diagram of an exemplary embodiment of device connect platform remote access for a Windows computer.

Thus far, web applications that are rendered by a smart television level with web-based widget has been presented. However, the device connect platform can also be populated with operating systems that can be controlled using the controller systems presented in FIG. 11 and a windows VM or server can be made part of the device connect platform. For example, Windows applications that may include native OpenGL, legacy DOS applications, Microsoft Office Native, Computer Aided Design (CAD) programs, Adobe tools, and many other high-computing native applications that run as an executable on windows can be rendered and controlled via the device connect platform. In FIG. 13, a native application 1304 depicts a native application for Windows 10 or 11. In this embodiment, a USBIP module 1307 can be used to handle all USB-related devices such as cameras and microphones are interface with the controller server 1320. With reference to FIGS. 12(*a*)-12(*c*) and specially the USB Virtual Router 1200, the connectivity with USB Web Cam Emulator 1308 is possible. Camera and audio from a controller can be sent over to a virtual windows terminal 1304 and used as it was natively functioning.

The main requirement is loading as a Windows Service or native application, the Mevia Legacy Controller Application 1306 that is in charge of converting Message.evt commands from controllers shown in FIG. 11 to WM_* messages from windows and use the Windows API system. The Windows Messaging Router 1310 is in charge of mapping from several controllers Windows-based messages located to one or many windows machines or devise that comply with Windows messaging. For example, a TAP message from device connect platform may correspond to WM_CLOSE if the "X" button is located at 100,100. Another event that can be converted are mouse events, by converting touch events at the phone to WM_MOUSEMOVE, x, y for example that are received by the 1306 device and sent to a Windows procedure via the SendMessage API interface. As sounds and screen captures are taken, those are sent using the X11grab interface from tools such as FFMPEG 1302, observer that Puppeteer is no longer necessary as the main objective is to render Windows native applications not HTML-based applications. Web socket server 1300 is created at IPAddress:8001/office for instance and that Websocket or Websocket Secured (WSS) traffic 1338 can then be retrieved by Mevia App server 1322 and displayed via target canvas 1325. Clearly, the controller server 1320 will process all gestures from the grid 1330 for mouse emulation 1333 turned on and a keyboard 1335 for typing commands. As shown in FIG. 13, a WebRTC peer mapper server 1305 can also retrieve the WebSocket Server 1300 content.

Observe that a server and client computer are only definitions used by HTTP and other protocols, but in some cases a server could be a single purpose computer and the client could be a cloud-based system. Hence, CPU, memory size, number of clients are not limitations for defining a sever and a client.

As shown WebSocket routing is then needed by the device connect platform to determine what Application IDS and what UUIDs are mapped to what particular destination, if those applications are executing a user's session, switching from application to application will required just updating the target canvas 1325 or target div that a player such as jsMPEG. For example, a user might have run Office in one particular server and may run Skype in another server, or both could run in the same server 1315. However, a user may switch from Office to Skype by simply switching URLs and reloading the player being displayed at the player 1322.

Figure 14A:
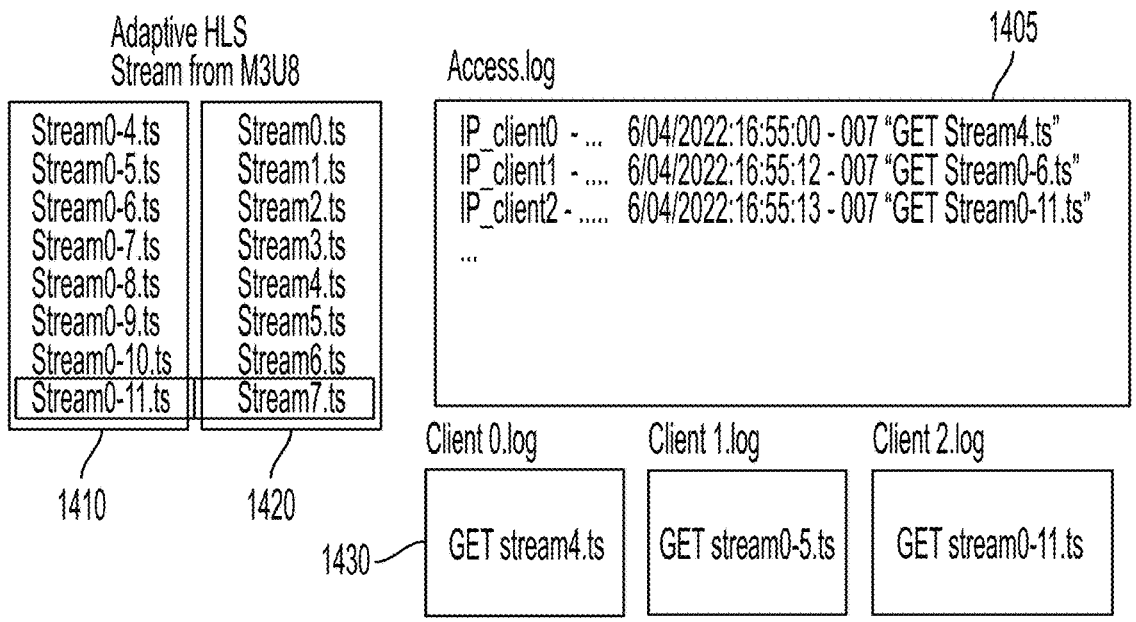
FIG. 14(a) is a block diagram of an exemplary embodiment of detecting streams using contextual awareness.
Figure 14B:
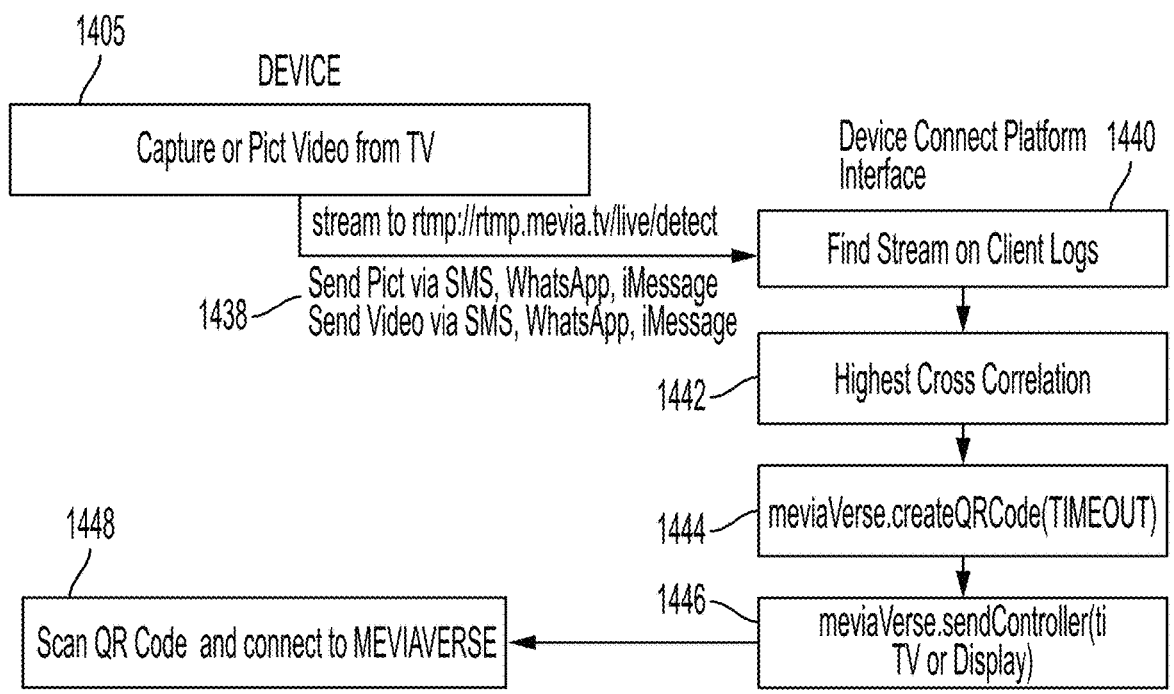
FIG. 14(b) is a block diagram of an exemplary embodiment of capturing a screen to eliminate the need of a QR Code.
Figure 14C:
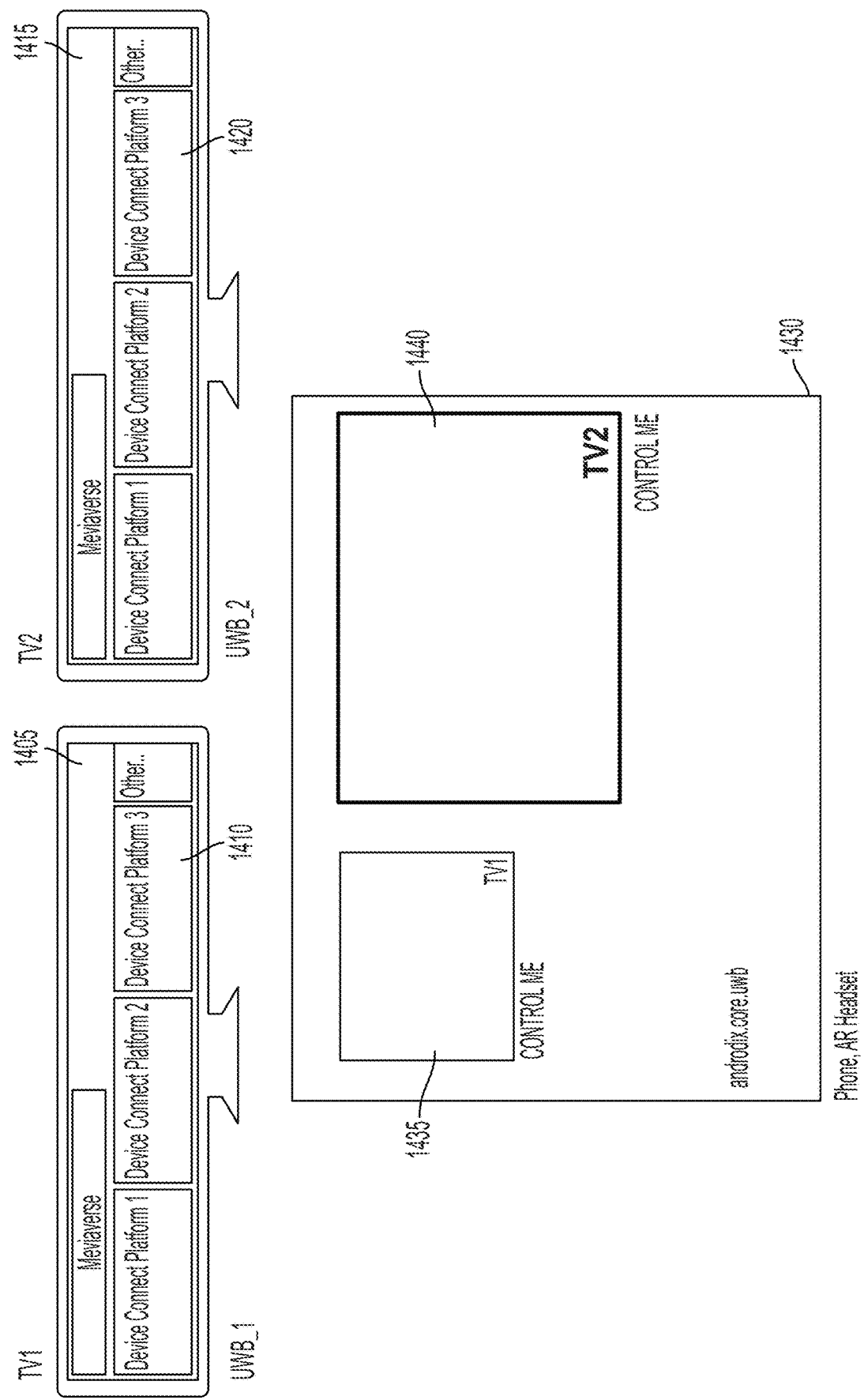
FIG. 14(c) is a diagram displaying Smart TV detection using Ultra-wide Band (UWB) and positioning instead of a QR Code.

Controller and Smart Television Identification Using Contextual Awareness in the Device Connect Platform Thus far, we have presented the use of a QR code to map a particular device connect platform application with a controller and interact with different Mevia applications. However, FIG. 14 shows how the asynchronous nature of streaming can be taking advantage of and quickly determine which smart television is in use and how to control it. Assume that Adaptive HLS streams are used by an M3U8 streamer 1410 and 1420 shows a sequence of transport streams as defined by the HTTP Live Streaming standard, were stream0-4 to stream0-11.ts 1410 are part of a stream and Stream0.ts to Stream7.ts are part of another stream, which one could be at 700 Kbps and another one at 2 Mbps. Such streamer can also be implemented by MPEG DASH segmenter can also be used with MPD (Media Presentation Document) that include a set of segments and use audio/mp4, video/mp4, "AdaptationSet" entries that are part of the MPD's XML manifest. For cross-correlation purposes, M3U8 or MPEG DASH streamer 1410 and 1420 are cross-correlated highly as they come from the same stream and are synchronized. However, in the log file 1405, a system can narrow down what is being downloaded, when, and by who. For example, IP_client0 obtains Stream4.ts while IP_client2 is processing Stream0-11.ts. all depends on the player in use. Hence by inspection, we know that stream4.ts and stream0-5.ts are mapped to IP_client0 and IP_client1 respectively. Hence, if a mobile device can present images with a higher cross-correlation to Stream4.ts 1430, it can be concluded that a device is then using IP_Client0 and that UserAgent information mapped to that particular location can be easily identified. This technique is useful as it is designed to replace the QR code and map location to particular device or smart television where the user interface can now be controlled. Additionally, other methods of triangulation could be used to further narrow the proper television set in use, for example location fingerprinting, ultra-wideband positioning, or others known in the art to distinguish multiple TVs with the same content. In operating systems such as Android, the class android.core.uwb can be instantiated to obtain positioning information, and locally accessible via the webkit application. An UWB service and listen to TCP port 4444, and webkit can retrieve via http or https://localhost:4444/uwb, UWB values corresponding to the AirTags or UWB Tokens around the device. In this particular implementation, the androidx.core.uwb instantiates UwbClientSessionScope as wel as the UwbManager interfaces to make RangingMeasurements and detect the proper TV client that is being controlled or identified with the proper stream. In this particular case, IP_Client1 is also associated with UWB_1, whereas IP_client2 is also associated with UWB_2. Similarly, iOS Devices as iPhone by creating and application using NINearbyAccessoryConfiguration and obtaining a device "session(_:didGenerateShareableConfigurationData:for:). Hence, similarly to what is presented for android, an application can integrate either android.core.uwb or NINearbyAccesoryConfiguration or NINearbyPeerConfiguration interfaces to detect TVs or displays in proximity, and further isolate the device to be controller, even providing visual feedback of the position of the TV that needs to be controlled. This proximity location information is sent to the MeviaVerse system for processing, either by itself or in combination with QRCode, video images capture forms the TV set. In that way, a proper discernment of what TVs are controlled by the MEVIA controller are available can be presented, even with a mapping as shown in FIG. 14(*c*).

Elements 1405 and 1415 are Smart TVs with an UWB Airtags associated with the stream or session being broadcasted 1410 and 1420. A mobile phone or AR headset at 1430 can display now TV1 and TV2 controllers, download AppID, UUID for each TVs by discerning each TV's stream being broadcasted (see FIG. 14(*a*)a and (b)) by also using UWB's airtags and the "nearby" location information of each of the TVs. In some cases, scanning a QrCode may not be necessary, as the UWB Addresses, and Images shown on each TV will suffice to determine which TV is used and controlled based on the relative distance and position calculated from the UWB Signal.

This is a useful scenario in an airport, restaurant, bar, club, where multiple Smart TVs are displaying either the same feed or different feeds and QR Codes are not captured by the device's camera, instead UWB Airtag position information can be used by moving the device in the direction where the distance to that TV is closer, or the location where the TV is located and sending that information to the MeviaVerse system for processing and allowing commands to be sent to the TV from the phone or the AR device.

In the case where only images area available, at a computing device or phone a user can capture pictures and video streaming from a particular smart television as it streams a particular broadcast 1435, then the stream 1438 can be found. The information can be captured with a message (e.g., SMS, WhatsApp, iMessage, etc.) and then a client logs 1440 from HTTP Server that is being accessed from the HTTP Live Stream. The cross correlation 1442 then exists in between the information captured of N-frames, window capturing stream, and a QR code 1444 is generated with a certain time that is then displayed with authentication values to the presumed smart television 1446 that has been located or identified. The user then will proceed to scan the QR Code and authenticate and validate that is the same source issuing the request, and by a mistake another smart television has been identified.

Figure 15:
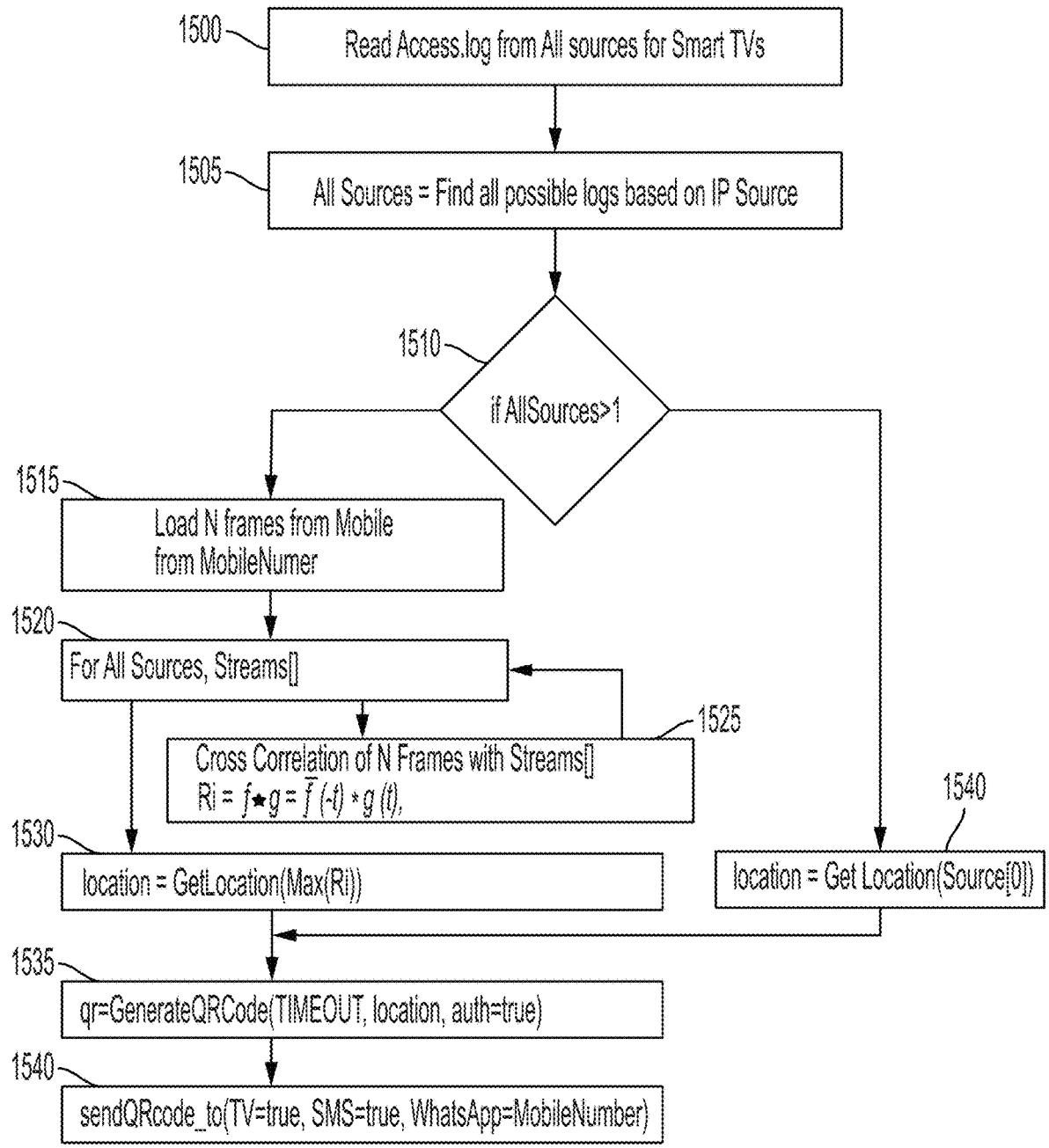
FIG. 15 is a flow chart for an exemplary embodiment of a method of detecting location based on a smart television display video feed.

FIG. 15 shows the method in more detail, at step 1500 read access.log from all sources for smart TVs and at step 1505, an access.log from an HTTP server is identified with all sources, where all smart televisions are retrieving the streams being projected at any particular location. Log files contain a user agent of the television, IP addresses of each television source, and what was the latest stream retrieved by the television. Hence, an IP address is mapped to a particular transport stream (TS) segment. First it is assumed that the mobile device is located at the same IP address or subnetwork as the smart television which will narrow the number of devices substantially. At step 1510, if there is less than one source, either only one smart television is the answer or if there none, there is no identification achieved, as such a user will simply receive a timeout message or by observing no feedback a user will understand that a QR Code must be manually scanned from "All Sources" if it is greater than one potential match, The system can also use additional APIs, such as ip2location.com or other providers to narrow the number of searches and streams according to a potential IP address match aided by third party services. Additionally, FIG. 15 can be combined with Ultra-Wide Band (UWB) tags to provide additional positioning information that the phone can send, as millimeter position tracking by using Apple AirTags or other UWB tokens for positioning and localization.

In the event that no matches are found, a brute force approach can be applied and at step 1515 can start in a loop and all sources from all streams will be required to be matched.

Assuming that, a match of IP Address to smart television has been achieved and the number of sources is small (e.g. a NAT translate all requests at a Corporation) then from all sources and all streams that have been recently retrieved at step 1520 are compared in a cross-correlation computation at step 1525 with all frames received by the mobile device at step 1515, and the highest value is computed.

The highest 2D cross correlation in the number of frames identifies the location of the particular index, I, on Ri at step 1525. At step 1530, The location is then associated with a particular smart television that can be mapped using the content router and a message.evt with "DisplayQR Command" is then issued with a generated QR code that can be overlaid over the contents being streamed at a particular time. Once the user visually sees the QR code display at the smart display, a normal procedure will start and in other situation authentication can be set to false at step 1535 and simply gain control of the television without using a QR code by receiving as a reply from the original message at step 1540 (e.g., which may include an iMessage, SMS, WhatsAPP message, and/or the like) where the user will proceed to load the URL and control the television by connecting to a particular controller associated with the smart television.

WIFI Dongle for the Device Connect Platform

Figure 16A:
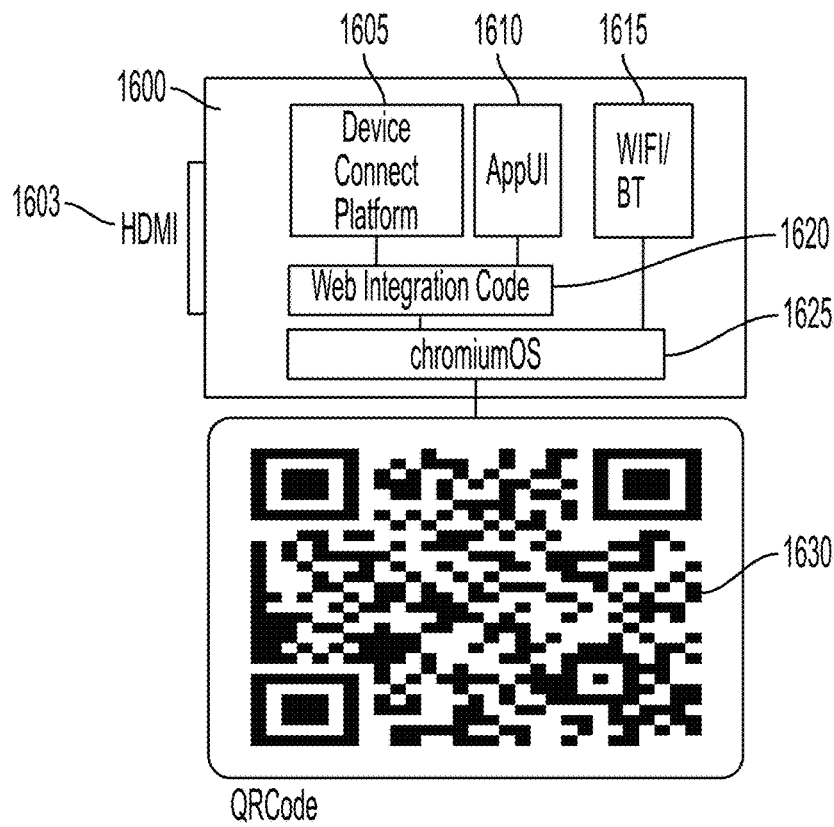
FIG. 16(a) is a diagrammatic illustration of an exemplary embodiment of a dongle with a QR Code and Bluetooth Low Energy WIFI provisioning.
Figure 16B:
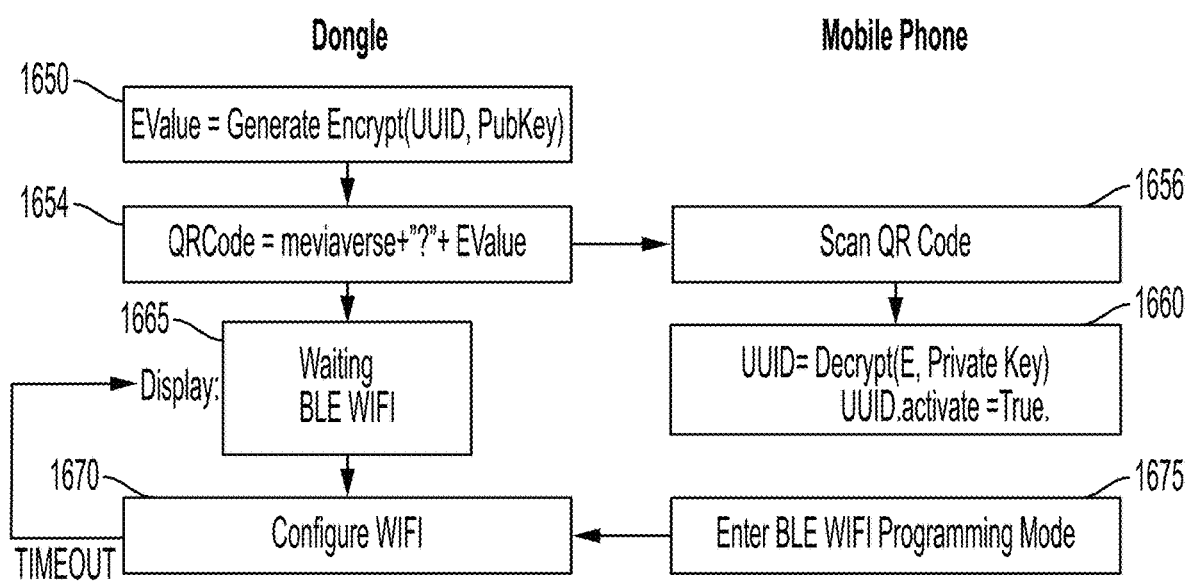
FIG. 16(b) is a block diagram of an exemplary embodiment of method for interacting the dongle and QR Code of FIG. 16(a) with Bluetooth Low Energy WIFI provisioning.

It is understood that not all televisions are compatible with WebKit or other browsers and that some televisions are, although compatible with HDMI inputs, are not smart televisions. For those scenarios or for scenarios where more control is required by the subscriber, FIG. 16(*a*) presents a hardware alternative that generates QR codes and generates the HDMI signal to display streams and also to connect to the internet using WIFI. As shown, an LCD display is used to display the QR code 1630 and inside the Dongle 1600, an HDMI output 1603 is used to control an operating system 1625 (e.g., ChromiumOS), and loads mevia.js. mevia-3d.js, mevia-rtc.js and any other mevia-related resource 1620 that allows control via operating system 1625. The MeviaApp 1605 and AppUI 1610 contain the firmware required to load operating system 1625 and verifying the provisioned "mevi-app" (configuration pointing to a particular URL) is loaded and is used to configure WIFI. In order to configure WIFI, Bluetooth Low Energy protocol is used to "pass" the configuration from a mobile device to the dongle. FIG. 16(*b*) depicts the authentication and WIFI provisioning via BLE methods as shown at step 1650, e.g., EValue or Encrypted Value is a UUID with the Public Key and then generate QRCode with the concatenation of the a "device connect platform URL" (e.g. https://device_connect_platform.com/auth?Evalue=XYZ . . . ") with the EValue set at "XYZ . . . ", this is displayed for 60 seconds and scan a QR Code at step 1656 from a mobile phone and extract the UUID to be activated at step 1660.

The dongle state machine will then replace the display with "Waiting BLE WIFI" at step 1665 to notify the user that BLE is being used to configure WIFI. Once the dongle WIFI is activated, then it can be configured with the BLE protocol and as soon as the dongle connects to the Internet and to the device connect platform check if the UUID is activated, if not, the dongle will be deactivated and the process will start all over again.

Figure 17A:
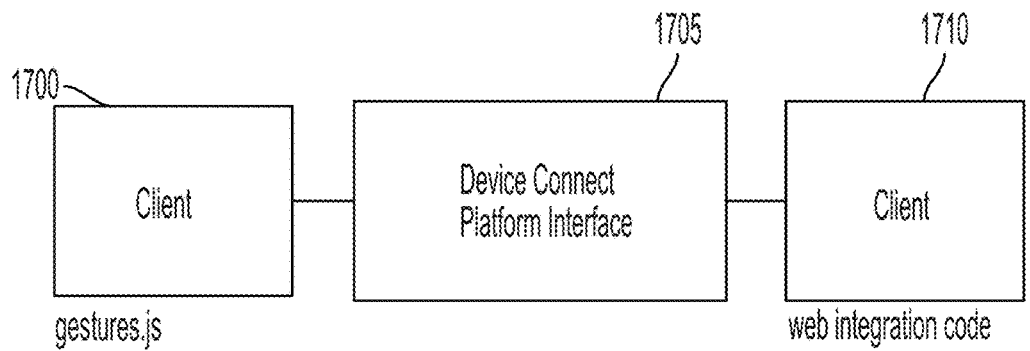
FIG. 17(a) is a block diagram of an exemplary embodiment of a combination of gesture.js and mevia.js and their use in the device connect platform architecture of FIG. 1.
Figure 17B:
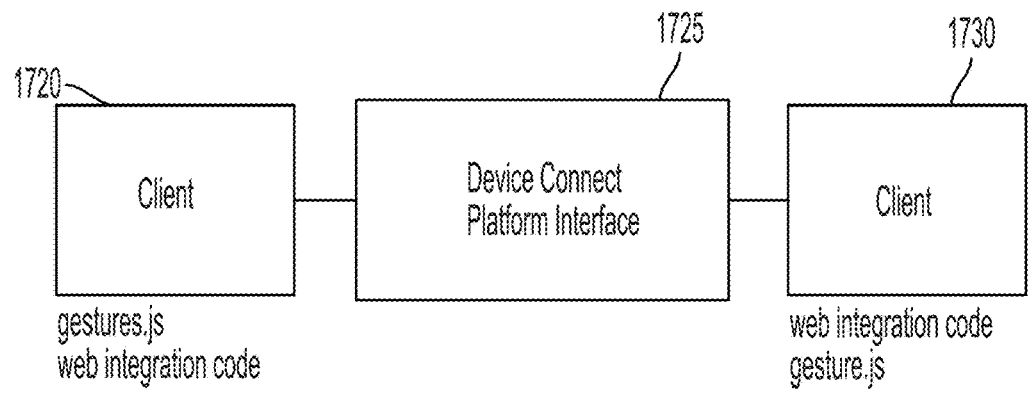
FIG. 17(b) is a block diagram of an exemplary embodiment of a combination of gesture.js and mevia.js and their use in the device connect platform architecture of FIG. 1.
Figure 17C:
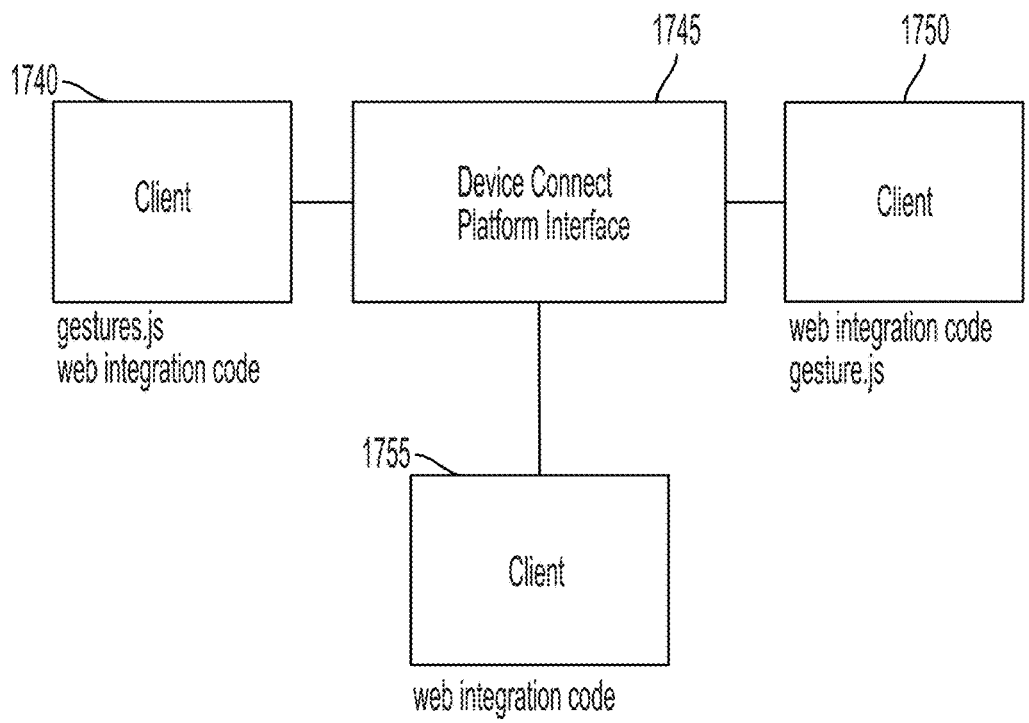
FIG. 17(c) is a block diagram of an exemplary embodiment of a combination of gesture.js and mevia.js and their use in the device connect platform architecture of FIG. 1.

There are multiple ways to load gestures.js and mevia.js libraries, and how a controllers can be only controllers 1700 or only displays 1710 as shown in FIGS. 17(*a*)-17(*c*). Also, a controller could also be a display and vice versa, which means that a section of the screen can be used for touch and a section for display as shown in client 1720 and client 1730. In those cases, where a client is a controller and display, different ports can be used to handle traffic of a combined mevia-gesture.js can also be implemented and used. Finally, the device connect platform allows two or more hybrid controller-displays 1740, 1750, and other devices that are only displays 1755.

Device Connect Platform in Cable and Satellite Systems

Figure 20:
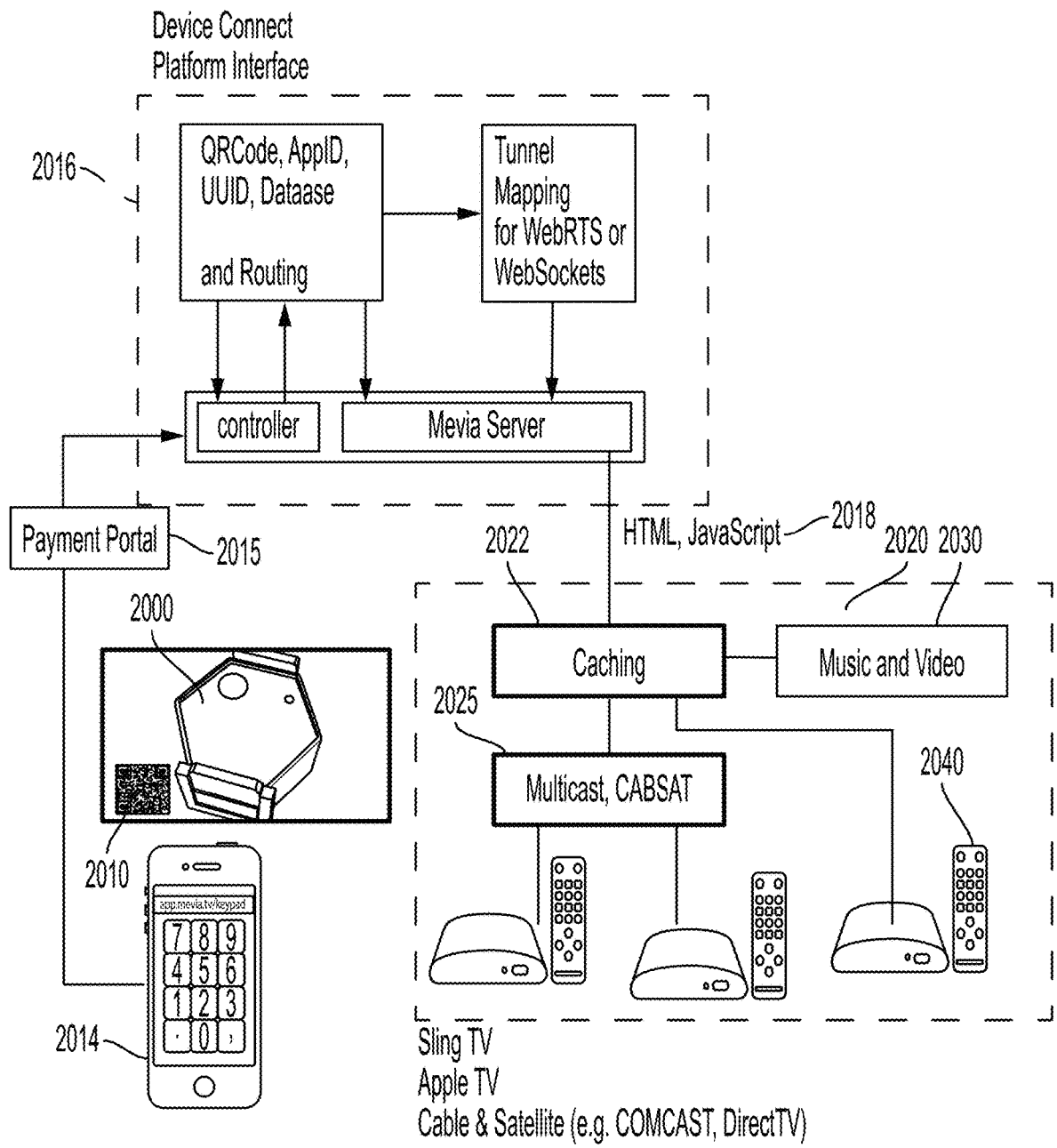
FIG. 20 is a diagrammatic illustration of an exemplary embodiment of integration of the device connect platform architecture of FIG. 1 to Broadcasting Platforms and Systems.

Another aspect of this disclosure is the ability to integrate with cable satellite systems. As shown in FIG. 20, a stream 2000 is being displayed at a local store with a QR Code 2010. A keypad controller 2014, just as a standard remote controller, is shown as part of mobile phone interface after scanning. The controller 2014 can be connected to a payment portal 2015 that can then validate the use of the system by verifying that a particular user is a paying customer of service (e.g., like Sling television or Comcast). The device connect platform 2016 provides an interactive experience to the end user, and a controller and the Meviapp server generate HTML and JavaScript results that are then managed from the keypad or other controller 2014. The headend system 2020 can then retrieve using the caching server 2022 all generated HTML and JavaScript that is being rendered together with music and/or video 2030 that can then multicasted to a cable television and satellite system that is being retrieved by in several set top boxes 2040 (e.g., DOCSIS 2.0 or 3.0) or OTT Systems, and observed at stream 2000. Hence, an interactive television experience is created and any user with a phone can change channels for example, load visual widgets, and overlay content generated from the MEVIA Sever at the device connect platform to be broadcasted to massive cable & satellite systems or OTT platforms (such as Sling television or FUBO television) or NextGenTV such as ATSC 3.0 standard broadcasting system over-the-air. For example, the "Mevia Server" at 2016 generate a web-page with the animations, and interactions that are generated from the controller 2014. The controller interacts with the QR Code 2010 and see an image at 200 that is projected and multicast devices at 2025 as well as unicast devices at 2040, retrieve content from the caching server at 2022 that renders and broadcasts the resulting web pages with HTMO and JavaScript at 2018. In some embodiments, the music and video at 2030 can be added or retrieved by the caching unit as presented in the '074 patent, as shown in FIG. 14, HLS streams at 1410 and 1420 are in m3u8 format Other controllers such as games, video interfaces and other can be attached and a novel broadcasting system, powered by the device connect platform.

Clearly, a user can interact with content in the device connect platform and that content be combined with music channels. As shown in FIG. 20, music channels 2030 could work as background music that is distributed and assets created in the caching unit. For instance, users may play a game (e.g., PACMAN) for ten to fifteen minutes, and sound bites from the game can be mixed with songs stored at music channels 2030 as well as integrate user's comments and text that can be overlaid as part of CSS style "Absolute" and using translucent <divs> that appear at different positions of the game. Also, using the FIG. 12(*c*) system, a "Mevia App server Display" could be composed of dialogs with multiple people in a video conferencing call or any HTML from other web applications, and any other web application that can interact with a user or multiple users. For example, a user may decide to draw an NFT and store the process of drawing all the paths from an initial x1, y1 position vector to another x2, y2 position vector, and all the steps to draw a particular figure. The images and all streaming parts from the HTML or canvas plus HTML are stored as part of the caching system that generates screens from the HTML that is ready to be multicast or streamed to a cable operator. Hence, the device connect platform contents become that the background for the music being broadcasted that enhance or can decorate the ambience for a museum, coffee shop, or any other location.

Content Routing in the Device Connect Platform

Figure 21:
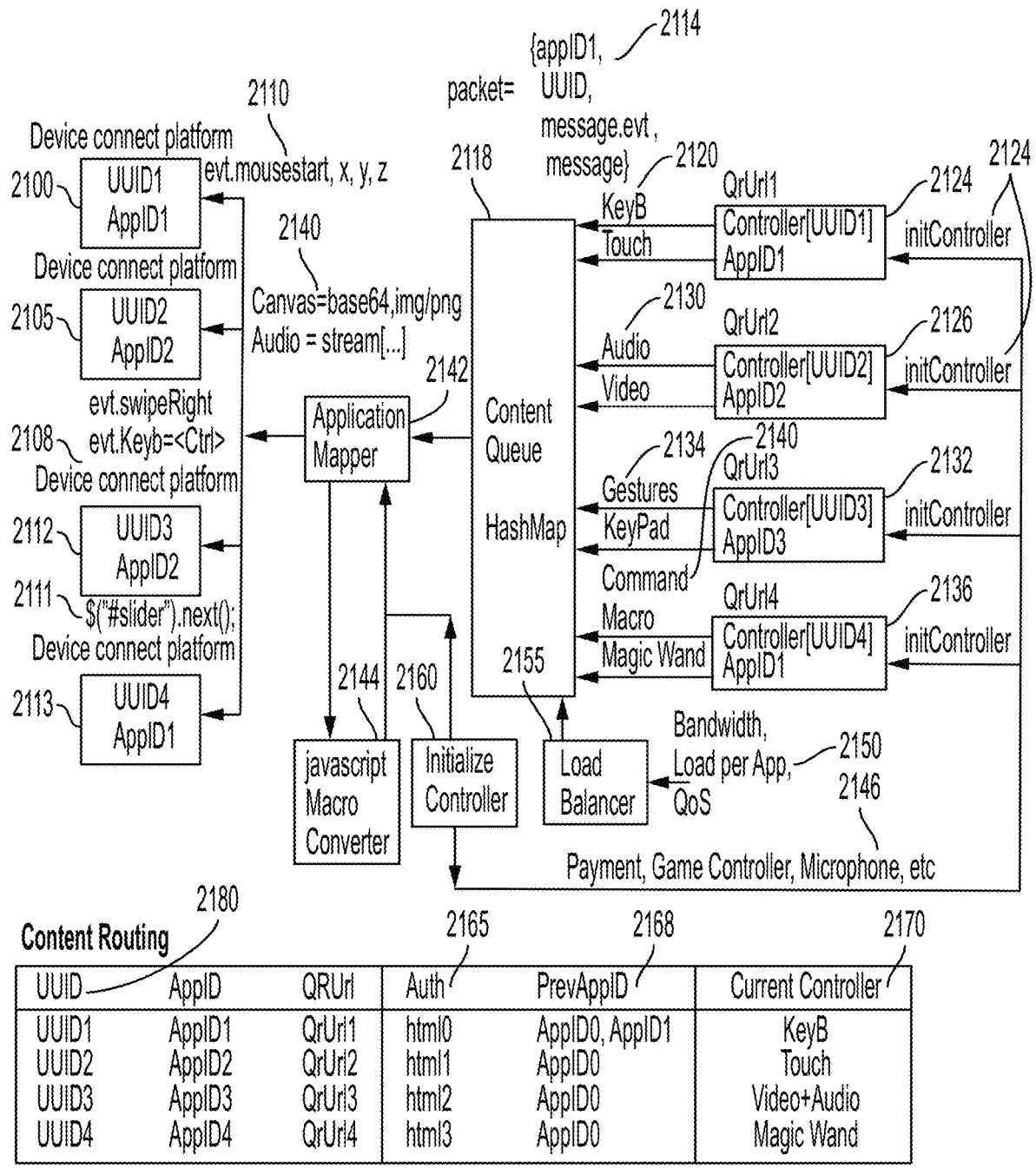
FIG. 21 is a block diagram of an exemplary embodiment of content routing apparatuses and systems for commands and messages from a controller in the device connect platform architecture of FIG. 1.

Thus far several routing systems mostly related to QR code mappings, WebSockets and WebRTC routings, and well as Windows device messaging have been disclosed. However, content routing will be explained in more details in the section, content routing is a key feature of the device connect platform and FIG. 21 depicts how multiple applications with multiple UUIDs and controllers are properly routed to the respective Mevia application.

In the device connect platform, each application has an Application Identifier (AppID) and a user generates a UUID 2180 when interacts with a particular application, at the same time each controller is mapped to a QrUrl that is stored in the content routing table. In some cases, the content router may require authentication 2165 and the previous application ID is also stored, or the sequence or previous application identifiers is stored to PrevAppID field 2168 to be able to return to a previous application in the device connect platform session. Also, a current controller value 2170 is kept for the type of controller currently in use. The first message that a controller receives per initialization is "initController" 2124, the initController command sets the resources, and parameters that are required for a particular user. The controller may generate gestures 2134 or a keypad, or upon pressing certain events might generate Command Macro 2140 or gestures (as a Hitachi Magic Wand device). A gesture from a "wand device" is a 3D accelerator read that is translated to UP, DOWN, SWIPE LEFT, SWIPE RIGHT commands.

A content router will be able to manage thousands of commands and events (See FIG. 21), from touch 2120 to audio and video 2130. The content queue 2118 receives packets that carry out information about the Application Identifier of a target, the UUID generated by the device connect platform for a particular user, and the message.evt with message payload 2114. The message payload is not analyzed by the Content Queue which can be implemented using a HashMap or a NoSQL database, a Linked List. The Load Balancer 2155 receives values such as Bandwidth, Load per App, and QoS 2150 and can be adjusted to determine when to process and how to process the Content Queue. Once the Content Queue selects a packet to be processed, it is passed to an Application Mapper 2142, the application mapper is in charge of determining whether a particular command has to be converted to a JavaScript macro converter 2144, or if is an "Exit" command that require controller reinitialization 2146. As an example, the system can include that a "Long Tap" as the universal "ESC" command, that means exit the device connect platform Application. As such the Application Mapper 2142 can be translated to draw a particular screen into a canvas 2140 or play a particular audio stream as a notification buzzer at AppID2 with UUID2 2105, or the application mapper may send an evt.mousestart x, y, z 2110 to mevia app UUID1 with AppID1 at 2100. In another variation, the application mapper will send a jQuery macro to UUID4 and AppID1 with the JavaScript "$('#slider').next( );" that is then "evaluated" or using the eval command at the UUID3 with APPID2 WebSocket, or simply send a command with message.evt="SwipeRight" with message.evt.KeyB=<ctrl> 2108 to the application AppID3 with UUID3 2112.

A content queue system and controllers is accessible via QrUrl1 to QrUrl4 (QR Code's Universal Resource Locator) in this example and each controller can include any of the controllers as shown in FIG. 10, at 1001, QrUrl1 is associated with a Game, Qrurl2 with NFT Lab, QrUrl3 is Videoconferencing and QrUrl4 is a Door controller interface or application. In essence, the content router is processing all messages using SocketIO and can be implemented in NodeJS or other languages. For example, a Content Router creates as group to join all messages for a particular App Identifier with a UUID. To help illustrate, pseudocode may define an event listener for a connection event on a WebSocket server. Further, when a new connection is established, the callback function is executed with the connected socket as an argument. Inside the callback, a pathID is obtained by calling getContentRouter with two arguments: UUID and AppID. The socket then parses the incoming data as JSON. It logs a message to the console indicating that command 'X,Y' has been received, including the extracted data.evt and data.evt.x, data,evt.y properties from the parsed data. Finally, the server broadcasts a message with the event name "ComandXY" and the parsed data to all sockets in the room are identified by pathID.

The socket.broadcast.to(pathId) from the SocketIO library in NodeJS can be used to emit certain command to a particular application ID as the Content Router has generated a pathId. The Content Queue on the other hand can be implemented as a Hashmap with a Round Robin or Weighed Round Robin access technique or using "Apache ActiveMQ" or other techniques to handle great amounts of messages from multiple sources. As the same time Kubernettes and cloud-based approaches can be used to address scalability issues both vertical as horizontal.

Figure 22A:
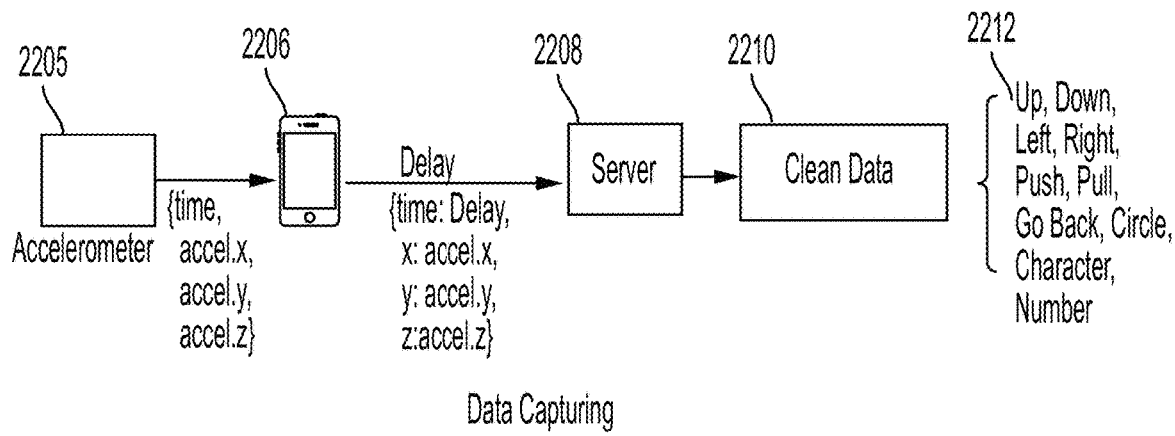
FIG. 22(a) is a diagrammatic illustration of an exemplary embodiment of data capturing for a controller that will be trained using a Neural Network or Deep Learning using LSTM or other Neural Network.
Figure 22B:
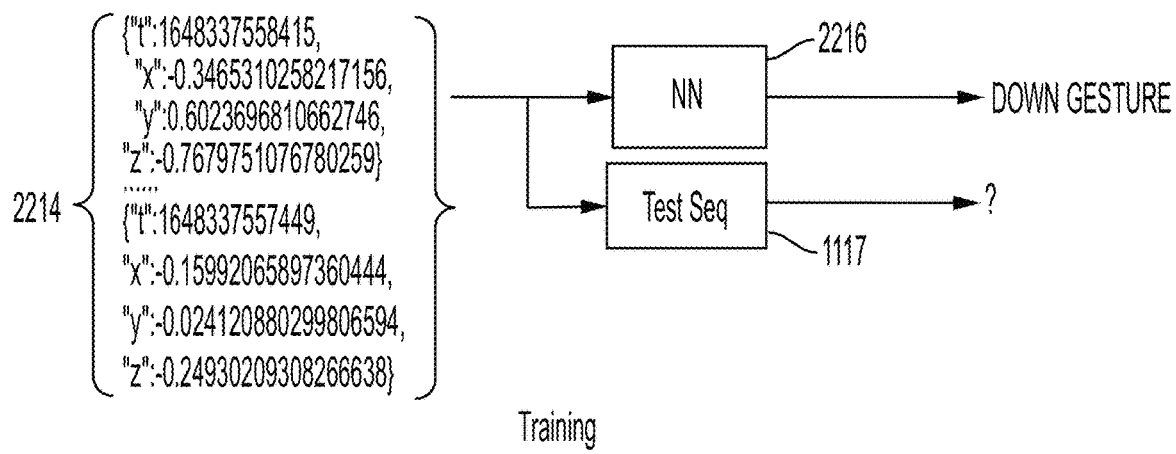
FIG. 22(b) is a diagrammatic illustration of an exemplary embodiment of training the neural network to match different commands using a controller.
Figure 22C:
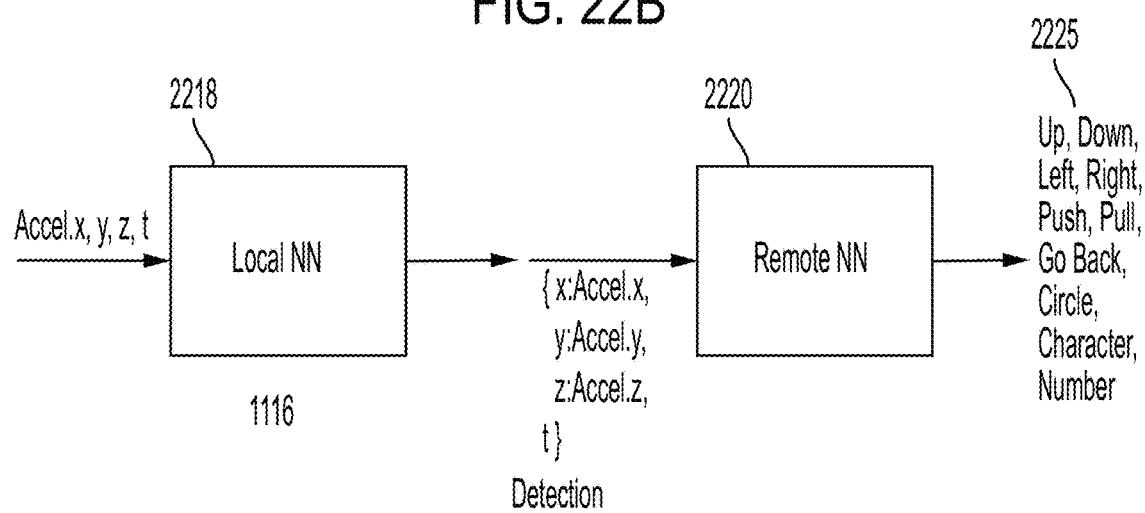
FIG. 22(c) is a diagrammatic illustration of an exemplary embodiment of detection of movements used by a controller system with Deep Learning or Neural Networks.

On FIGS. 22(a)-22(c), we present a data capturing system that includes a nodejs application that services all commands and sends commands to a version of MEVIA but instead of being 2-dimensional now it can be 3-dimensional in nature. As shown in FIG. 22(a), the first step is to handle, device motion 2200 shows how a device can capture data from the accelerometer and other instrumentations from the mobile device, such that orientation, and motion can be captured and fed into a deep learning algorithm,

```
function handleOrientation(event) {
    var absolute = event.absolute;
    var alpha    = event.alpha;
    var beta     = event.beta;
    var gamma    = event.gamma;
//      var interval = event.interval;
//      elapsed_o = elapsed_o + interval;
//      if (elapsed_o>=delta_t){
        $(".alpha").text("alpha (z axis, 0 to 360): " + alpha.toFixed(4));
        $(".beta").text("beta (x axis, -180 to 180): " + beta.toFixed(4));
        $(".gamma").text("gamma (y axis, -90 to 90): " + gamma.toFixed(4));
        $(".absolute").text("absolute: " + absolute);
        elapsed_o = 0;
//      }
}
function handleMotion(event) {
    var acceleration = event.acceleration;
    var accelerationIncludingGravity = event.accelerationIncludingGravity;
    var rotationRate = event.rotationRate;
var interval = event.interval;
    elapsed = elapsed + interval;
    ...
```

The events captured from 2205 are then stored locally into mobile device 2206. The mobile device 2206 can be delivered via JSON commands to a service for training a neural network at a server 2208 where they are first stored and saved in Clean Data 2210, while map to a particular set of commands. Those commands 2212 could be up, down, left, right, draw a character, make a number. Each command is stored for two to three seconds at a sampling rate of 16 ms represents around 200 samples, which will be used for a Long Short Term Memory training (LSTM) or other neural networks or neural networks.

Once the accelerator data is saved as a JSON object 2214, FIG. 22(b) presents the standard process of training that can be done using Keras or other time training sequences, observe that the training can be done using deta_t, and accel_x, y, z values that can be consolidated from all the elements captured from FIG. 22(a). The training sequences can be divided into 70% used for training 2216 and 30% used for testing 2217.

For example, the training algorithms for gestures is then as follows: X_train=[[0 . . . STEPS], [0 . . . STEPS . . . ] . . . ] of N Samples. The objective is that the value of "STEPS" are 200-300 steps and that can be normalized to handle the same amount of samples and Y_Train are of values chosen "Up", "Down," "Left," and other gestures that are being trained with N samples as shown in FIG. 22(b). Once the weights or deep learning machine converges as using 20 to 25 epochs, training converges at 94-97% accuracy, the machine can be saved to be used locally at the phone 2218 as FIG. 22(c) and a second neural network could be stored remote NN 2220, in one training delays are zero and remote NN 2220 the values includes all delays from network traffic. The objective is result 2225 that will generate the proper messages that are now sent as message.evt commands to the device connect platform.

Figure 23A:
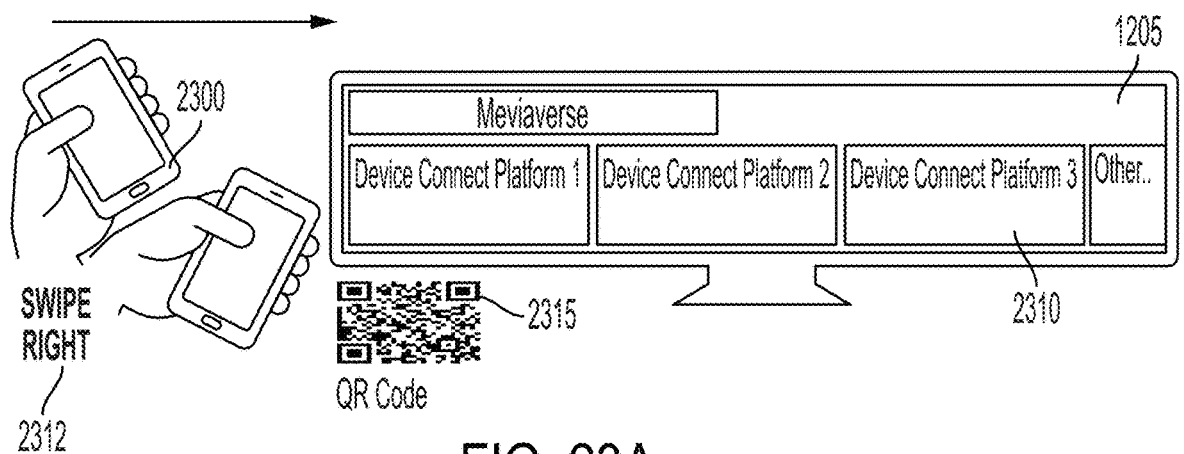
FIG. 23(a) is a diagrammatic illustration of an exemplary embodiment of a swipe-right-interaction to load a game controller and a game application of FIG. 8(c) serviced by the device connect platform into a smart television.
Figure 23B:
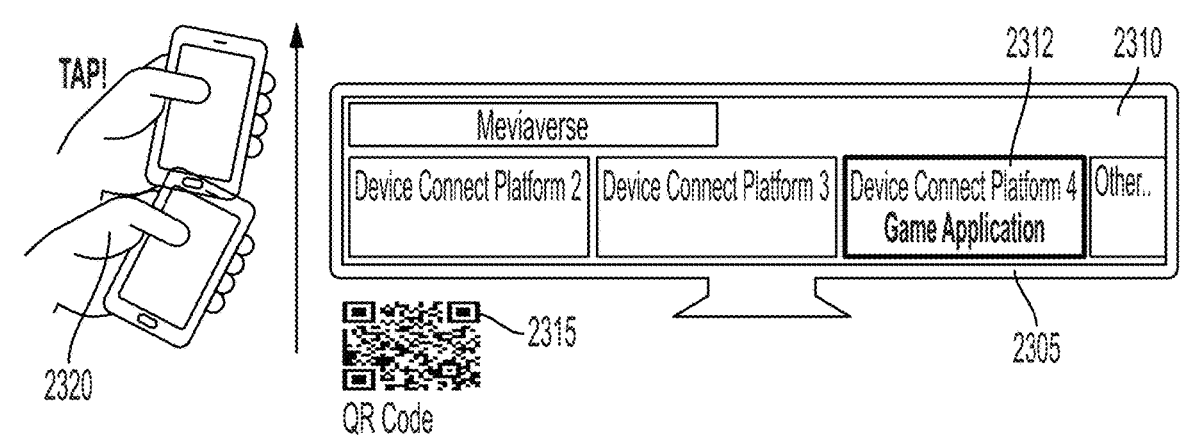
FIG. 23(b) is a diagrammatic illustration of an exemplary embodiment of a tap interaction to load the game controller and a game application of FIG. 8(c) serviced by the device connect platform into a smart television.
Figure 23C:
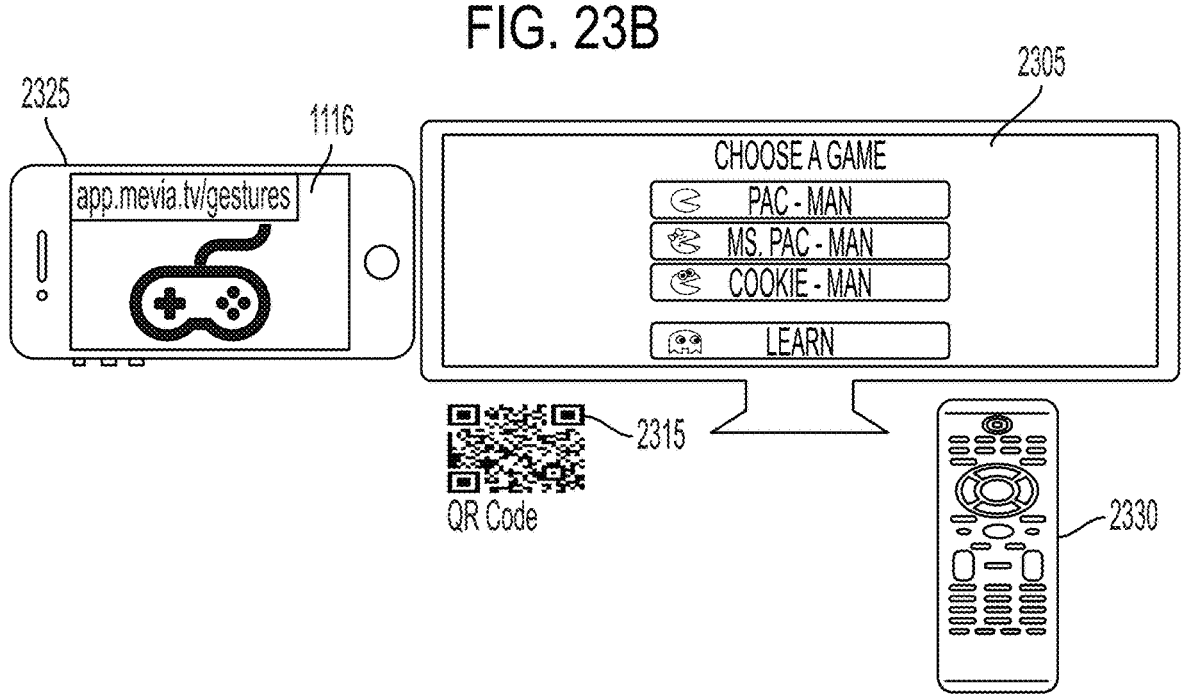
FIG. 23(c) is a diagrammatic illustration of an exemplary embodiment of a game controller and a game application serviced by the device connect platform for use on a smart television.

FIG. 23 shows how then all gestures can handle can send commands to the device connect platform application in control, for example at (a) the hand will move from 2300 to 2312, by moving or waving a hand gesture over the air from left to right, as swipe, At FIG. 23(a), the applications shown by the device connect platform application would be "Mevia App 1," "Mevia App 2," and "Mevia App 3." By scanning the QR code associated to the smart television 2315, the commands issued from the mobile phone's gestures 2300 are sent or issued to the web application loaded into the device connect platform. Hence, the device connect platform application can be controlled using gestures as shown in movements 2300. In this example, a swipe right is issued and the menu switches from Mevia App 3 to Game Application 2312. As part of the device connect platform content router, the commands can be converted from message.evt="Swipe Right" to $('slider').nexto. Once a menu option is selected, a selection is done by another gesture to load the game application. A tap gesture can be issued to smart television 2310 and then the selected application 2305 is loaded, and the game controller 2325 used regularly is load to interact with the device connect platform application as in this case is a game application.

Figure 24:
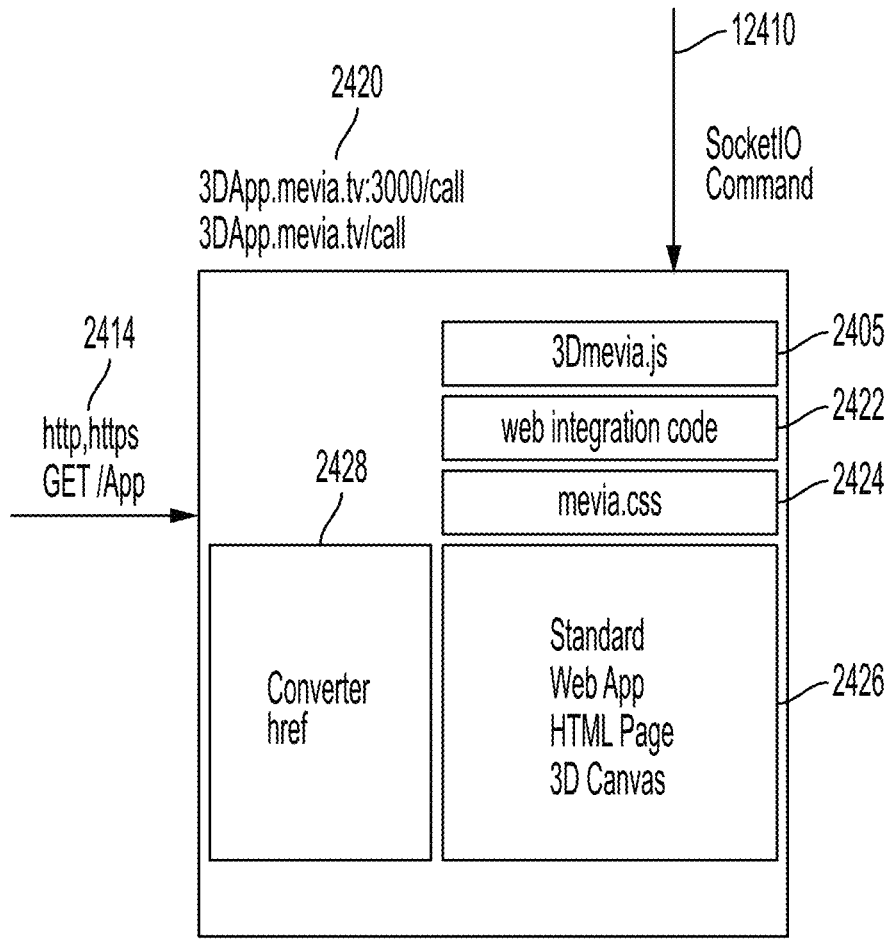
FIG. 24 is a diagrammatic illustration of an exemplary embodiment of a device connect platform Application that maps 3D gestures to 3D display actions using 3DMevia.js.

FIG. 24 show how the MEVIA application is then changed by adding a 3dmevia.js to handle Z-axis positioning changes, for example a WebGL or ARKit application can translate depth movements in addition to X-axis and Y-axis movements. As a device connect platform application, the messages.evt can also contain the structure with: message.x, message.y, and message.z position and handle MeviaAccelerometer instances 2430. The accelerator and gyroscope instance is common on JavaScript as part of the object window.ondevicemotion, window.ondeviceorientation, or window.onmozorientation as supported by iPhone, Firefox, and Chrome browsers. Additionally, the 3Dmevia.js 2405 library contains the 3D positioning and accelerometer values that can be used also in combination with a Camera LIDAR sensor for positioning in AR/VR headsets (Augmented Reality/Virtual Reality), mevia.js 2422 and other resources stylesheets loaded by mevia.css 2424. This type of application is then handled to interact with a 3D Canvas 2426, 2410 is also recipient of SocketIO messages that contain all controller commands, additionally HREF (HTML Reference) and other web references in the web application are converted to work on the device connect platform 2428. The use of WebGL and 3D Renderings are useful for AR/VR scenarios, where the mobile device or terminal is an AR/VR Headset (e.g. Vision OS, MetaQuest, Vivero, others), or mobile phone with Augmented Reality (AR) using a phone's camera such as iOS or Android.

Figure 25:
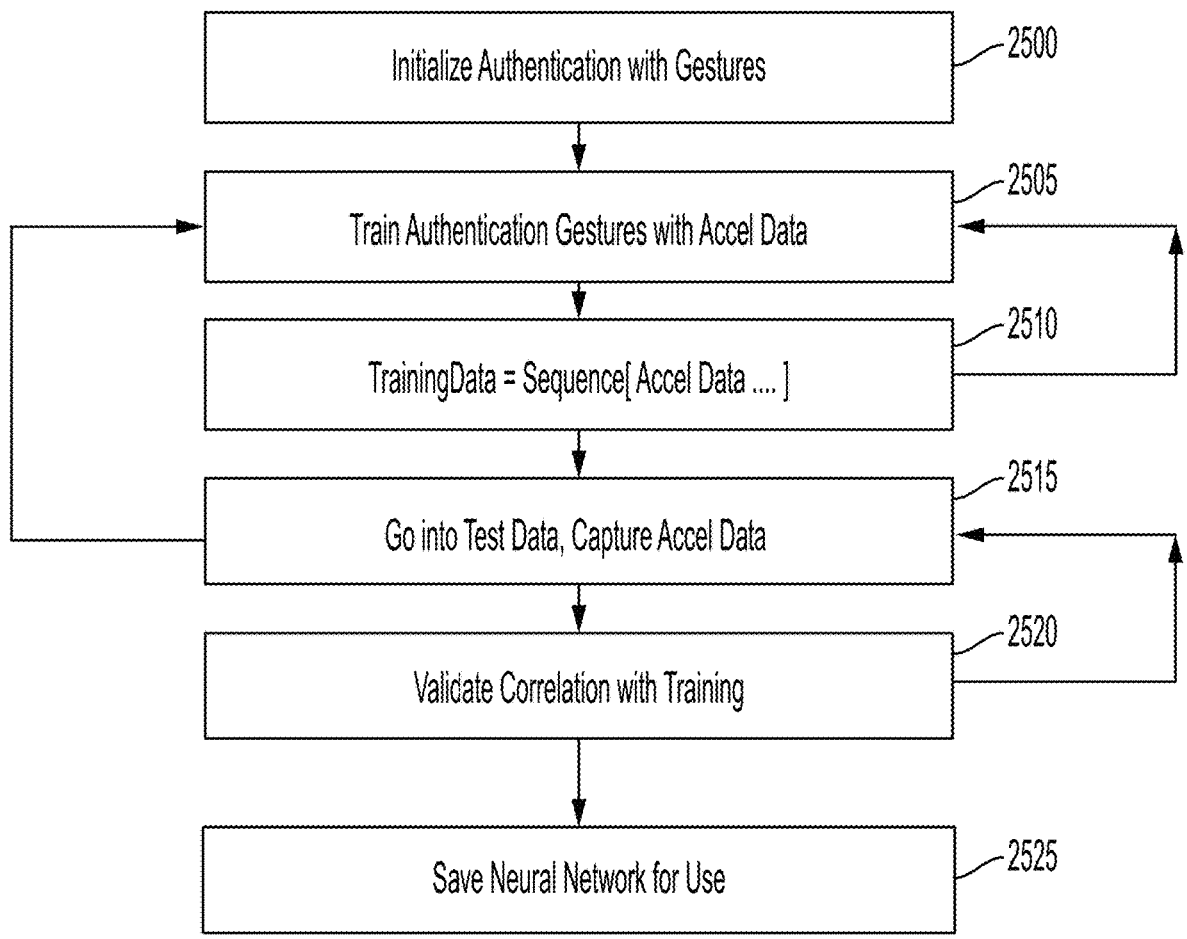
FIG. 25 is a block diagram of an exemplary embodiment of a method for authenticating access or recognizing gestures for a device connect platform application using gesture driven tools.

FIG. 25 presents the steps necessary to training the gestures in 2D or 3D systems, at start at all initializations of authentication using gesture at 2500, by loading the neural network (e.g., LSTM) to train with more information. The Training Data at 2510 interacts with 2505 with is the training of those gestures with the accelerometer's information from the device, called "Accel Data," once training is completed after several iterations of training, the neural network can be tested with a subset of training data, or "Test Data" as shown at 2515. Further, once the validation and training correlation is completed at 2520 with a desired accuracy, all neural network weights are saved and the resulting Neural Network can be used as part of detecting "swipe right", "tap," or even train a "game controller" using gesture information as shown in FIG. 23 For instance, upon capturing a sequence of samples for swipe right or swipe left gesture as shown in FIG. 22 at 2214. The element at 2510 uses the device accelerometer data (Accel Data) that is loaded with multiple with "Swipe right" training values or the training information for "swipe right or left." The sequence of values that may include time, x, y, z, coordinates, or even accel_x, accel_y and accel_z values are used for training. Once trained, the detection functionality shown in FIG. 23 2300, 2312 "swipe right or left," can be used to move the position or cursor on the screen an issue message.evt commands to the Mevia App, 2310. The saved Neural Network (NN) or LSTM once trained can recognize gestures as depicted in FIG. 22 either by saving downloading the NN into the device or by processing the NN as part of the Mevia.js by receiving SocketIOMessages or by processing the requests via an HTTP GET or POST Request from the mobile device or AR headset.

Figure 26:
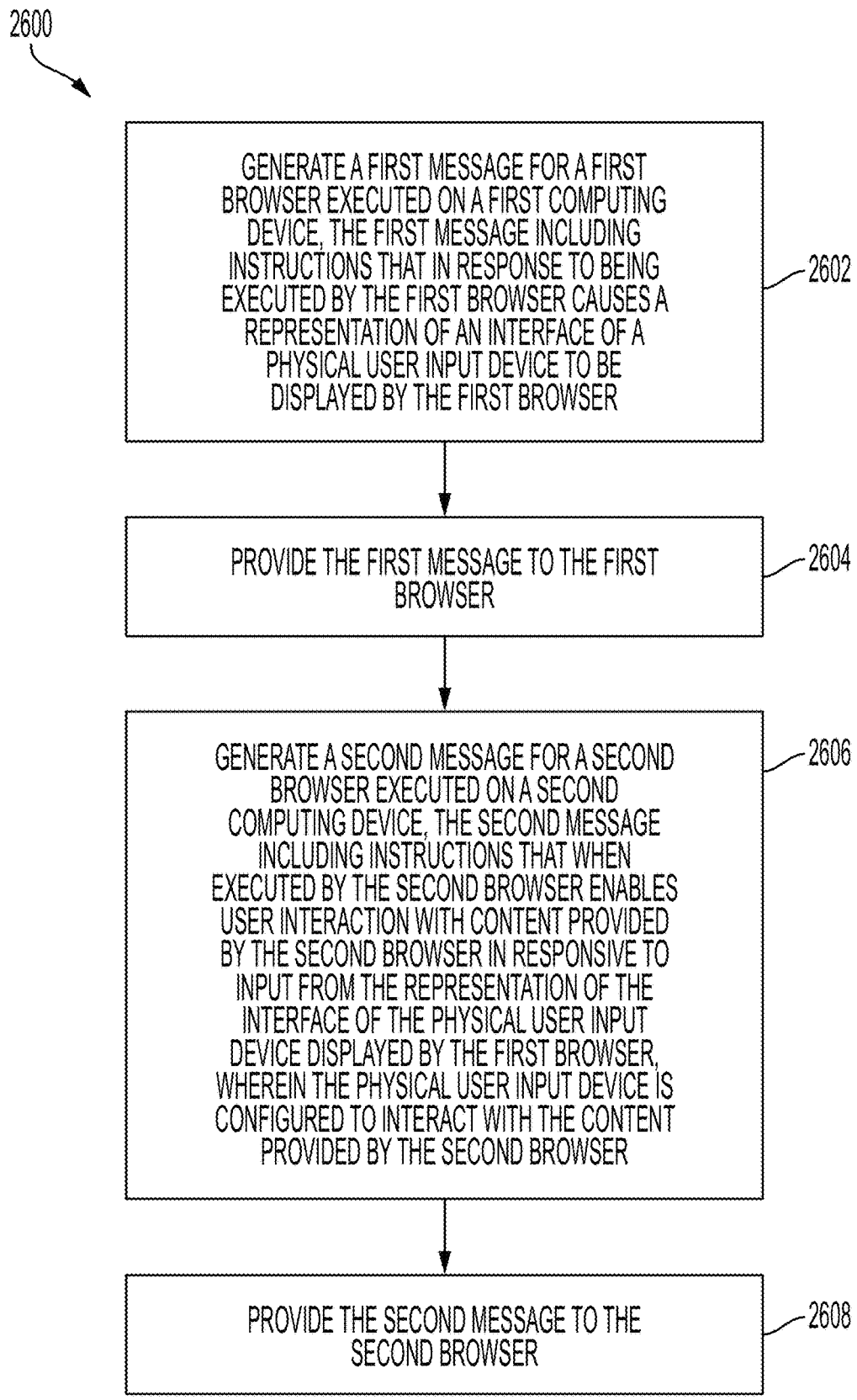
FIG. 26 generally illustrates a flow diagram of a method for enabling a user to control and interact with content on a computing device using a browser interface on another computing device, according to the principles of the present disclosure.

FIG. 26 is a flow diagram generally illustrating method 2600 for enabling a user to control and interact with content on a computing device using a browser interface on another computing device, according to the principles of the present disclosure. At 2602, the method 2600 generates a first message for a first browser executed on a first computing device, where the first message includes instructions that in response to being executed by the first browser causes a representation of an interface of a physical user input device to be displayed by the first browser.

At 2604, provides the first message to the first browser (e.g. Web Page on Smart TV).

At 2606, the method 2600 generates a second message for a second browser executed on a second computing device, where the second message includes instructions that when executed by the second browser enables user interaction with content provided by the second browser in responsive to input from the representation of the interface of the physical user input device displayed by the first browser. The physical user input device is configured to interact with the content provided by the second browser. (E.g. Web Page with controller displayed at mobile device)

At 2608, the method 2600 provides the second message to the second browser and create an interaction from first browser to the second browser (e.g. Command from controller to first browser's web page and responses).

ACRONYMS

IP: Internet Protocol
AAC: Advanced Audio Encoding
CDN: Content Delivery Network
UUID: Unique Universal Identifier
BLE: Bluetooth Low Energy
CABSAT: Cable and Satellite systems
OTT: Over-the-Top Platforms
SocketIO: JavaScript library used to manage WebSockets.
MP3: MPEG-2 Audio Layer III
OGG: Theora codec for audio
OGV: Theora codec for video
MPEG: Motion Pictures Expert Group
FFMPEG: Fast Forward MPEG
WebRTC: Web Real-time Communications
HLS: HTTP Live Streaming
TS: Transport Stream
EC2: Elastic Computing Class 2
VP8: Open video encoding developed by Google using LibVPX
SSH: Secure Socket Shell
RTMP: Real-time Messaging Protocol
WSS: WebSocket Secured Protocol
HTTP: Hypertext Transfer Protocol
HTTP GET: HTTP Method used to submit data when data is posted a part of URL
HTTP POST: HTTP Method used to submit data when data is part of the payload not the URL
HTML: Hypertext Markup Language
HLS: HTTP Live Streaming
LSTM: Long short-term memory
NAT: Network Address Translation
NFT: Non-Fungible Token
NN: Neural Network
RTP: Real-time Protocol
SIP: Session Initiation Protocol
URI: Universal Resource Identifier
URL: Universal Resource Locator
WLAN: Wireless Local Area Network or WiFi
OTT: Over-the-Top Streaming Platform
LAN: Local Area Network
PAN: Personal Area Network
WAN: Wireless Area Network It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and, in any combination, or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. A method, comprising:
   generating a first message for a first browser executed on a first computing device, the first message including instructions that in response to being executed by the first browser causes a representation of an interface of a physical user input device to be displayed by the first browser;
   providing the first message to the first browser;
   generating a second message for a second browser executed on a second computing device, the second message including instructions that when executed by the second browser enables user interaction with content provided by the second browser responsive to input from the representation of the interface of the physical user input device displayed by the first browser, wherein the physical user input device is configured to interact with the content provided by the second browser;
   providing the second message to the second browser;
   receiving a third message from the first browser including touch gesture data in response to user engagement with the representation of the interface of the physical user input device displayed by the first browser;
   converting the touch gesture data to updates to the content rendered or executed by the second browser;
   updating the content rendered or executed by the second browser based on the touch gesture data; and
   providing a fourth message to the second browser, the fourth message including the updates to the content provided by the second browser.

2. The method of claim 1, further comprising:
   receiving an identification message including application identification data associated with a web application;
   determining, based on the application identification data, identification information of the physical user input device used to interact with the web application; and
   generating the instructions of the second message that when executed causes the interface of the physical user input device to be displayed on the first browser.

3. The method of claim 2, wherein the identification information of the physical user input device indicates what brand, type, model of the physical user input device.

4. The method of claim 2, wherein the identification message is associated with a quick-response code.

5. The method of claim 2, wherein the application identification data includes information identifying a destination server to receive any user interaction with the interface of the physical user input device.

6. The method of claim 1, further comprising:
   receiving a user selection of a web application; and
   generating a third message for the first browser executing on the first computing device, the third message including instructions that when executed by the first browser causes an alternative representation of the interface of the physical user input device associated with the web application to be displayed by the first browser.

7. The method of claim 1, wherein representation of the interface of the physical user input device includes an entire layout of the physical user input device.

8. The method of claim 1, wherein the instructions that in response to being executed by the first browser causes the representation of the interface of the physical user input device to be displayed by the first browser includes at least one JavaScript library.

9. The method of claim 1, wherein the instructions that when executed by the second browser enables user interaction with content provided by the second browser includes at least one JavaScript file.

10. A system comprising:
    at least one processor circuit; and
    at least one memory that stores instructions to be executed by the at least one processor circuit, the instructions configured to perform operations that comprise:
    generating a first message for a first browser executed on a first computing device, the first message including instructions that in response to being executed by the first browser causes a representation of an interface of a physical user input device to be displayed by the first browser;
    providing the first message to the first browser;
    generating a second message for a second browser executed on a second computing device, the second message including instructions that when executed by the second browser enables user interaction with content provided by the second browser responsive to input from the representation of the interface of the physical user input device displayed by the first browser, wherein the physical user input device is configured to interact with the content provided by the second browser;
    providing the second message to the second browser;
    receiving a third message from the first browser including touch gesture data in response to user engagement with the representation of the interface of the physical user input device displayed by the first browser;
    converting the touch gesture data to updates to the content rendered or executed by the second browser;
    updating the content rendered or executed by the second browser based on the touch gesture data; and
    providing a fourth message to the second browser, the fourth message including the updates to the content provided by the second browser.

11. The system of claim 10, wherein the instructions are further configured to perform operations that comprise:
    receiving an identification message including application identification data associated with a web application;
    determining, based on the application identification data, identification information of the physical user input device used to interact with the web application; and
    generating the instructions of the second message that when executed causes the interface of the physical user input device to be displayed on the first browser.

12. The system of claim 11, wherein the identification information of the physical user input device indicates what brand, type, model of the physical user input device.

13. The system of claim 11, wherein the identification message is associated with a quick-response code.

14. The system of claim 11, wherein the application identification data includes information identifying a destination server to receive any user interaction with the interface of the physical user input device.

15. The system of claim 10, wherein the instructions are further configured to perform operations that comprise:
receiving a user selection of a web application; and
generating a third message for the first browser executing on the first computing device, the third message including instructions that when executed by the first browser causes an alternative representation of the interface of the physical user input device associated with the web application to be displayed by the first browser.

16. The system of claim 10, wherein representation of the interface of the physical user input device includes an entire layout of the physical user input device.

17. The system of claim 10, wherein the instructions that in response to being executed by the first browser causes the representation of the interface of the physical user input device to be displayed by the first browser includes at least one JavaScript library.

18. A non-transitory computer-readable storage medium having program instructions recorded thereon that, when executed by at least one processing circuit of a computing device, perform a method, comprising:
generating a first message for a first browser executed on a first computing device, the first message including instructions that in response to being executed by the first browser causes a representation of an interface of a physical user input device to be displayed by the first browser;
providing the first message to the first browser;
generating a second message for a second browser executed on a second computing device, the second message including instructions that when executed by the second browser enables user interaction with content provided by the second browser responsive to input from the representation of the interface of the physical user input device displayed by the first browser, wherein the physical user input device is configured to interact with the content provided by the second browser;
providing the second message to the second browser;
receiving a third message from the first browser including touch gesture data in response to user engagement with the representation of the interface of the physical user input device displayed by the first browser;
converting the touch gesture data to updates to the content rendered or executed by the second browser;
updating the content rendered or executed by the second browser based on the touch gesture data; and
providing a fourth message to the second browser, the fourth message including the updates to the content provided by the second browser.

* * * * *